(12) United States Patent
Tonogi et al.

(10) Patent No.: US 9,083,225 B2
(45) Date of Patent: Jul. 14, 2015

(54) ROTARY ELECTRIC MACHINE

(75) Inventors: Kazuki Tonogi, Kariya (JP); Toshihiko Yoshida, Kariya (JP); Norimoto Minoshima, Kariya (JP); Nobuyuki Matsui, Kasugai (JP); Takashi Kosaka, Nagoya (JP); Hiroshi Nishimura, Kariya (JP); Masaki Saijo, Kariya (JP); Masashi Watanabe, Kariya (JP); Yasuhiro Takagi, Kariya (JP); Kaoru Yoshikawa, Kariya (JP)

(73) Assignees: KABUSHIKI KAISHA TOYOTA JIDOSHOKKI, Aichi-ken (JP); National University Corporation Nagoya Institute of Technology, Aichi-ken (JP)

( * ) Notice: Subject to any disclaimer, the term of this patent is extended or adjusted under 35 U.S.C. 154(b) by 748 days.

(21) Appl. No.: 13/407,472

(22) Filed: Feb. 28, 2012

(65) Prior Publication Data

US 2012/0223600 A1 Sep. 6, 2012

(30) Foreign Application Priority Data

| Mar. 2, 2011 | (JP) | 2011-045310 |
| Mar. 2, 2011 | (JP) | 2011-045311 |
| Mar. 2, 2011 | (JP) | 2011-045312 |
| Mar. 2, 2011 | (JP) | 2011-045313 |
| Mar. 2, 2011 | (JP) | 2011-045314 |
| Mar. 2, 2011 | (JP) | 2011-045315 |
| Mar. 2, 2011 | (JP) | 2011-045316 |
| Jun. 8, 2011 | (JP) | 2011-128613 |
| Jan. 11, 2012 | (JP) | 2012-003336 |

(51) Int. Cl.
*H02K 21/02* (2006.01)
*H02K 23/46* (2006.01)
(Continued)

(52) U.S. Cl.
CPC .............. *H02K 19/103* (2013.01); *H02K 1/148* (2013.01); *H02K 2201/03* (2013.01); *H02K 2203/12* (2013.01); *H02K 2213/03* (2013.01)

(58) Field of Classification Search
CPC ... H02K 1/148; H02K 19/103; H02K 21/028; H02K 23/46
USPC .................................................. 310/190, 191
See application file for complete search history.

(56) References Cited

U.S. PATENT DOCUMENTS 3,599,024 A * 8/1971 Kitamura ...................... 310/163
5,864,197 A 1/1999 Naito et al.
(Continued)

FOREIGN PATENT DOCUMENTS

| CN | 1688083 A | 10/2005 |
| JP | 47-51790 | 5/1972 |

(Continued)

OTHER PUBLICATIONS

Japanese Office Action for corresponding JP Patent Application No. 2011-045312 mailed May 7, 2013.

*Primary Examiner* — Terrance Kenerly

(74) *Attorney, Agent, or Firm* — Sughrue Mion, PLLC

(57) ABSTRACT

A rotary electric machine includes a rotor core, a stator, a field yoke, and a field winding. The rotor core is fixed to a rotary shaft, which includes a magnetic body for forming a magnetic path, and magnetic salient poles. The stator has teeth and a stator winding wound around the teeth by concentrated winding. A slot is formed between adjacent ones of the teeth in a circumferential direction. The field yoke magnetically connects the stator and the magnetic body. The field winding is located in proximity to at least one of the winding ends of the stator winding in an axial direction of the rotary shaft. The field winding generates a magnetic pole on the magnetic salient poles when energized.

18 Claims, 45 Drawing Sheets

(51) Int. Cl.
*H02K 19/10* (2006.01)
*H02K 1/14* (2006.01)

(56) References Cited

U.S. PATENT DOCUMENTS

| | | | | |
|---|---|---|---|---|
| 5,929,541 | A * | 7/1999 | Naito et al. | 310/12.18 |
| 6,972,504 | B1 * | 12/2005 | Hsu | 310/156.56 |
| 7,755,243 | B2 | 7/2010 | Mizutani et al. | |
| 2009/0045765 | A1 * | 2/2009 | Ichiyama | 318/538 |
| 2010/0019606 | A1 * | 1/2010 | Mizutani et al. | 310/181 |
| 2010/0071971 | A1 * | 3/2010 | Tatematsu et al. | 180/65.8 |
| 2010/0301695 | A1 * | 12/2010 | Yamada et al. | 310/156.01 |
| 2011/0058967 | A1 | 3/2011 | Arita et al. | |
| 2011/0210692 | A1 | 9/2011 | Nishihama et al. | |
| 2011/0241598 | A1 * | 10/2011 | Yamada et al. | 318/716 |

FOREIGN PATENT DOCUMENTS

| | | | |
|---|---|---|---|
| JP | 48-38310 | U | 5/1973 |
| JP | 48-57113 | | 8/1973 |
| JP | 52036710 | A | 3/1977 |
| JP | 5-176507 | A | 7/1993 |
| JP | 5-292716 | A | 11/1993 |
| JP | 8-331816 | A | 12/1996 |
| JP | 919095 | | 1/1997 |
| JP | 10-42497 | A | 2/1998 |
| JP | 10-136622 | A | 5/1998 |
| JP | 11-285189 | A | 10/1999 |
| JP | 2001-211573 | A | 8/2001 |
| JP | 2002247817 | A | 8/2002 |
| JP | 2004-350414 | A | 12/2004 |
| JP | 2006-050709 | A | 2/2006 |
| JP | 2008-043099 | A | 2/2008 |
| JP | 2009-273231 | A | 11/2009 |
| WO | 2009/139278 | A1 | 11/2009 |
| WO | 2010047173 | A1 | 4/2010 |

* cited by examiner

ROTARY ELECTRIC MACHINE

BACKGROUND OF THE INVENTION

The present invention relates to a rotary electric machine. Japanese Laid-Open Patent Publication No. 2008-43099 describes an example of a rotary electric motor in which a permanent magnet is omitted from a rotor and the rotor is magnetized by a field winding instead of a permanent magnet. With the rotary electric motor of Japanese Laid-Open Patent Publication No. 2008-43099, a field winding is arranged at a position close to a winding end (coil end) of a stator winding in an axial direction of a rotary shaft. Further, the field winding is energized to form a magnetic circuit passing through the rotary shaft, a rotor (a salient pole section), a stator, and a field yoke. An N-pole (a magnetic pole) is generated on the salient pole section of the rotor. Thus, with the rotary electric motor of Japanese Laid-Open Patent Publication No. 2008-43099, even in a structure in which a permanent magnet is omitted from the rotor, the rotary electric motor is able to operate in the same manner as a general permanent magnet synchronous motor.

With the rotary electric motor of Japanese Laid-Open Patent Publication No. 2008-43099, when the stator winding is formed by distributed winding, the amount of overhang of a winding end of the stator winding in the axial direction of the rotary shaft increases. In this case, due the overhanging of the winding end of the stator winding, the field winding must be separated from the stator in the axial direction of the rotary shaft. As a result, magnetic resistance of the magnetic circuit (magnetic flux path) may increase due to a longer length of the magnetic circuit.

SUMMARY OF THE INVENTION

It is an object of the present invention to provide a rotary electric machine capable of shortening a magnetic circuit that generates a magnetic pole on a magnetic salient pole of a rotor core.

One aspect of the present invention is a rotary electric machine including a rotor core, a stator, a field yoke, and a field winding. The rotor core is fixed to a rotary shaft, which includes a magnetic body that forms a magnetic path. The rotor core includes magnetic salient poles. The stator includes teeth and stator windings respectively wound around the teeth by concentrated winding. Each of the stator windings has two winding ends. A slot is formed between adjacent ones of the teeth in a circumferential direction. The field yoke magnetically connects the stator and the magnetic body. The field winding is located in proximity to at least one of the winding ends of the stator winding in an axial direction of the rotary shaft. The field winding generates a magnetic pole on the magnetic salient poles when energized.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE INVENTION

A first embodiment of a three-phase rotary electric motor according to the present invention will now be described with reference to FIGS. 1 and 2.

Figure 1:
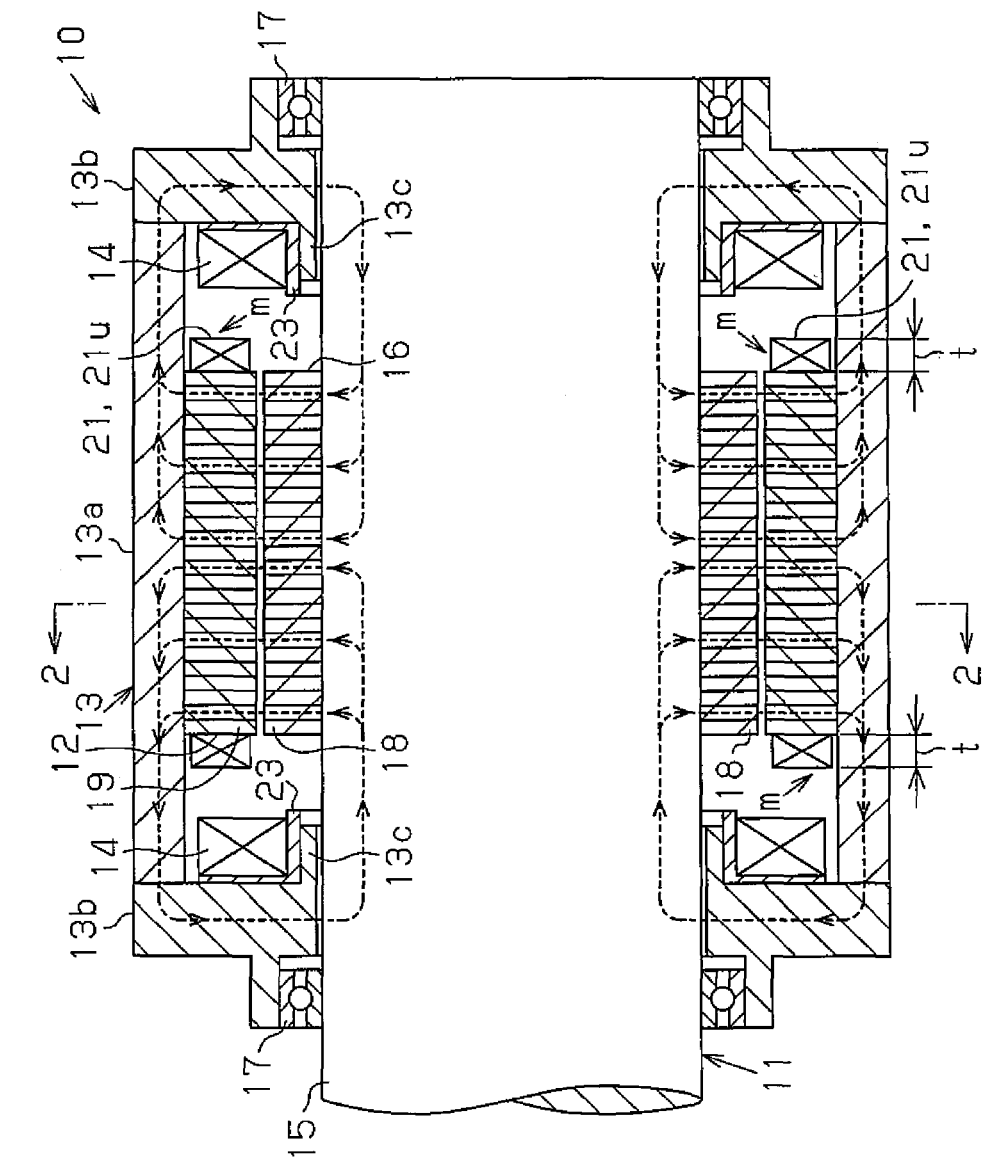
FIG. 1 is a schematic cross-sectional view of a rotary electric motor according to a first embodiment of the present invention.

As shown in FIG. 1, a rotary electric motor 10 serving as a rotary electric machine includes a rotor (rotating part) 11, a tubular stator 12 (stationary part) arranged on an outer side of the rotor 11, a field yoke 13 provided on an outer side of the stator 12, and a field winding 14 that magnetizes the rotor 11. The field yoke 13 also functions as a case of the rotary electric motor 10 and has a cylinder portion 13a that opposes an outer circumference of the stator 12 and a pair of disk portions 13b fixed to both ends of the cylinder portion 13a.

The rotor 11 has a rotor core 16 fixed to a rotary shaft 15 so as to be integrally rotatable with the rotary shaft 15. The rotary shaft 15 extends through the disk portions 13b and is rotatably supported by bearings 17. The rotary shaft 15 is formed of a magnetic material and functions as a magnetic body for forming a magnetic path along an axial direction. In the following description, the "radial direction" indicates a direction perpendicular to an axial direction of the rotary shaft 15 and the "axial direction" indicates the axial direction of the rotary shaft 15.

Figure 2:
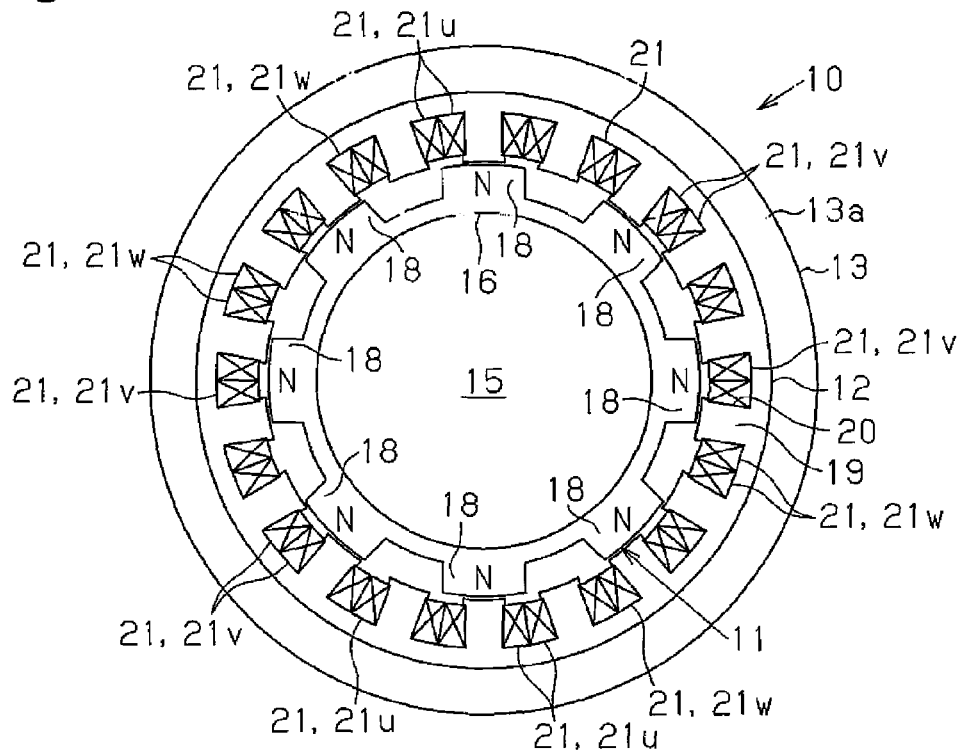
FIG. 2 is a schematic cross-sectional view taken along line 2-2 in FIG. 1.

As shown in FIG. 2, a plurality of protrusions that protrude in the radial direction are formed at regular intervals in a circumferential direction on the rotor core 16. Each of the protrusions forms a magnetic salient pole 18. A "magnetic salient pole" refers to a portion where a magnetic flux flows readily from an inner side to an outer side of the rotor 11. The present embodiment includes eight magnetic salient poles 18, and each magnetic salient pole 18 extends along an entire length of the rotor core 16 in the axial direction. In the present embodiment, a space is respectively formed between the magnetic salient poles 18 in a circumferential direction. As shown in FIG. 1, the rotor core 16 is formed by laminating a plurality of (for example, several ten) magnetic steel sheets, and a magnetic resistance in the axial direction is greater than magnetic resistances in the radial direction and the circumferential direction. Thus, in the rotor core 16, a magnetic flux flows less readily in the axial direction and more readily in the radial direction and the circumferential direction.

In addition, the stator 12 is formed in an approximately cylindrical shape by laminating a plurality of magnetic steel sheets, and magnetic resistances of the stator 12 in the radial direction and the circumferential direction are lower than a magnetic resistance in the axial direction. Thus, in the stator 12, a magnetic flux flows more readily in the radial direction and the circumferential direction of the stator 12 and less readily in the axial direction.

As shown in FIG. 2, slots 20 are provided at regular intervals at an inner side of the stator 12 so that teeth 19 are formed at regular intervals in the circumferential direction. The present embodiment includes eighteen teeth 19 and eighteen slots 20.

A U-phase winding 21u, a V-phase winding 21v, and a W-phase winding 21w, serving as stator windings 21, are wound in concentrated windings around the teeth 19. In this case, concentrated winding refers to a structure in which windings are wound around each tooth 19 in a concentrated manner, and allows windings to be directly wound around each tooth 19. Thus, as shown in FIG. 1, in the stator of the present embodiment, windings with different phases do not overlap each other and an overhang amount t of a winding end (coil end) m from the teeth 19 in the axial direction is small. In contrast, distributed winding is a structure in which each winding is arranged so as to extend over the plurality of teeth 19. Since connecting wires overlap each other, the overhang amount t of the winding end (coil end) m from the teeth 19 in the axial direction increases. The overhang amount t of the winding end m of the stator winding 21 according to the present embodiment is smaller by approximately 20% to 50% compared to when the stator winding 21 is wound by distributed winding.

An annular protruding bar 13c is formed so as to protrude toward the rotor core 16 on both disk portions 13b of the field yoke 13. A bobbin 23 having an outer circumferential portion wound by the field winding 14 is fitted and fixed to the protruding bar 13c. In other words, the field winding 14 is arranged at parts close to both winding ends m of the stator winding 21. The "part close to the winding end" refers to a part more outward in the axial direction of the rotary shaft 15 than an end portion of a tooth 19. The protruding bar 13c and the bobbin 23 form a field winding wound portion wound with the field winding 14 for generating a magnetic pole (an N-pole or an S-pole) on the magnetic salient pole 18 by energization. In the present embodiment, field windings 14 are arranged at corresponding positions in the axial direction of the stator winding 21.

The present embodiment is adapted such that when a current is supplied to each field winding 14, a magnetic circuit in which all the magnetic salient poles 18 of the rotor core 16 become the same magnetic poles (N-poles) is formed between the field yoke 13 and the rotor core 16. More specifically, at one of the field windings 14 positioned on the left hand-side in FIG. 1, a magnetic flux is generated so as to enter the annular field winding 14 from a left hand-side toward an inner circumferential side and to exit the field winding 14 from a right hand-side to the outside. In addition, at the other field winding 14 positioned on the right hand-side in FIG. 1, a magnetic flux is generated so as to enter the annular field winding 14 from the right hand-side toward an inner circumferential side and to exit the field winding 14 from the left hand-side to the outside. As a result, paths of magnetic fluxes generated from both field windings 14 proceed in a direction to face each other inside the rotary shaft 15, travel from an inner side of the rotor core 16 through the inside of the magnetic salient pole 18 into the teeth 19 of the stator 12, travel through the cylinder portion 13a and the disk portions 13b of the field yoke 13, and once again enters the rotary shaft 15. In this manner, the stator 12 and the rotary shaft 15 are magnetically connected (coupled) to each other by the field yoke 13.

The operation of the rotary electric motor 10 will now be described.

The rotary electric motor 10 is used in a state in which the U-phase winding 21u, the V-phase winding 21v, and the W-phase winding 21w are connected to a three-phase inverter and the field winding 14 is connected to a direct-current power source. A control unit controls the amount of control current output from the three-phase inverter and the amount of a current supplied to the field winding 14 from the direct-current power source.

When a direct current is supplied to the field winding 14, as indicated by arrows in the broken lines in FIG. 1, a magnetic circuit is formed in which a magnetic flux (a line of magnetic force) generated from the field winding 14 travels along a path from the disk portion 13b of the field yoke 13, the rotary shaft 15, the rotor core 16, the magnetic salient pole 18, the stator 12, the cylinder portion 13a of the field yoke 13, to the disk portion 13b of the field yoke 13. As a result, the rotor 11 becomes a monopole in a state where an excitation current is supplied to the field winding 14. In other words, as shown in FIG. 2, end portions close to the stator 12 of the magnetic salient poles 18 formed in plurality on the rotor core 16 all become N-poles and the stator 12 becomes a monopole.

A three-phase alternating current with a predetermined frequency is sequentially supplied to the U-phase winding 21u, the V-phase winding 21v, and the W-phase winding 21w of the stator 12 to generate a rotating magnetic field at the stator 12, and the rotating magnetic field acts on the rotor 11. Due to a magnetic attractive force and repulsive force between the rotating magnetic field and the magnetic salient pole 18, the rotor 11 synchronizes with the rotating magnetic field and rotates. In addition, by adjusting the amount of current supplied to the field winding 14, the amount of generated magnetic flux can be adjusted. Thus, by adjusting the amount of current supplied to the field winding 14, field magnetic flux control can be performed at will including so-called "field weakening control" and "field strengthening control".

The present embodiment has the advantages described below.

(1) The stator windings 21 (the U-phase winding 21u, the V-phase winding 21v, and the W-phase winding 21w) are wound around the teeth 19 by concentrated winding. Thus, overhanging of the winding end m of the stator winding 21 in the axial direction can be suppressed. As a result, the field winding 14 can be arranged in closer proximity to the stator 12 compared when the stator winding 21 is wound by distributed winding. Consequently, a magnetic circuit formed by the rotary shaft 15, the rotor core 16, the magnetic salient pole 18, the stator 12, the field yoke 13 (the cylinder portion 13a and the disk portions 13b) can be shortened.

(2) A magnetic circuit that generates a magnetic pole on each magnetic salient pole 18 when a direct current is supplied to the field winding 14 can be shortened. Thus, the magnetic resistance of the magnetic circuit can be reduced. As a result, a magnetic flux loss can be suppressed and the efficiency (output) of the rotary electric motor 10 can be enhanced. In other words, the amount of field current or a volume of the field winding 14 can be reduced.

(3) In addition, an increase in an overhang of the winding end m of the stator winding 21 can also be suppressed in the radial direction. Thus, an increase in size of the rotary electric motor 10 in the radial direction can be suppressed. Further, when the size of the rotary electric motor 10 in the radial direction (an outer diameter of the cylinder portion 13a of the field yoke 13) is kept constant, a reduction in a cross-sectional area of the field yoke 13 in the radial direction and a decrease in an amount of magnetic flux that can pass through the field yoke 13 can be suppressed.

(4) The field winding 14 is arranged at parts close to both winding ends m of the stator winding 21. Thus, the output of the rotary electric motor 10 can be increased compared to when the field winding 14 is only arranged at a part close to one of the winding ends m.

(5) The rotary shaft is formed of a magnetic material and the rotary shaft is used as a magnetic body for forming a magnetic circuit. Thus, the number of parts can be reduced and the rotary electric motor 10 can be manufactured in a simple manner.

The present invention is not limited to the embodiment described above and may be embodied as described below.

Figure 3:
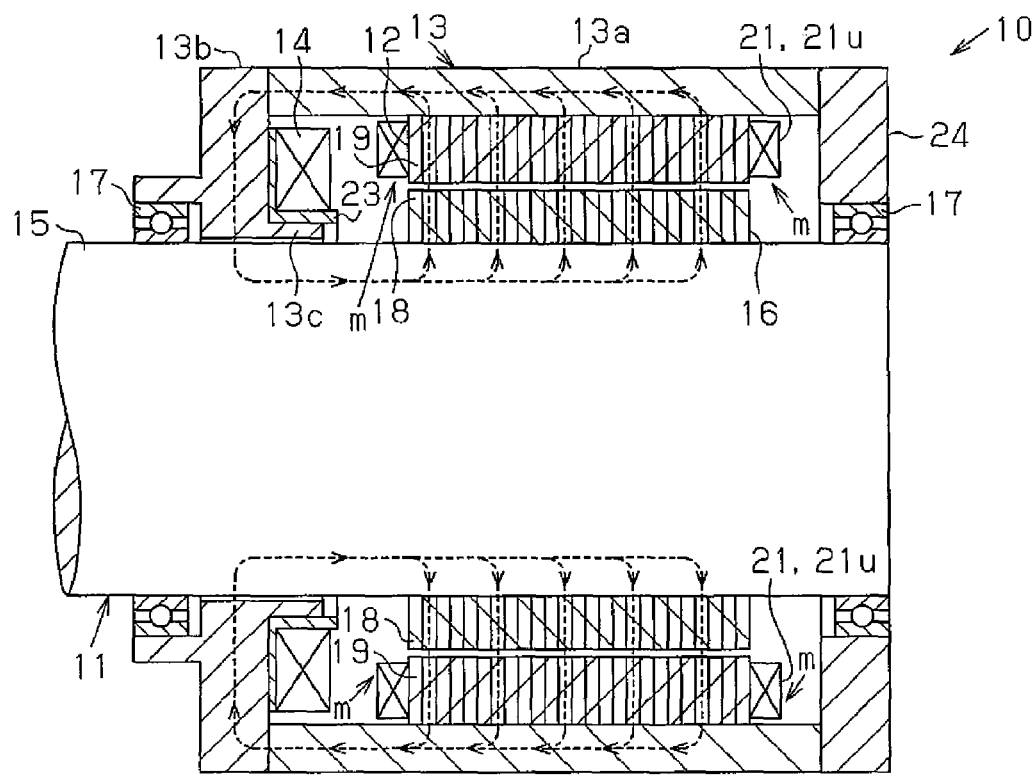
FIG. 3 is a schematic cross-sectional view of a rotary electric motor according to another example of the first embodiment.

The rotary electric motor 10 may be formed such that the field winding 14 is provided only on a part close to one of the winding ends m of the stator winding 21. For example, as shown in FIG. 3, in the field yoke 13, the disk portion 13b is only provided on a side of one end of the cylinder portion 13a, and a supporting disk 24 formed of a non-magnetic material is provided on a side of the other end. Together with the field yoke 13, the supporting disk 24 forms a case of the rotary electric motor 10 and supports the other end of the rotary shaft 15 with the bearing 17. In this embodiment, when a current is supplied to the field winding 14, a magnetic circuit is formed in which a magnetic flux travels along a path from the disk portion 13b of the field yoke 13, the rotary shaft 15, the rotor core 16, the magnetic salient pole 18, the stator 12, the cylinder portion 13a of the field yoke 13, to the disk portion 13b of the field yoke 13, and each magnetic salient pole 18 becomes an N-pole. In this case, unlike the embodiment in which field windings 14 are provided at both ends of the cylinder portion 13a, the cross-sectional area of the cylinder portion 13a necessary for a magnetic flux to flow through each magnetic salient pole 18 and return to the disk portion 13b via the cylinder portion 13a becomes two times larger.

Figure 4:
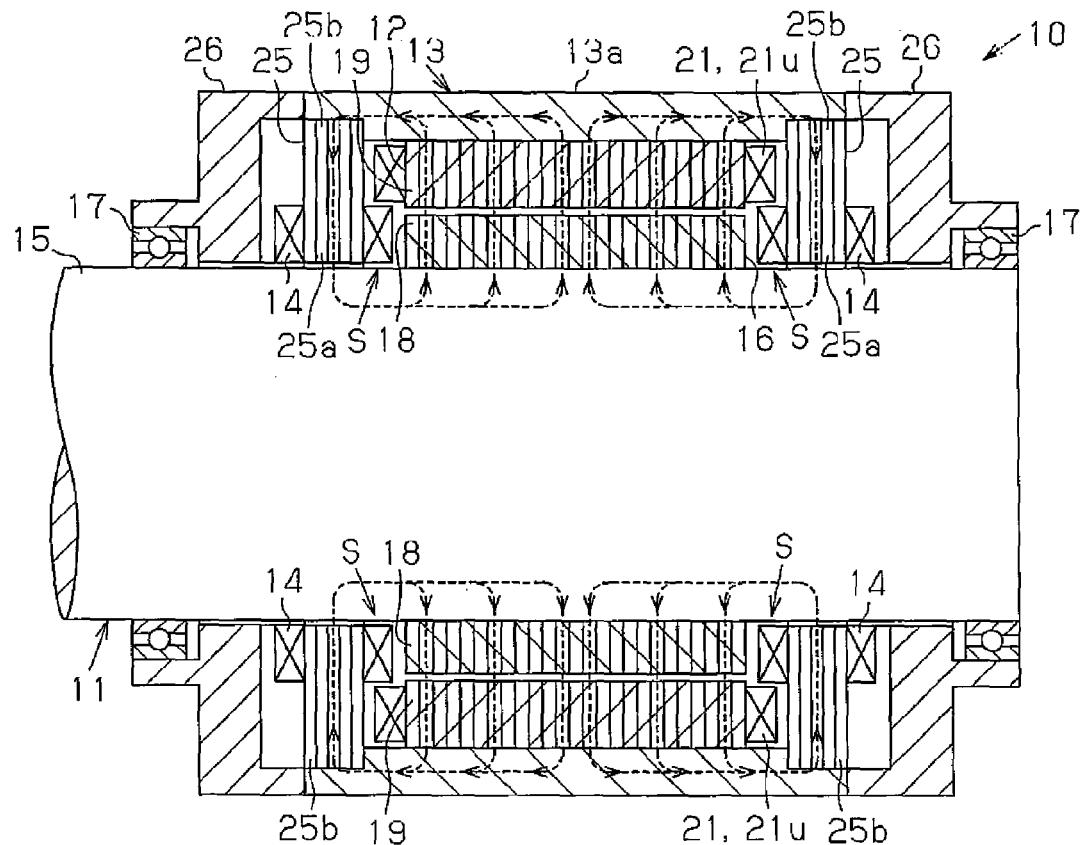
FIG. 4 is a schematic cross-sectional view of a rotary electric motor according to another example of the first embodiment.
Figure 5:
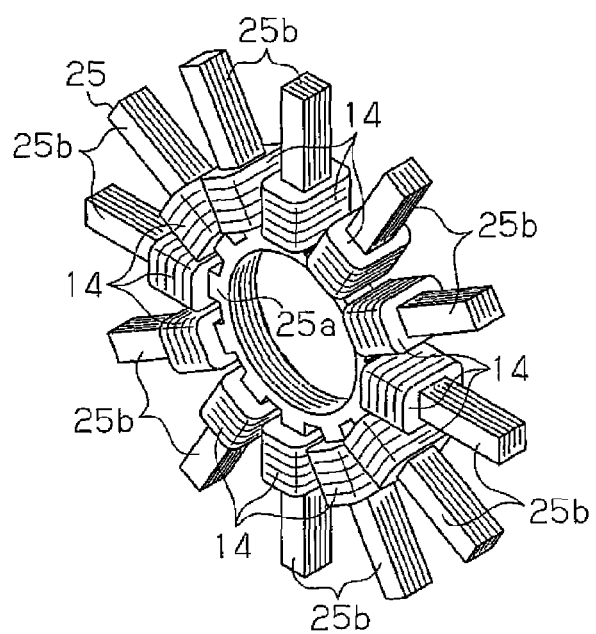
FIG. 5 is a schematic perspective view of a field pole core according to another example of the first embodiment.

A part of or all of the field winding 14 may be arranged in a space S formed between the stator winding 21 and the rotary shaft 15 in the radial direction. For example, as shown in FIGS. 4 and 5, in place of the disk portions 13b, the field yoke 13 may include an annular portion 25a, which is formed in an annular shape and into which the rotary shaft 15 is inserted, and a field pole core 25 including a plurality of arm portions 25b that extend radially outward in a radial direction from the annular portion 25a (a part in a vicinity of the rotary shaft 15). The arm portions 25b are formed at regular intervals in a circumferential direction. The field pole core 25 is formed by laminating a plurality of magnetic steel sheets, and magnetic resistances of the field pole core 25 in the radial direction and the circumferential direction are lower than a magnetic resistance in the axial direction. Thus, in the field pole core 25, magnetic flux flows more readily in the radial direction and the circumferential direction and less readily in the axial direction of the field pole core 25. A distal part of each arm portion 25b is fixed to an end portion of the cylinder portion 13a and is arranged so that an inner circumferential surface of the annular portion 25a faces an outer circumferential surface of the rotary shaft 15. The field winding 14 is wound around each arm portion 25b so that the field winding 14 is positioned more inward in the radial direction than the stator winding 21. In other words, each arm portion 25b forms a field winding wound portion wound with the field winding 14. Supporting disks 26 formed of a non-magnetic material are provided at both ends of the field yoke 13. Together with the field yoke 13 (cylinder portion 13a), the supporting disk 26 forms a case of the rotary electric motor 10, and supports both ends of the rotary shaft 15 with the bearing 17. In this embodiment, when a current is supplied to the field winding 14, as indicated by arrows in the broken lines in FIG. 4, a magnetic circuit is formed in which a magnetic flux travels along a path of the arm portion 25b of the field pole core 25, the annular portion 25a, the rotary shaft 15, the rotor core 16, the magnetic salient pole 18, the stator 12, the cylinder portion 13a of the field yoke 13, and the arm portion 25b, and each magnetic salient pole 18 becomes an N-pole. In this embodiment, a magnetic circuit (a magnetic flux path) for generating a magnetic pole (an N-pole or an S-pole) on each magnetic salient pole 18 can be shortened and magnetic resistance can be further reduced. In addition, even when increasing the number of windings of each field winding 14, the field winding 14 can be extended in the radial direction. Thus, an increase in size of the field winding 14 in the axial direction and an increase in length of the magnetic circuit for generating polarity on each magnetic salient pole 18 due to an increase in the number of windings of the field winding 14 can be suppressed.

The number Pn of magnetic salient poles 18 and the number Ps of slots 20 may be changed as required. For example, Pn=10 and Ps=24 may be adopted.

Figure 6:
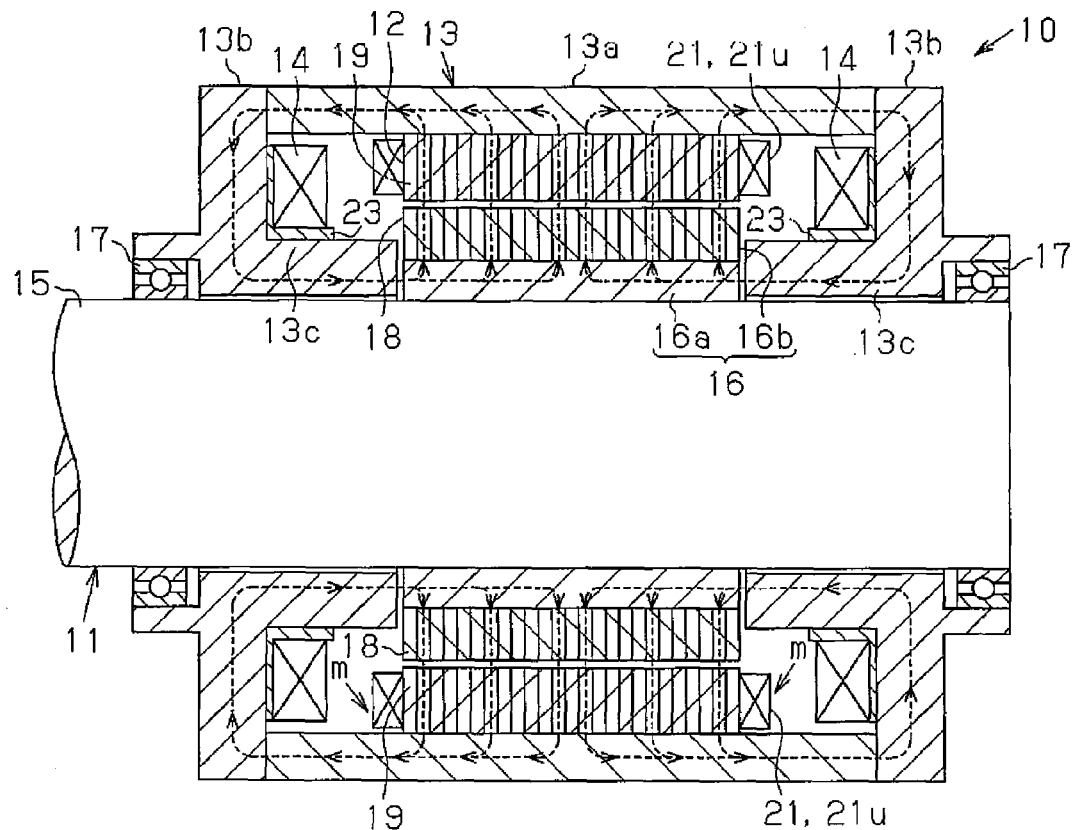
FIG. 6 is a schematic cross-sectional view of a rotary electric motor according to another example of the first embodiment.

As shown in FIG. 6, the rotor core 16 may be formed by a cylindrical core 16a, which is formed to have a cylindrical shape and which is installed securely on the rotary shaft 15, and a laminated rotor core 16b, which is arranged on an outer circumference of the cylindrical core 16a. A distal end of the protruding bar 13c may be extended to a vicinity of an end surface of the cylindrical core 16a, and a thickness of the protruding bar 13c may be increased while a diameter of the rotary shaft 15 may be reduced accordingly. The magnetic salient pole 18 is formed on the laminated rotor core 16b. In addition, the cylindrical core 16a is formed of an integral magnetic material such as soft magnetic composites (SMC). The soft magnetic composites have a lower magnetic resistance than that of the laminated rotor core 16b or the rotary shaft 15. In this case, a magnetic flux generated at the field winding 14 flows more readily in the cylindrical core 16a than through the rotary shaft 15, and a magnetic circuit (magnetic flux path) is shortened compared to when the magnetic flux flows through the rotary shaft 15. As a result, the amount of field current or a volume of the field winding 14 can be reduced. In addition, while a magnetic flux less readily flows in the axial direction and more readily flows in the radial direction and the circumferential direction in the laminated rotor core 16b, a magnetic flux flows in the axial direction more readily in the cylindrical core 16a than in the laminated rotor core 16b. Thus, compared to a structure not including the cylindrical core 16a, the magnetic flux path flows more readily in a dispersed manner through all magnetic steel sheets forming the laminated rotor core 16b.

Figure 7:
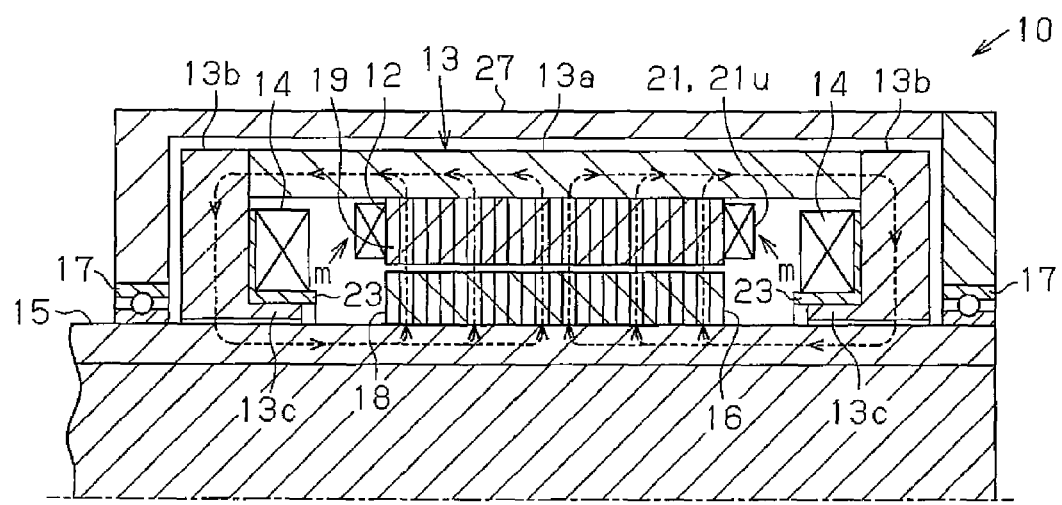
FIG. 7 is a schematic cross-sectional view of a rotary electric motor according to another example of the first embodiment.

As shown in FIG. 7, the rotary shaft 15 may be formed as a two-part structure including an inner circumferential part and an outer circumferential part having a lower magnetic resistance than a magnetic resistance of the inner circumferential part. In this case, when a current is supplied to the field winding 14 and a magnetic flux generated from the field winding 14 flows toward the rotor core 16, a magnetic circuit (a magnetic flux path) is shortened because the magnetic flux flows through the outer circumferential part of the rotary shaft 15 which has a low magnetic resistance. As a result, the amount of field current or volume of the field winding 14 can be reduced. In this case, the outer circumferential part of the rotary shaft 15 forms a magnetic body. For example, the magnetic body in this case may be soft magnetic composites or an iron mass.

As shown in FIG. 7, a dedicated case 27 may be provided for the rotary electric motor 10, and the rotary shaft 15 may be supported by the dedicated case 27 by the bearings 17. In this case, the shape of the disk portions 13b of the field yoke 13 is simplified. In addition, the case 27 has greater flexibility in terms of shape and material compared to when the field yoke 13 also functions as the case 27. Although FIG. 7 shows the rotary shaft 15 with a two-part structure, the use of the dedicated case 27 is not limited to a two-part structure.

Figure 8:
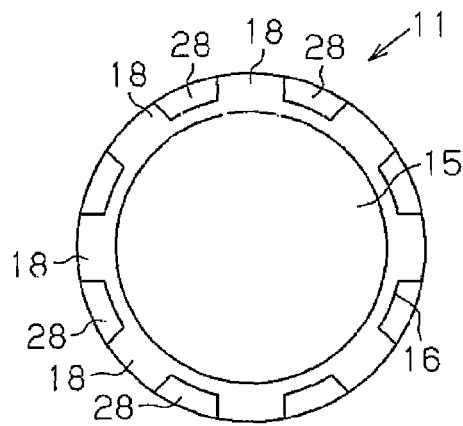
FIG. 8 is a schematic cross-sectional view of a rotor according to another example of the first embodiment.
Figure 9:
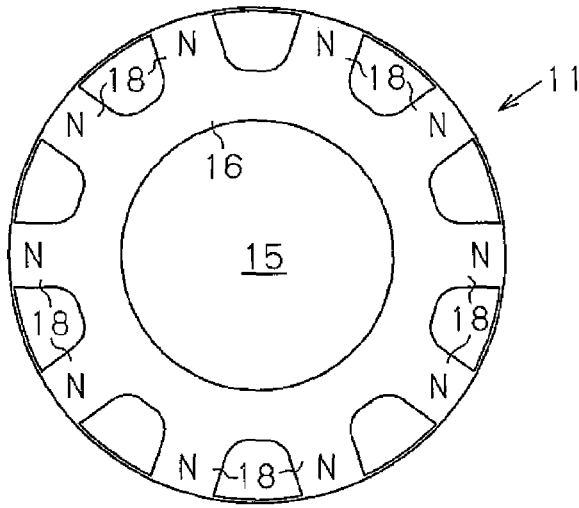
FIG. 9 is a schematic cross-sectional view of a rotor according to another example of the first embodiment.

The shape of the rotor core 16 is not limited to a shape having protrusions that become the magnetic salient poles 18. For example, as shown in FIG. 8, a portion of a shape having protrusions at regular intervals may be formed of a magnetic material and spaces between the protrusions may be filled with a non-magnetic material 28 to create a rotor core 16 with an overall flat shape. In addition, as shown in FIG. 9, only distal ends of the protrusions may be connected to distal ends of adjacent protrusions as long as the protrusions substantially become the magnetic salient poles 18.

While the rotor core 16 is formed by laminating magnetic steel sheets, alternatively, the rotor core 16 may be formed of an iron mass or soft magnetic composites.

Figure 10:
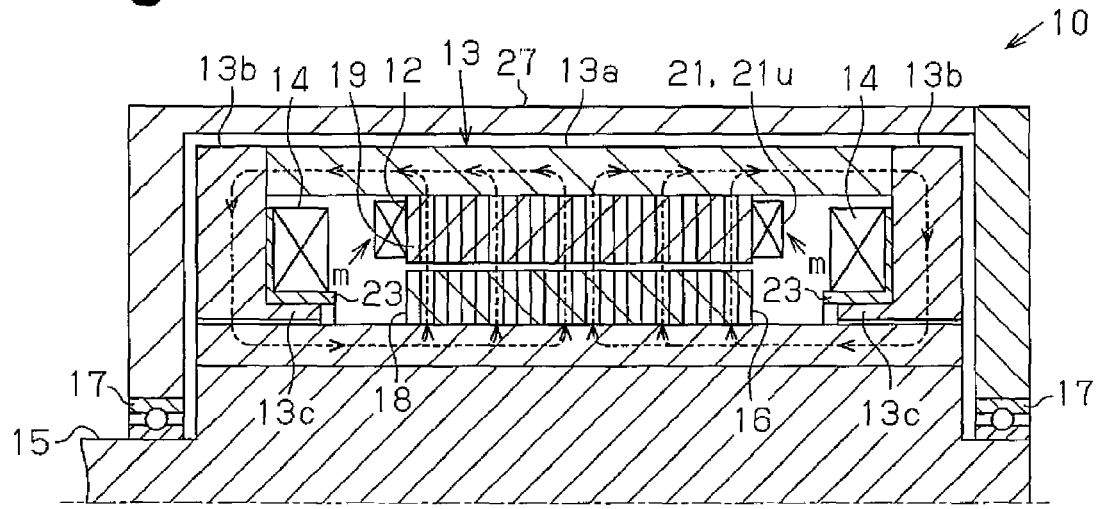
FIG. 10 is a schematic cross-sectional view of a rotary electric motor according to another example of the first embodiment.

As shown in FIG. 10, a diameter of the rotary shaft 15 may be narrowed at portions supported by the bearings 17. In this case, diameters of the bearings 17 can be reduced.

Instead of providing the bobbin 23, the field winding 14 may be directly wound around an outer circumference of the protruding bar 13c to have the protruding bar 13c form a field winding wound portion.

For the U-phase winding 21u, the V-phase winding 21v, and the W-phase winding 21w, instead of having parts of two stator windings 21 housed in a single slot 20, part of one stator winding 21 may be housed in a single slot 20.

When the rotor 11 is a monopole, end portions facing the stator 12 of the magnetic salient poles 18 may all be S-poles instead of N-poles.

The magnetic salient poles 18 may be shorter than the entire length of the rotor core 16 instead of being extended over the entire length of the rotor core 16.

The rotary electric motor 10 is not limited to being driven by a three-phase alternating current, and may alternatively be driven by a single-phase alternating current, a two-phase alternating current, or a polyphase alternating current of four or more phases.

The rotary electric motor 10 may be applied to an outer rotor-type rotary electric motor.

The rotary electric motor 10 may be applied to a generator instead of an electric motor.

Figure 11A:
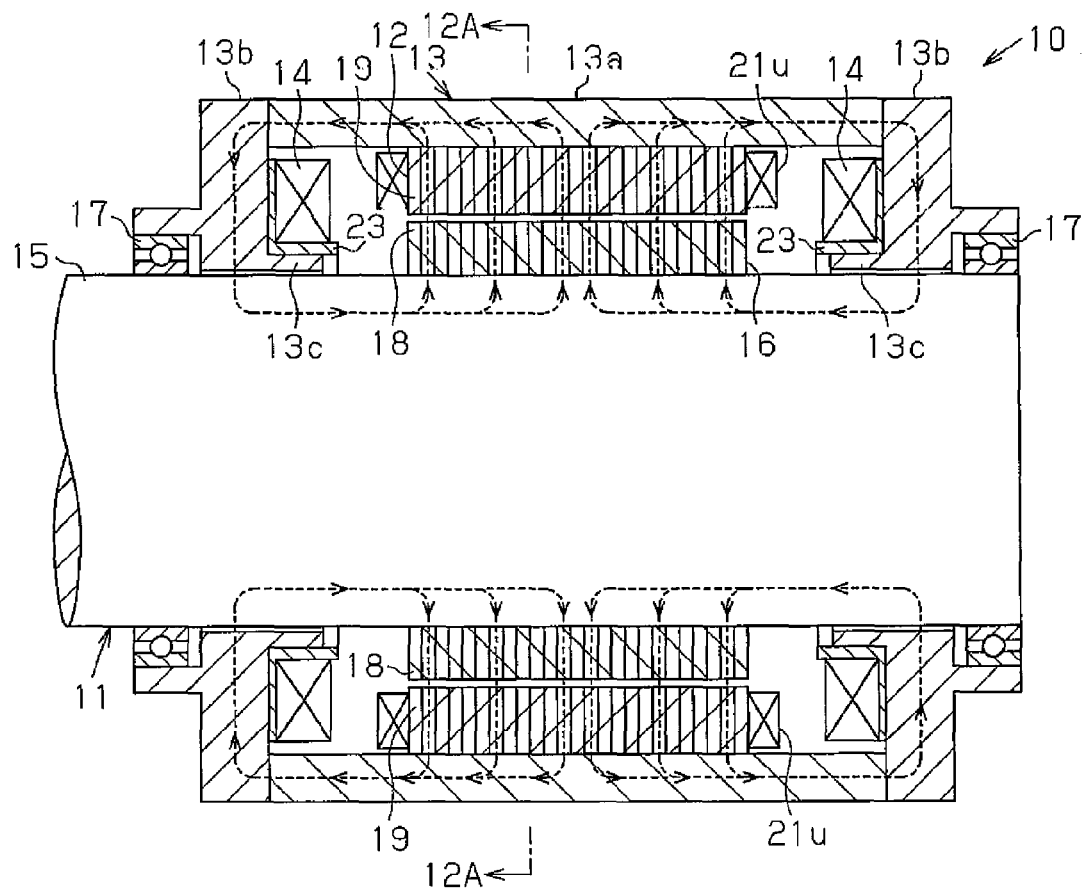
FIG. 11A is a schematic cross-sectional view of a rotary electric motor according to a second embodiment of the present invention.

A second embodiment of the present invention will now be described with reference to FIGS. 11A to 16. The structure of a rotary electric motor 10 shown in FIG. 11A is the same as the structure of the first embodiment shown in FIG. 1. Thus, descriptions overlapping the descriptions of the first embodiment will not be repeated below.

Figure 11B:
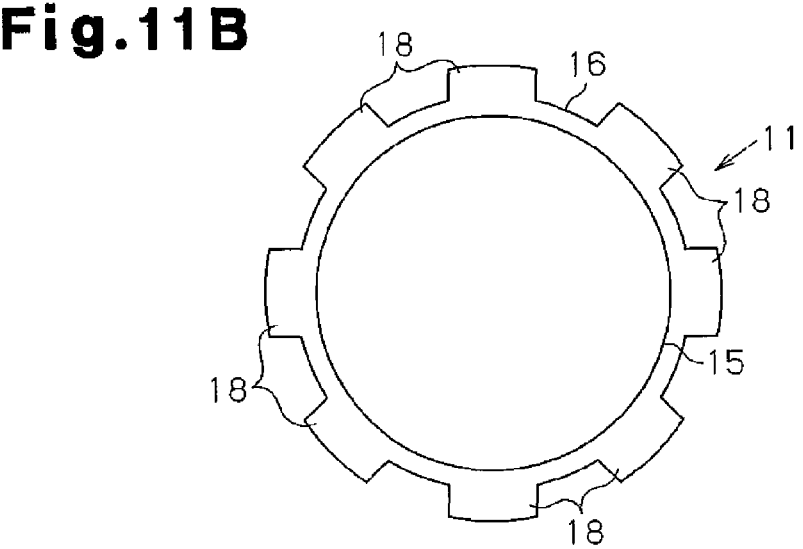
FIG. 11B is a front view of a rotor shown in FIG. 11A.

As shown in FIG. 11B, in a rotor core 16, protrusions that protrude in a radial direction are formed at regular intervals in a circumferential direction, and the protrusions form magnetic salient poles 18. The plurality of magnetic salient poles 18 are arranged rotationally symmetrically about the rotary shaft 15 when the rotor core 16 is viewed from an axial direction.

Teeth 19 and slots 20 are arranged rotationally symmetrically about the rotary shaft 15 when a stator 12 is viewed from the axial direction. In the second embodiment, eighteen teeth 19 and eighteen slots 20 are arranged in the same manner as in the first embodiment. Thus, when Pn represents the number of the magnetic salient poles 18 of the rotor core 16, and Ps represent the number of the slots 20 of the stator 12, then Pn=8 and Ps=18 are obtained. Thus, Pn and Ps have a common divisor other than 1 and, at the same time, Pn:Ps satisfies 4:9.

Figure 12A:
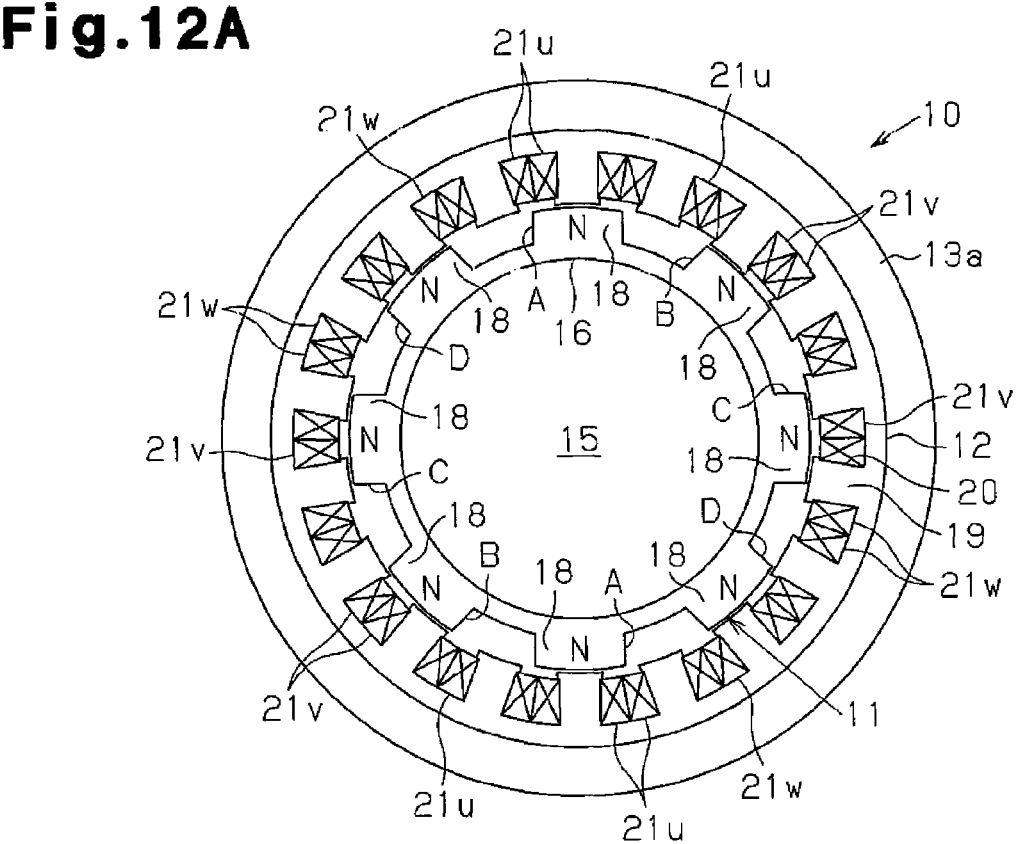
FIG. 12A is a schematic cross-sectional view taken along line 12A-12A in FIG. 11A.
Figure 12B:
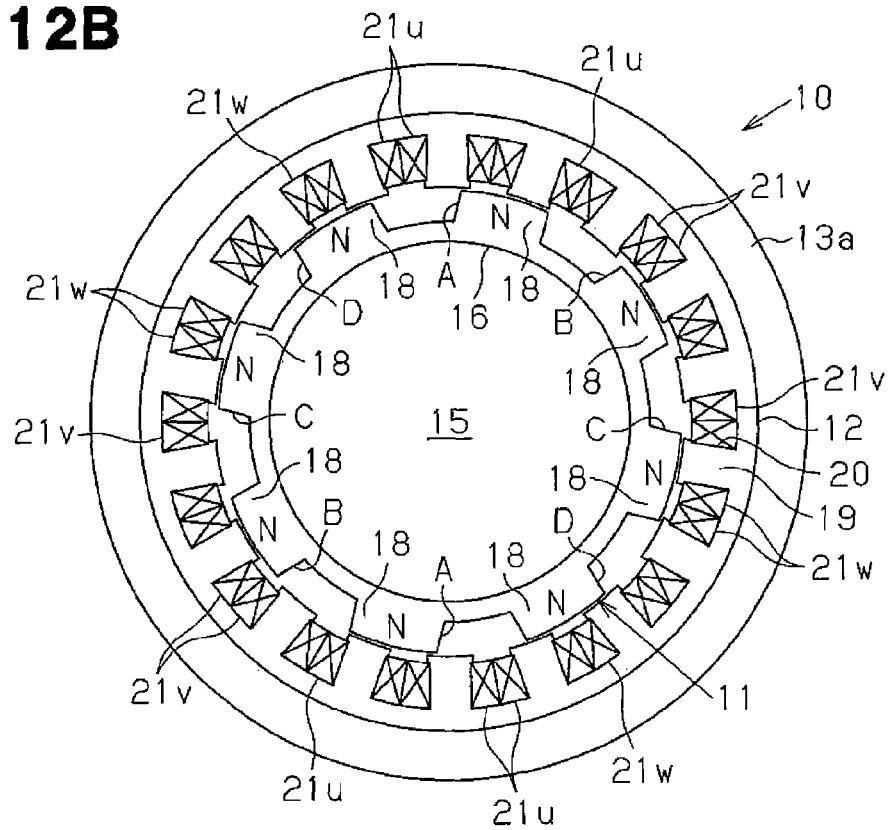
FIG. 12B is a schematic cross-sectional view showing a state where a rotor has rotated from a state shown in FIG. 12A.

A U-phase winding 21u, a V-phase winding 21v, and a W-phase winding 21w are wound around the teeth 19 in a clockwise order of the U-phase, the V-phase, and the W-phase in FIGS. 12A and 12B so that three adjacent teeth 19 are wound by a winding of the same phase. Thus, a phase arrangement of the U-phase winding 21u, the V-phase winding 21v, and the W-phase winding 21w that form a stator winding is set to be rotationally symmetric about the rotary shaft 15.

The operation of the rotary electric motor 10 in the second embodiment will now be described.

As shown in FIG. 12A, each pair of magnetic salient poles 18 that form an 180-degree mechanical angle represented by A is arranged so as to face a central tooth 19 among the three adjacent teeth 19 respectively wound by the U-phase winding 21u. The other three pairs of the magnetic salient poles 18, each forming a 180-degree mechanical angle, and the teeth 19 also have the same positional relationship. More specifically, each pair of the magnetic salient poles 18 represented by B faces a tooth 19 close to the teeth 19 wound by the U-phase winding 21u among the three adjacent teeth 19 wound by the V-phase winding 21v. Each pair of magnetic salient poles 18 represented by C faces a tooth 19 close to the teeth 19 wound by the W-phase winding 21w among the three adjacent teeth 19 wound by the V-phase winding 21v and a tooth 19 close to the teeth 19 wound by the V-phase winding 21v among the three adjacent teeth 19 respectively wound by the W-phase winding 21w. Each pair of magnetic salient poles 18 represented by D faces a tooth 19 close to the teeth 19 wound by the U-phase winding 21u among the three adjacent teeth 19 wound by the W-phase winding 21w. Thus, in this state, a force in a radial direction that acts on each of the pairs of magnetic salient poles 18 represented by A, B, C, and D and forming an 180-degree mechanical angle is the same for each pair of the magnetic salient poles 18, and a radial force acting on the rotary shaft 15 is balanced.

Further, when the rotor 11 is rotated by an arbitrary angle from the state shown in FIG. 12A to, for example, to the state shown in FIG. 12B, the positional relationship of the pairs of magnetic salient poles 18 represented by A, B, C, and D and forming an 180-degree mechanical angle, the teeth 19, and a phase arrangement of the stator winding becomes the same for each pair of the magnetic salient poles 18. Further, a radial force acting on the rotary shaft 15 becomes balanced.

Even when the magnetic salient poles 18 and the teeth 19 are arranged rotationally symmetrically about the rotary shaft 15 and a phase arrangement of the stator winding is set to be rotationally symmetric about the rotary shaft 15, a radial force acting on the rotary shaft 15 becomes imbalanced when the number Pn of magnetic salient poles 18 and the number Ps of slots 20 of the stator 12 have no common divisors other than 1.

Figure 13:
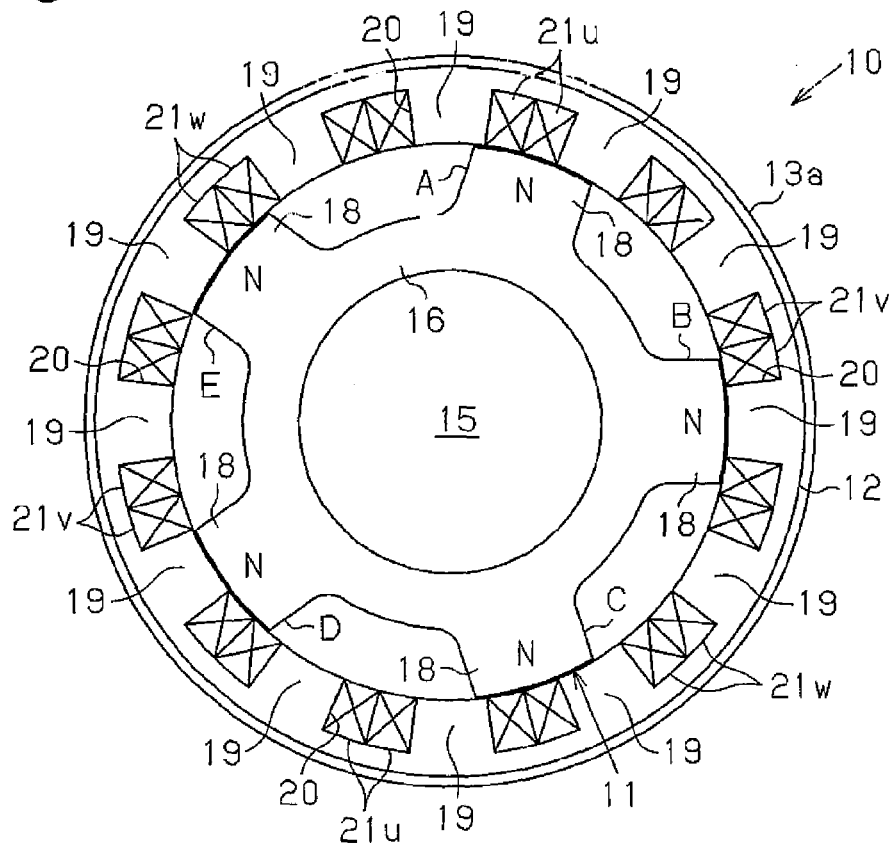
FIG. 13 is a schematic cross-sectional view of a rotary electric motor according to a reference example.

For example, a case of Pn=5 and Ps=12 is shown in FIG. 13. While the magnetic salient poles 18 are rotationally symmetric at 360/5 degrees and the teeth 19 (phase arrangement) are rotationally symmetric at 360/2 degrees, Pn and Ps do not have any common divisors other than 1. In a state shown in FIG. 13, positional relationships between the magnetic salient poles 18 represented by A, B, C, D, and E and the teeth 19 wound by the U-phase winding 21u, the V-phase winding 21v, and the W-phase winding 21w differ from each other and a radial force acting on the rotary shaft 15 is unbalanced.

Figure 14:
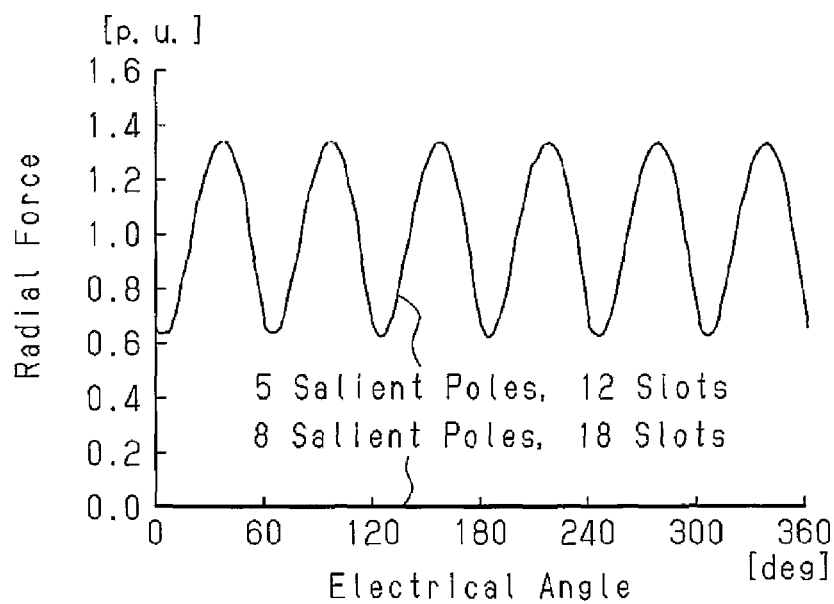
FIG. 14 is a graph showing a variation in radial force.

FIG. 14 shows simulation results of a radial force acting on the rotary shaft 15 in a case of Pn=8, Ps=18 (eight salient poles and eighteen slots) and in a case of Pn=5, Ps=12 (five salient poles and twelve slots). In FIG. 14, a value of an ordinate representing radial force indicates a value relative to a mean value of the radial force. A mean value of 1.0 is obtained.

As shown in FIG. 14, in the case of eight salient poles and eighteen slots which represent the rotary electric motor 10 according to the second embodiment, it has been confirmed that a radial force of 0 acts over an electrical angle range of 0 degree to 360 degrees or, in other words, a radial force in a specific direction does not act on the rotary shaft 15. In other words, it has been confirmed that the radial force acting on the rotary shaft 15 is not unbalanced. On the other hand, in the case of a comparison example shown in FIG. 13 or, in other words, in a case of 5 salient poles and 12 slots, it has been confirmed that a radial force in a specific direction fluctuates in 60-degree cycles over an electrical angle range of 0 degrees to 360 degrees.

The present embodiment has the advantages described below.

(6) The rotary electric motor 10 includes a rotor 11 and a stator 12. The rotor 11 is fixed to the rotary shaft 15 so as to be integrally rotatable with the rotary shaft 15 and has a rotor core 16. Magnetic salient poles 18 are formed at regular intervals in the circumferential direction on the rotor core 16. The stator 12 is formed to have a cylindrical shape and arranged on an outer circumferential side of the rotor core 16. The teeth 19 wound by a stator winding by concentrated winding are formed at regular intervals on an inner circumferential surface of the stator 12. In addition, the rotary electric motor 10 includes a field yoke 13 provided on an outer circumference of the stator 12 and a field winding 14 for forming a magnetic circuit that causes the rotor 11 to become a monopole. The magnetic salient poles 18 and the teeth 19 are respectively arranged rotationally symmetrically, a phase arrangement of the stator winding is set to be rotationally symmetric, and the number Pn of the magnetic salient poles 18 and the number Ps of slots 20 of the stator 12 have a common divisor other than 1. This eliminates unbalanced radial force applied to the rotary shaft 15.

(7) The stator winding (a U-phase winding 21u, a V-phase winding 21v, and a W-phase winding 21w) are excited by a three-phase alternating current. Accordingly, a structure for generating a rotating magnetic field that generates a torque on the rotor core 16 may be simplified in the same manner as a generally-used three-phase rotary electric motor.

(8) In the rotary electric motor 10, the number Pn of the magnetic salient poles 18 is set to eight and the number Ps of the slots 20 of the stator 12 is set to eighteen. Thus, Pn and Ps have a common divisor other than 1 and Pn:Ps satisfies 4:9. Thus, a favorable torque balance can be achieved.

(9) Since field windings 14 are respectively provided at both end portions of the field yoke 13, a cross-sectional area of the cylinder portion 13a necessary for having a predetermined amount of magnetic flux flow through each magnetic salient pole 18 in a smooth manner can be reduced. This contributes to downsizing of the rotary electric motor 10.

(10) A field winding wound portion is formed by fitting and fixing a bobbin 23 into an annular protruding bar 13c formed on a disk portion 13b. Thus, since the bobbin 23 wound to the field winding 14 can be fixed to the protruding bar 13c, a winding operation of the field winding 14 can be simplified compared to when the field winding 14 is directly wound around the protruding bar 13c provided on the disk portion 13b so as to project from the disk portion 13b.

The second embodiment is not limited to that described above and may be embodied as follows.

Figure 15:
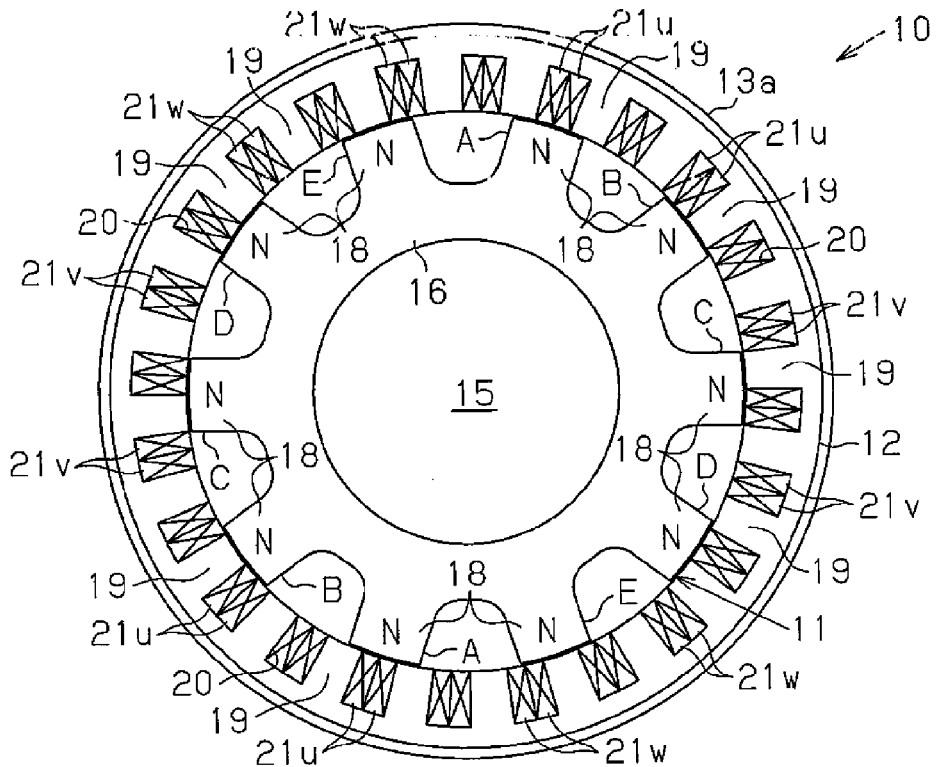
FIG. 15 is a schematic cross-sectional view corresponding to FIG. 12B of a rotary electric machine according to another example of the second embodiment.

As long as the magnetic salient poles 18 and the teeth 19 are arranged rotationally symmetrically, a phase arrangement of the stator winding is set to be rotationally symmetric, and the number Pn of the magnetic salient poles 18 and the number Ps of slots 20 of the stator 12 have a common divisor other than 1, a combination of the number Pn of the magnetic salient poles 18 and the number Ps of slots 20 is not limited to Pn=8, Ps=18. For example, with the rotary electric motor 10 shown in FIG. 13 in which the number Pn of the magnetic salient poles 18 is set to five and the number Ps of slots 20 is set to twelve, Pn and Ps do not have a common divisor other than 1 and a radial force applied to the rotary shaft 15 becomes unbalanced. However, by adopting a combination in which Pn and Ps has a common divisor other than 1, the unbalance of the radial force applied to the rotary shaft 15 can be eliminated. For example, by adopting Pn=10, Ps=24 so that Pn and Ps have a common divisor other than 1, as shown in FIG. 15, a force in a radial direction that acts on each of the pairs of magnetic salient poles 18 represented by A, B, C, D, and E and forming an 180-degree mechanical angle becomes the same for each pair of the magnetic salient poles 18, and a radial force acting on the rotary shaft 15 becomes balanced.

The combination of the number Pn of the magnetic salient poles 18 and the number Ps of slots 20 is not limited to Pn=8, Ps=18 and Pn=10, Ps=24, and any combination in which Pn and Ps have a common divisor other than 1 and in which Pn:Ps satisfies any of 1:3, 2:3, 4:3, 4:9, 5:3, 5:6, 5:9, 5:12, 8:9, 8:15, and 8:21 may be adopted. By forming the rotary electric motor 10 in this manner, the magnetic salient poles and the teeth may be readily arranged rotationally symmetrically about the rotary shaft and the phase arrangement of the stator winding may be readily set to be rotationally symmetric about the rotary shaft. However, among those described above, combinations in which Pn:Ps is 1:3, 4:3, 5:3, 5:6, 5:9, 8:9, 8:15, and 8:21 have large torque fluctuations. Thus, a combination is favorable in which Pn:Ps is any of 2:3, 4:9, and 5:12 and which provides a preferable torque balance.

The rotary electric motor 10 may share the same structure as those shown in FIG. 3 and FIGS. 6 to 10 described in the first embodiment.

While the rotor cores 16 and 16b are formed by laminating magnetic steel sheets, alternatively, the rotor cores 16 and 16b may be formed of an iron mass or SMC.

Figure 16:
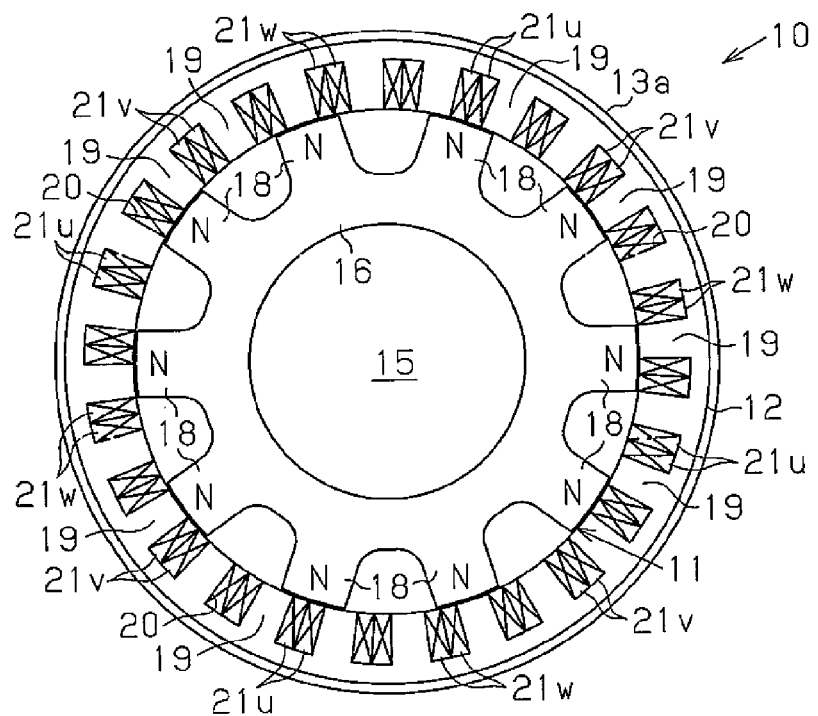
FIG. 16 is a schematic cross-sectional view of a rotary electric motor according to another example of the second embodiment.

An arrangement of the U-phase winding 21u, the V-phase winding 21v, and the W-phase winding 21w wound around the teeth 19 is not limited to a structure in which teeth 19 respectively wound by the windings are divided into two groups (rotationally symmetric at 360/2 degrees). For example, as shown in FIG. 16, in a rotary electric motor 10 in which Pn=10 and Ps=24, a structure may be adopted in which the teeth 19 wound by the windings are divided into four groups (rotationally symmetric at 360/4 degrees).

Instead of using the bobbin 23, the field winding 14 may be directly wound around an outer circumference of the protruding bar 13c so that the protruding bar 13c forms a field winding wound portion.

For the U-phase winding 21u, the V-phase winding 21v, and the W-phase winding 21w, instead of having parts of two stator windings housed in a single slot 20, part of one stator winding may be housed in a single slot 20.

When the rotor 11 is a monopole, end portions facing the stator 12 of the magnetic salient poles 18 may all become S-poles instead of N-poles.

The magnetic salient poles 18 may be shorter than then entire length of the rotor core 16 instead of being extended over the entire length of the rotor core 16.

The rotary electric motor 10 is not limited to being driven by a three-phase alternating current, and may alternatively be driven by a single-phase alternating current, a two-phase alternating current, or a polyphase alternating current of four or more phases.

The rotary electric motor 10 may be applied to a generator instead of an electric motor.

A third embodiment of the present invention will now be described with reference to FIGS. 18 and 19.

Figure 17:
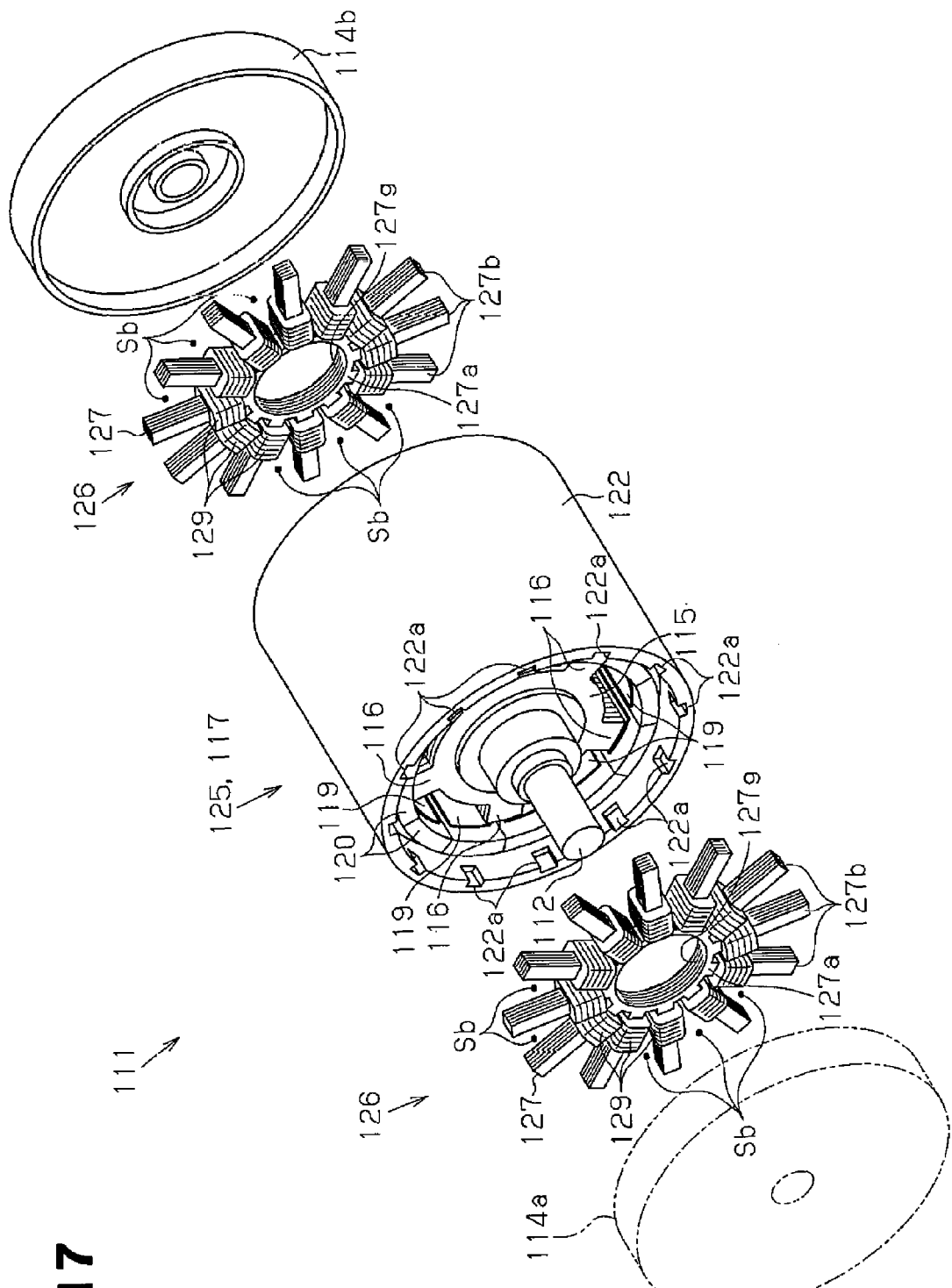
FIG. 17 is a perspective view schematically showing a rotary electric motor according to a third embodiment of the present invention in a partially exploded state.
Figure 18:
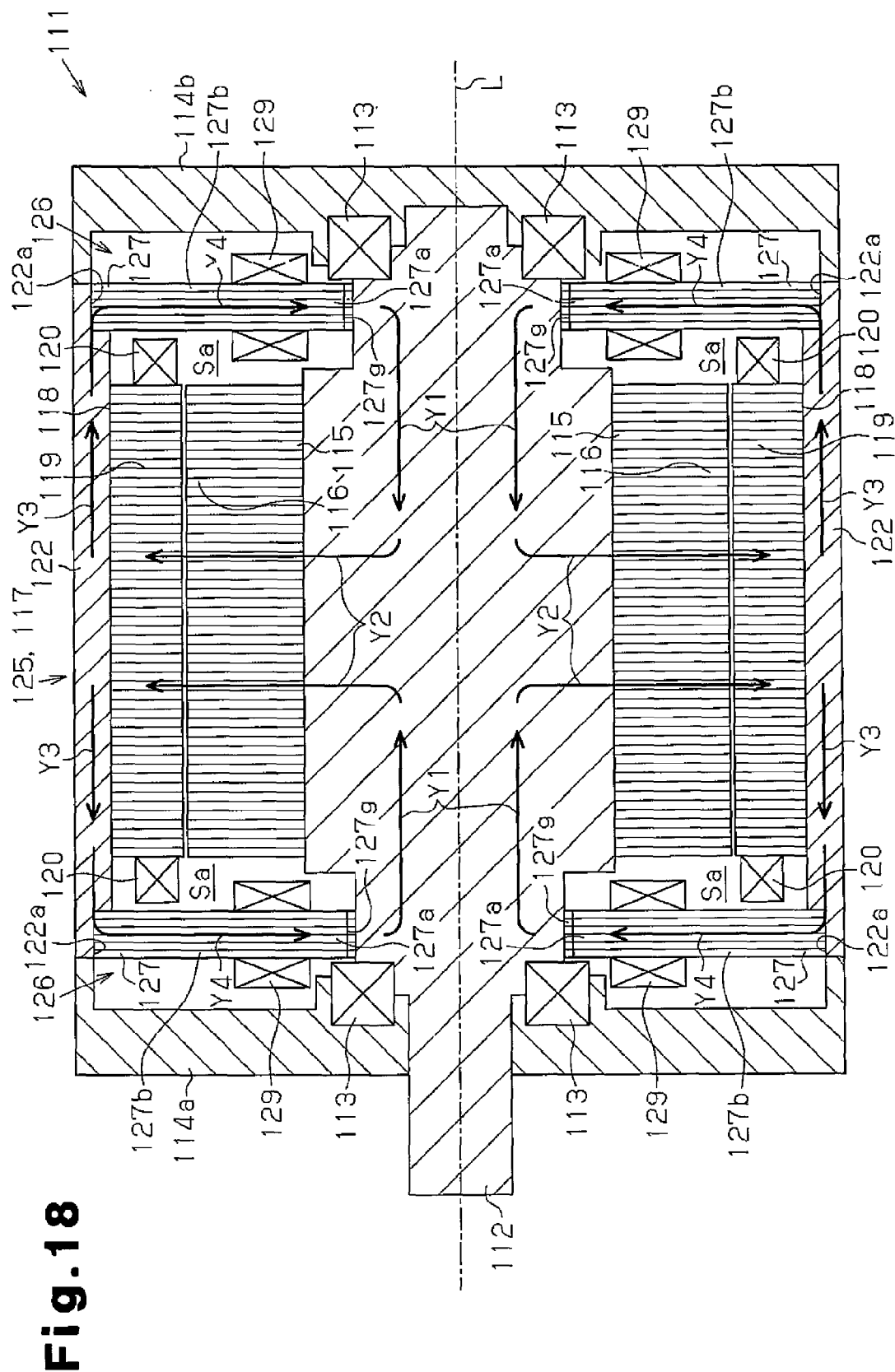
FIG. 18 is a cross-sectional view schematically showing the rotary electric motor shown in FIG. 17.

As shown in FIGS. 17 and 18, a motor 111 serving as a rotary electric motor includes a generally cylindrical shaft (rotary shaft) 112 formed of a soft magnetic material (such as iron or silicon steel) serving as a soft magnetic body. In the third embodiment, the entire shaft 112 forms a first magnetic body. The shaft 112 is coupled to housing members 114a and 114b respectively covering the two ends of the motor 111 by means of bearings 113. The shaft 112 is supported so as to be rotatable around an axis L of the shaft 112 with respect to the housing members 114a and 114b. Moreover, the housing members 114a and 114b of the third embodiment include a plurality of air vents (not shown) that extend through the housing members 114a and 114b in a direction along the axis L of the shaft 112.

A rotor (rotor core) 115 serving as a rotating part is fixed to the shaft 112. The rotor 115 is configured so as to be integrally rotatable with the shaft 112 around the axis L of the shaft 112. In addition, an outer circumferential surface of the shaft 112 and an inner circumferential surface of the rotor 115 are in close contact with each other. Thus, the shaft 112 and the rotor 115 are magnetically coupled to each other. The rotor 115 is formed by laminating a plurality of steel sheets formed from a soft magnetic material in a direction along the axis L. Thus, in the rotor 115, a magnetic flux more readily flows in a diametrical direction and a circumferential direction of the rotor 115 that are perpendicular to the axis L than in a direction along the axis L.

A plurality of (in the third embodiment, five) generally cuboid rotor teeth 116 as magnetic salient poles are formed on an outer circumferential surface of the rotor 115 so as to protrude outward in the diametrical direction of the rotor 115. The rotor teeth 116 are formed so as to divide the outer circumferential surface of the rotor 115 in regular intervals (in the third embodiment, 72-degree intervals) in the circumferential direction, and distal surfaces of the rotor teeth 116 are positioned on the same circumferential plane. In addition, each rotor tooth 116 is formed over an entire width of the rotor 115 along the axis L. In other words, it is understood that the rotor teeth 116 of the third embodiment are formed by providing a recess that extends in the axis L of the shaft 112 from the outer circumferential surface of the rotor 115 toward the shaft 112. In this manner, the rotor 115 of the third embodiment is configured not to include a permanent magnet.

An annular stator 117 (stationary part) is arranged around the rotor 115 so as to enclose the rotor 115. The stator 117 includes, on an inner circumferential side thereof, a stator core 118 that is formed by laminating a plurality of steel sheets formed from a soft magnetic material in a direction along the axis L. Thus, in the stator core 118, a magnetic flux more readily flows in the stator core 118 in a diametrical direction and a circumferential direction that are perpendicular to the axis L of the shaft 112 than in a direction along the axis L. In addition, the dimension of the stator core 118 along the axis L is set to be the same as the dimension of the rotor 115 along the axis L.

Furthermore, a plurality of (in the third embodiment, 12) stator teeth 119 are formed the stator core 118 so as to protrude toward the shaft 112 from an inner circumferential surface of the stator core 118. The stator teeth 119 are formed so as to divide the inner circumferential surface of the stator core 118 at regular intervals (in the third embodiment, 30-degree intervals) in a circumferential direction. A slight clearance (for example, 0.7 mm) is formed between a distal surface of each rotor tooth 116 (the outer circumferential surface of the rotor 115) and an inner circumferential surface of the stator teeth 119 (the stator 117). A conducting wire is wound (in the third embodiment, by concentrated winding) around each stator tooth 119 to form a stator winding 120 as an armature winding. In other words, in the stator 117 of the third embodiment, the stator winding 120 is formed on a plane facing the rotor 115. Each stator winding 120 is any of a U-phase winding, a V-phase winding, and a W-phase winding, and a rotating magnetic field is generated by supplying currents with varying phases to the windings.

In addition, as described above, since dimensions along the axis L of the stator 117 (the stator teeth 119) and the rotor 115 are set to be the same, both end portions (coil ends) of the stator winding 120 in the direction along the axis L protrude more outward in the direction along the axis L than both ends of the rotor 115. Thus, an annular space Sa (shown in FIG. 18) sandwiched between the stator winding 120 and the shaft 112 is formed at positions corresponding to both end surfaces of the rotor 115 in the direction along the axis L.

Furthermore, the stator 117 includes a cylindrical bypass core (field yoke) 122 serving as a second magnetic body, which is formed so as to extend in the axis L and which covers an entire circumference of an outer circumferential surface of the stator core 118. The bypass core 122 is formed from soft magnetic composites (SMC). In addition, the outer circumferential surface of the stator core 118 and an inner circumferential surface of the bypass core 122 are in close contact with each other. Thus, the stator core 118 and the bypass core 122 are magnetically coupled to each other. Further, inner circumferential surfaces of both ends of the bypass core 122 in the direction along the axis L include a plurality of (in the third embodiment, twelve) recesses 122a respectively cut out into a generally cuboid shape in the direction along the axis L from a distal surface. In the third embodiment, the shaft 112, the rotor 115, and the stator 117 form a main electric motor portion 125.

Field poles 126 for generating a field magnetic flux are provided so as to form a pair in the vicinity of both ends of the shaft 112 (the main electric motor portion 125) in the direction along the axis L. Each field pole 126 includes a field pole core (a field pole yoke) 127 that magnetically couples the bypass core 122 and the shaft 112 to each other. The field pole core 127 is formed by laminating a plurality of steel sheets punched out in a same shape in the direction along the axis L. The field pole core 127 include a fixed portion 127a, which is formed in an annular shape and into which the shaft 112 is inserted, and a plurality of (in the third embodiment, twelve) arm portions 127b, each serving as a third magnetic body that extends from the fixed portion 127a so as to orthogonally intersect the axis L and extends radially outward (in a spoke pattern) from the axis L. The arm portions 127b are arranged so as to divide an outer circumferential surface of the fixed portion 127a at regular intervals (in the third embodiment, 30-degree intervals). In addition, distal parts (outer ends) of the arm portions 127b positioned on an outer side in a direction perpendicular to the axis L are not coupled to each other and are set to an open state. Furthermore, a conducting wire is wound and a field winding 129 is formed at a location close to the shaft 112 (the fixed portion 127a) of each arm portion 127b. The dimension from the axis L to an end portion of each field winding 129 positioned on the outer side in the direction perpendicular to the axis L is set to be the same. However, the dimension from the axis L to an end portion of each field winding 129 is set to be smaller than the dimension from the axis L to an inner circumferential surface of the stator winding 120.

The field pole 126 is coupled to the main electric motor portion 125 (stator 117) so that the distal part of each arm portion 127b of the field pole core 127 is inserted into the recesses 122a formed at both end portions of the bypass core 122. In a state in which the field pole core 127 is coupled to the stator 117, the distal part (distal surface) of each arm portion 127b is in close contact with the bypass core 122, and each arm portion 127b (the field pole core 127) and the bypass core 122 (the stator 117) are magnetically coupled to each other. In addition, the shaft 112 is inserted into the fixed portion 127a of the field pole core 127. The inner circumferential surface of the fixed portion 127a and the outer circumferential surface of the shaft 112 are arranged facing to and parallel to each other, and a slight clearance (for example, 0.3 mm) is formed between both inner circumferential surfaces. In the third embodiment, the inner circumferential surface of the fixed portion 127a becomes a gap surface 127g. In this manner, in the third embodiment, the field pole core 127 is arranged so that the gap surface 127g faces the outer circumferential surface of the shaft 112. Thus, the field pole core 127 (each arm portion 127b) and the shaft 112 are magnetically coupled to each other by the gap surface 127g. In addition, it is understood that each arm portion 127b of the third embodiment is formed by laminating a plurality of steel sheets extended so as to magnetically couple the shaft 112 and the bypass core 122 to each other.

Furthermore, in a state in which the field pole core 127 is coupled to the stator 117, the field winding 129 is arranged at a position corresponding to the rotor 115 and is inserted into the space Sa. In other words, the field winding 129 and the rotor 115 face each other more inward in a radial direction of the stator core 118 (closer to a side of the rotor 115) than the stator winding 120. In addition, in a state in which the field pole core 127 is coupled to the stator 117, a space Sb having an approximately triangular shape as seen from a side of an end surface of the shaft 112 is formed between the arm portions 127b so as to be enclosed by the arm portions 127b and the bypass core 122 (shown in FIG. 17).

With the motor 111 of the third embodiment, a conducting wire (not shown) for energizing the stator winding 120 is drawn from a side of a housing member 114b out of the motor 111 through the space Sb. In addition, currents are respectively supplied to the field windings 129 so that a magnetic path (a flow of field magnetic flux) is formed from the stator 117 (the bypass core 122) toward the shaft 112. Moreover, both end portions of the main electric motor portion 125 in the direction along the axis L are covered by the housing members 114a and 114b described earlier to prevent the rotor 115, the inside of the stator 117, and the field pole 126 from being exposed.

Next, the operation of the motor 111 will be described focusing on the magnetic path (a flow of field magnetic flux) formed when the field windings 129 are energized.

As shown in FIG. 18, in the motor 111 of the third embodiment, field magnetic fluxes generated at the arm portions 127b when a current is supplied to the field windings 129 pass through the shaft 112 so as to face each other (indicated by arrows Y1) toward an intermediate point between both field poles 126. In addition, field magnetic fluxes generated at the field windings 129 repel each other (collide with each other) in the shaft 112 and, at the same time, are guided (indicated by arrows Y2) in directions perpendicular to the axis L of the shaft 112 (in diametrical directions of the rotor 115). Field magnetic fluxes that having passed the rotor teeth 116 of the rotor 115 then pass through the stator teeth 119 and enter the bypass core 122 and, at the same time, are guided (indicated by arrows Y3) toward the field poles 126. Furthermore, field magnetic fluxes that have entered the arm portions 127b of the field pole cores 127 from the bypass core 122 pass through the arm portions 127b, and once again enters the shaft 112 (indicated by arrows Y4) through the gap surface 127g.

In this manner, with the motor 111 of the third embodiment, an annular (loop-shaped) magnetic path (flow of field magnetic flux) is formed which sequentially passes through the shaft 112, the rotor teeth 116 of the rotor 115, the bypass core 122, the field pole core 127 (the arm portion 127b) of the field pole 126, and once again enters the shaft 112 (indicated by the arrows Y1 to Y4). Thus, in the motor 111 of the third embodiment, the rotor teeth 116 are given polarity of an N-pole by the field magnetic flux. In other words, in the third embodiment, the rotor teeth 116 (field magnetic flux) has the same function as a permanent magnet arranged on a rotor in a permanent magnet synchronous motor.

In addition, with the motor 111 of the third embodiment, by increasing the amount of current supplied to each field winding 129, the field magnetic flux can be increased and a greater torque can be produced. With the motor 111 of the third embodiment, by reducing the amount of current supplied to each field winding 129 during high-speed rotation, the field magnetic flux can be reduced and a maximum rotation speed can be increased. In other words, with the motor 111 of the third embodiment, a maximum torque and a maximum rotation speed can be increased by field strengthening control alone. Thus, with the motor 111 of the third embodiment, field weakening control that is required when a permanent magnet is arranged on the rotor 115 becomes unnecessary and a structure of the motor 111 can be simplified.

Further, with the motor 111 of the third embodiment, a cooling medium such as the air outside the motor 111 can be introduced into the motor 111 through air vents formed in the housing members 114a and 114b and the spaces Sb formed between the arm portions 127b, and the interior of the motor 111 (the rotor 115, the stator core 118, the stator winding 120, and the like) can be readily cooled.

The third embodiment has the advantages described below.

(11) By energizing the field winding 129 formed on each arm portion 127b of the field pole core 127, a magnetic path (flow of field magnetic flux) is formed by the shaft 112, the rotor teeth 116 of the rotor 115, and the bypass core 122 of the stator 117. In addition, the arm portions 127b are formed so as to extend in a direction perpendicular to the axis L of the shaft 112 so that spaces Sb are formed between the arm portions 127b. Thus, a cooling medium can be introduced into the motor 111 through the spaces Sb formed between the arm portions 127b that form the field pole core 127, and the interior of the motor 111 can be readily cooled. Further, in the third embodiment, a conducting wire for energizing windings (the stator winding 120 and the like) formed inside the motor 111 can be drawn out from the field pole core 127 through the spaces Sb formed between the arm portions 127b, and the conducting wire can be routed easily.

(12) In particular, with the motor 111 of the third embodiment, the stator winding 120 is formed on the stator 117. Thus, in order to draw a conductor wire from a side of the motor 111, an outlet must be provided so as to extend through the stator core 118 and the bypass core 122. In this case, a magnetic path formed at the stator core 118 and the bypass core 122 is partially separated and may result in a power decline of the motor 111 or unevenness in the amount of magnetic flux among the rotor teeth 116. In the third embodiment, such problems are solved in a preferred manner by enabling a conducting wire for energizing windings (such as the stator winding 120) formed inside the motor 111 to be led from the side of the housing member 114b to the outside of the motor 111 via spaces Sb formed between the arm portions 127b.

(13) The plurality of arm portions 127b are formed so as to extend radially outward from the shaft 112, and distal parts of the arm portions 127b are not coupled to each other and are set to an open state. Thus, the spaces Sb between the arm portions 127b can be readily formed with large sizes, and cooling of the interior of the motor 111 and routing of the conducting wire can be performed more easily.

(14) The gap surface 127g of the field pole core 127 (the inner circumferential surface of the fixed portion 127a) is arranged so as to face the outer circumferential surface of the shaft 112. Thus, a magnetic path in which a field magnetic flux that has passed through the stator 117 passes through the field pole core 127 (the arm portions 127b) and reenters the shaft 112 is more readily formed. Consequently, a reduction in an amount of field magnetic flux at the rotor teeth 116 can be suppressed and a greater torque can be produced. In Japanese Laid-Open Patent Publication No. 2008-43099 described earlier, the gap surface of the field pole core is not configured to face the outer circumferential surface of the shaft 112. In this structure, a magnetic path in which a field magnetic flux that has passed through the second magnetic body passes through the third magnetic body and reenters the shaft is more readily formed than in the structures of Japanese Laid-Open Patent Publication No. 2008-43099.

(15) Field poles 126 are arranged on both ends of the shaft 112 (the main electric motor portion 125) so as to form a pair, and a current is supplied to the field winding 129 formed on each field pole 126 so that both field poles 126 form magnetic paths (flows of field magnetic flux) oriented to face each other. Thus, since magnetic paths are formed in a direction facing each other from both ends of the shaft 112, field magnetic fluxes generated at the field poles 126 repel each other in the shaft 112 and are guided outward in the diametrical direction of the rotor 115 (toward the rotor teeth 116). Consequently, an amount of field magnetic flux at the rotor teeth 116 of the rotor 115 can be increased and a greater torque can be produced.

(16) Magnetic material usage can be reduced compared to when the field pole core 127 has the shape of a disk. In addition, since the field pole core 127 is formed by laminating steel sheets, the strength of the field pole core 127 can be increased compared to when the field pole core 127 is formed of SMC.

(17) The arm portions 127b are formed so as to extend in a direction perpendicular to the axis L. Thus, even when increasing the number of windings of the field winding 129, the conducting wire need only be wound in sequence in the direction in which the arm portions 127b extend. As a result, an increase in the size of the motor 111 in the direction along the axis L due to an increase in a diameter of the field winding 129 can be suppressed.

(18) The field pole 126 is coupled to the stator 117 so that the distal part of each arm portion 127b is inserted into the recesses 122a formed at both end portions of the bypass core 122. Thus, compared to when the distal part of each arm portion 127b is just coupled in contact with both end surfaces of the bypass core 122, a magnetic coupling between the bypass core 122 and the field pole core 127 (the arm portions 127b) can be strengthened.

(19) With the motor 111 of the third embodiment, a permanent magnet can be omitted from the rotor 115. A permanent magnet of a permanent magnet synchronous motor is typically a permanent magnet that is rare and expensive such as a rare-earth magnet, and is one of the causes of high manufacturing costs of the motor. In contrast, the motor 111 of the third embodiment does not require a permanent magnet and an increase in the cost of the motor 111 can be suppressed.

(20) In addition, since the motor 111 of the third embodiment does not use a permanent magnet, an occurrence of drag loss can be suppressed. Furthermore, although performing field strengthening control or field weakening control with a permanent magnet synchronous motor results in an unbalanced amount of magnetic flux between the N-pole and the S-pole, such a problem does not occur with the motor 111 of the third embodiment.

(21) In addition, compared to a structure in which a permanent magnet is arranged on the outer circumferential surface of the rotor 115 or a structure in which a winding is wound around the rotor 115, a structure for preventing scattering of the permanent magnet or the winding (such as covering the rotor 115 with a protective member) is not required and the structure of the rotor 115 can be simplified. This contributes to increasing the maximum rotation speed.

(22) Unlike a structure using a permanent magnet, the motor 111 of the third embodiment adopts a structure in which a field magnetic flux is generated by energizing each field winding 129. Thus, in the third embodiment, an amount of field magnetic flux can be adjusted at will by controlling a field current supplied to each field winding 129. In other words, with the motor 111 of the third embodiment, by controlling a field current, maximum torque can be increased by increasing field magnetic flux or a maximum rotation speed can be increased by reducing field magnetic flux. In particular, with the motor 111 of the third embodiment, a maximum torque and a maximum rotation speed can be increased by field strengthening control alone. Thus, a control structure of the motor 111 can be simplified.

A fourth embodiment of the present invention will now be described with reference to FIGS. 19 and 20. In the following description, the same components and the same control contents as the third embodiment will be denoted by the same reference characters and not described in detail. In the fourth embodiment, the shape of the field pole core 127 differs from that of the third embodiment. Otherwise, the fourth embodiment is the same as the third embodiment.

Figure 20:
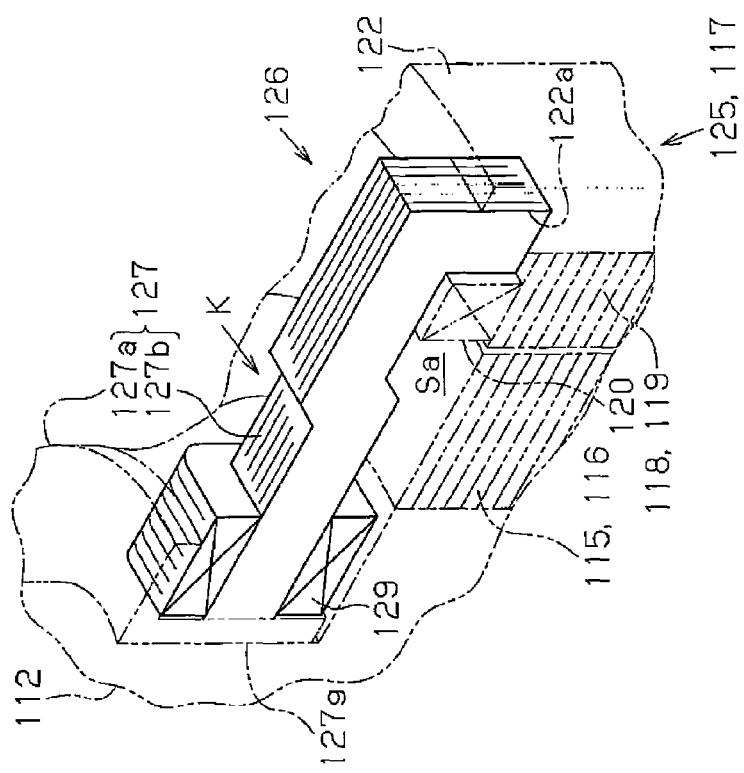
FIG. 20 is a perspective view schematically showing a part of the rotary electric motor shown in FIG. 19.
Figure 19:
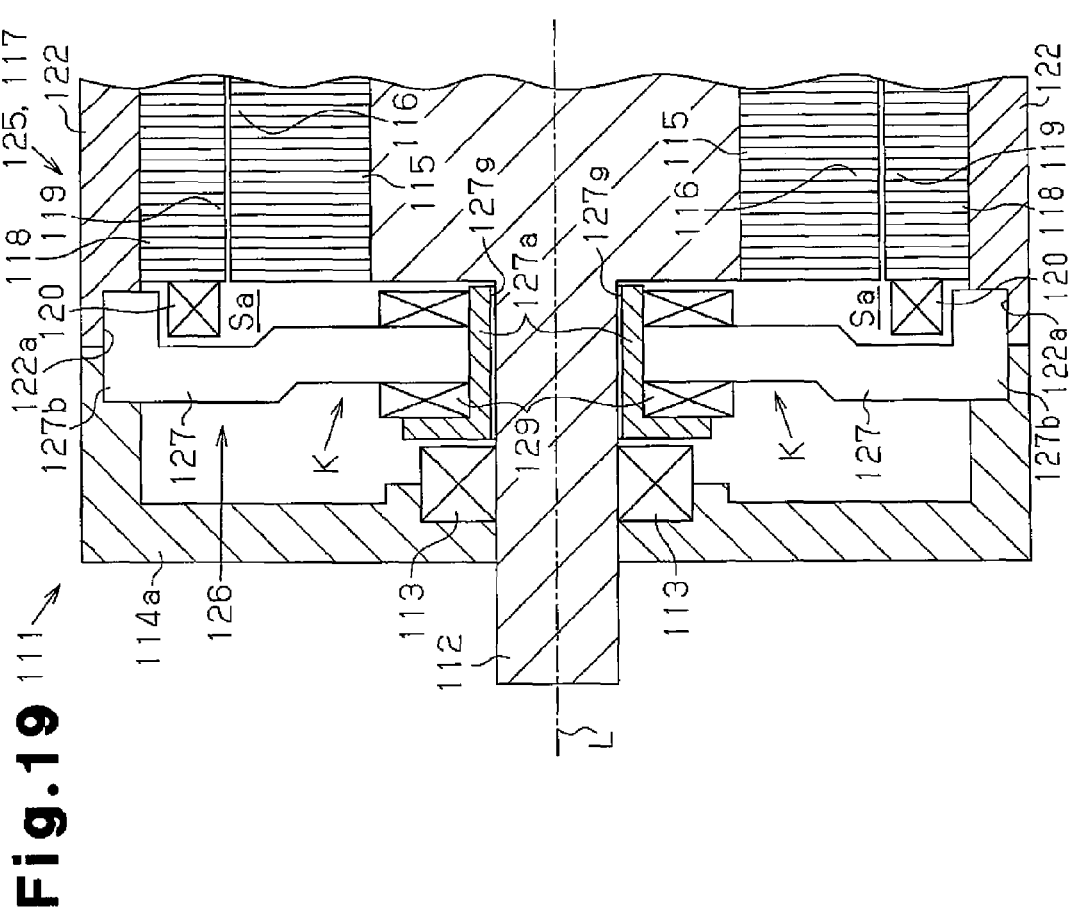
FIG. 19 is a cross-sectional view schematically showing a rotary electric motor according to a fourth embodiment of the present invention.

As shown in FIGS. 19 and 20, in a field pole core 127 of the fourth embodiment, a fixed portion 127a formed from a soft magnetic material formed into an approximately annular shape and arm portions 127b are formed separately from each other. A shaft 112 is inserted into the fixed portion 127a, and an inner circumferential surface of the fixed portion 127a is arranged so as to face an outer circumferential surface of the shaft 112 with a slight clearance (for example, 0.3 mm) between the two circumferential surfaces. Thus, the fixed portion 127a and the shaft 112 are magnetically coupled to each other. In the fourth embodiment, the inner circumferential surface of the fixed portion 127a becomes a gap surface 127g.

In addition, each arm portion 127b of the fourth embodiment is formed by laminating a plurality of steel sheets formed from a soft magnetic material in a direction that is perpendicular to a direction in which each arm portion 127b extends and that is perpendicular to a axis L (i.e., a circumferential direction around the axis L). Each arm portion 127b is fixed to the fixed portion 127a so that a proximal end portion (proximal end surface) on a side of the shaft 112 is in close contact with an outer circumferential surface of the fixed portion 127a, and each arm portion 127b and the fixed portion 127a are magnetically coupled to each other. Furthermore, each arm portion 127b has a proximal portion K that extends toward a rotor 115 (a space Sa) at a position (region) that faces the rotor 115. Moreover, each arm portion 127b first bends from the proximal portion K toward a side opposite to the rotor 115 among directions along the axis L, and on an outer side in a direction perpendicular to the axis L of a stator winding 120, bends once again so that a distal part (distal surface) on a side opposite to the shaft 112 approaches (faces) an end surface of a bypass core 122 (a stator 117).

In addition, a field winding 129 is wound around the proximal portion K. Thus, the field winding 129 is arranged at a position corresponding to the rotor 115 and is also inserted into the space Sa. In other words, the field winding 129 and the rotor 115 face each other more inward in a diametrical direction of the rotor 115 (closer to the rotor 115) than a coil end of the stator winding 120. Thus, in the direction along the axis L, an end portion (coil end) of the field winding 129 on the side of the rotor 115 is positioned closer to the rotor 115 than the coil end of the stator winding 120.

Accordingly, the fourth embodiment has the advantages described below in addition to advantages (11) to (22) of the third embodiment.

(23) The proximal portion K is formed on each arm portion 127b at a position corresponding to the rotor 115 (the space Sa) so as to approach the side of the rotor 115, and the field winding 129 is wound around the proximal portion K. Thus, the field winding 129 can be arranged using the position (region) corresponding to the rotor 115 or, in other words, the space Sa in which the stator winding 120 formed on the stator is not present. As a result, each field winding 129 is suppressed from protruding toward a side of the shaft 112 opposite to the rotor 115 among directions along the axis L (toward an outer side of a motor 111), and downsizing of the motor 111 can be achieved.

(24) In addition, each arm portion 127b is formed by laminating a plurality of steel sheets extended so as to magnetically couple the shaft 112 and the bypass core 122 to each other. Thus, with the fourth embodiment, an entire arm portion 127b including the proximal portion K can be easily formed by simply laminating steel sheets having the same shape.

The fourth embodiment may be modified as described below.

In the fourth embodiment, the direction in which the steel sheets that form each arm portion 127b are laminated may be modified as required. However, from the perspective of forming the arm portions 127b with ease as is the case of the fourth embodiment, the direction in which the steel sheets are laminated is preferably a direction which is perpendicular to the direction in which each arm portion 127b extends and which is perpendicular to the axis L.

In the fourth embodiment described above, the fixed portion 127a and the arm portions 127b may be integrally formed. In a similar manner, in the fourth embodiment, the fixed portion 127a and the arm portions 127b may be separately formed.

In the third and fourth embodiments described above, the fixed portion 127a may be omitted. In other words, an end surface of each arm portion 127b on the side of the shaft 112 may be fixed so as to face the outer circumferential surface of the shaft 112. In this case, a proximal end surface of each arm portion 127b on the side of the shaft 112 becomes the gap surface 127g. In this example, the arm portions 127b form the field pole core 127.

In the third and fourth embodiments described above, the number of the arm portions 127b may be modified as required.

Figure 21A:
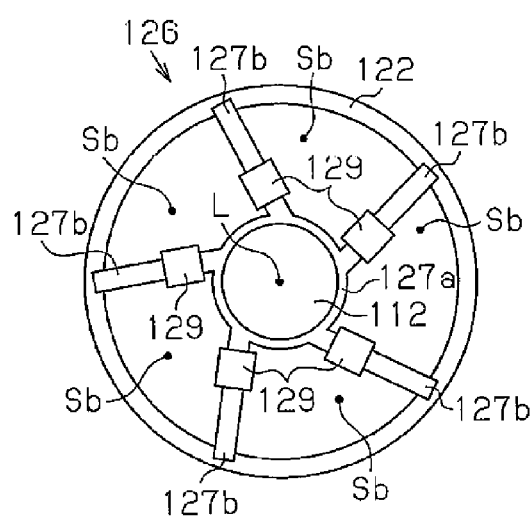
FIGS. 21A to 21D are side views schematically showing a field pole core according to other examples of the third and fourth embodiments.
Figure 21B:
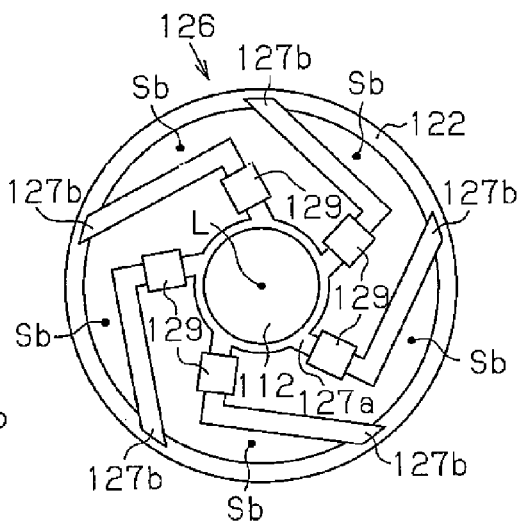
Figure 21C:
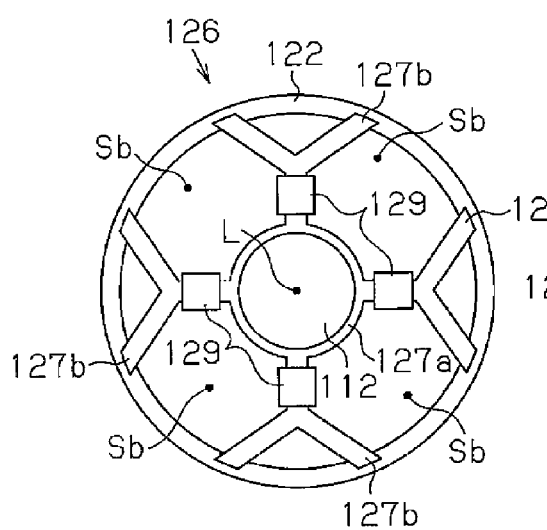
Figure 21D:
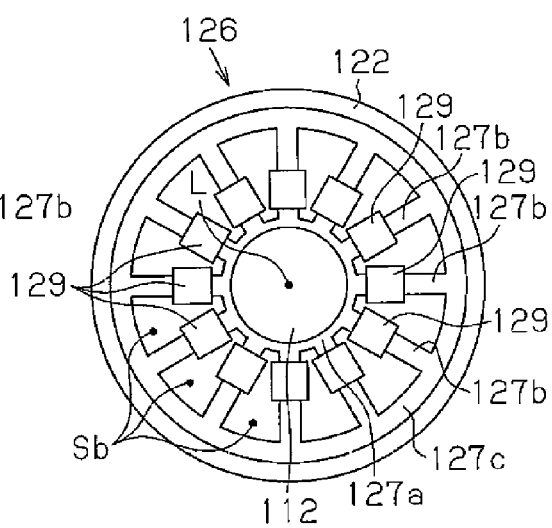

In the third and fourth embodiments described above, the shapes of the arm portions 127b may be modified. A specific description will be given below with reference to FIGS. 21A to 21D. FIGS. 21A to 21D are schematic diagrams which show a state in which an end surface of the shaft 112 is viewed from the front and from which the housing member 114a, the rotor 115 (the rotor teeth 116), the stator core 118 (the stator teeth 119), and the stator winding 120 have been omitted. For example, as shown in FIG. 21A, each arm portion 127b may be formed so as to extend in a direction not intersect the axis L. In addition, as shown in FIG. 21B, each arm portion 127b may be bent. Furthermore, as shown in FIG. 21C, each arm portion 127b may divide into a plurality of branches on a side of the bypass core 122 of the stator 117 or, conversely, may divide into a plurality of branches on a side of the fixed portion 127a (the shaft 112). In other words, each arm portion 127b may be formed so as to extend in a direction that intersects the direction along the axis L. More specifically, with each arm portion 127b, all or part of a center line of each arm portion 127b need only intersect a direction along an axis of the shaft 112 as seen from a side of an end surface of the shaft 112, and the center line need not necessarily intersect the axis L. In addition, each arm portion 127b may be formed in any shape as long as the arm portion 127b magnetically couples the shaft 112 to the bypass core 122 of the stator 117.

In the third and fourth embodiments described above, as shown in FIG. 21D, an annular coupling portion 127c may couple distal parts (outer side ends) of the arm portions 127b positioned on an outer side of the direction perpendicular to the axis L with each other. Even when formed in this manner, the space Sb can be formed by the fixed portion 127a, the arm portions 127b, and the coupling portion 127c.

In the third and fourth embodiments described above, each arm portion 127b may be inclined so as to protrude toward an outer side of the motor 111 among directions along the axis L on a side of the shaft 112 (the fixed portion 127a) or on a side of the stator 117.

In the third and fourth embodiments described above, the recess 122a of the bypass core 122 may be omitted. In this case, the field pole 126 may be coupled to the stator 117 so that distal parts (outer side ends) of the arm portions 127b come into contact with a distal surface of the bypass core 122.

In the third and fourth embodiments described above, the field winding 129 need only be formed on each arm portion 127b, and may be formed on a side of the stator 117 or formed over the entire arm portion 127b. In addition, each field winding 129 may be formed at a position not corresponding to the rotor 115 and may be arranged outside of the space Sa. However, from the perspective of downsizing the motor 111, a structure such as that according to the third and fourth embodiments described above is preferably adopted.

In the third and fourth embodiments described above, the field pole 126 may be arranged only on one side of the main electric motor portion 125 (the shaft 112). Even with such a structure, by energizing the field winding 129, an annular magnetic path (a flow of field magnetic flux) that sequentially passes through the shaft 112, the rotor teeth 116 of the rotor 115, the bypass core 122, and the field pole core 127 (the arm portions 127b), and reenters the shaft 112 can be formed. However, in a case of a structure where the field pole 126 is arranged on only one side, there is a risk that a part of the generated field magnetic flux passes through the shaft 112 without entering the rotor 115 (the rotor teeth 116). Thus, a structure such as that according to the third and fourth embodiments described above is preferred.

In the third and fourth embodiments described above, the number of the rotor teeth 116 may be modified as required. In addition, the number of the stator teeth 119 may be modified as required. In other words, the motor 111 is not limited to a structure including 10 poles and 12 slots, and a different structure such as that including 20 poles and 24 slots may be adopted.

In the third and fourth embodiments described above, each stator winding 120 may be formed by distributed winding.

In the third and fourth embodiments described above, a soft magnetic material may be separately provided at a magnetic path forming part of the shaft 112. Specifically, in the shaft 112, an annular shaft bypass core formed from a soft magnetic material is arranged over an entire circumference between gap surfaces 127g of the pair of field poles 126 and positions corresponding to the gap surfaces 127g. In this case, a material with lower eddy-current loss than the proximal portion of the shaft 112 is preferably used as the shaft bypass core. By adopting such a structure, a magnetic path (a flow of field magnetic flux) to the rotor teeth 116 formed on the rotor 115 can be readily formed. Consequently, the amount of field magnetic flux at the rotor teeth 116 can be increased and a greater torque can be produced. In this case, the proximal portion of the shaft 112 may be formed of a non-magnetic material.

In the third and fourth embodiments described above, the shapes of the rotor teeth 116 may be modified as required. In other words, the rotor teeth 116 need only function as magnetic salient poles that readily pass a magnetic flux in a diametrical direction of the rotor 115.

In the third and fourth embodiments described above, the shape of the bypass core 122 may be modified as required. In other words, the bypass core 122 need only be capable of guiding the field magnetic flux received from the rotor teeth 116 of the rotor 115 to the arm portions 127b.

In the third and fourth embodiments described above, spacers formed from a non-magnetic material may be arranged between the rotor teeth 116.

Figure 22:
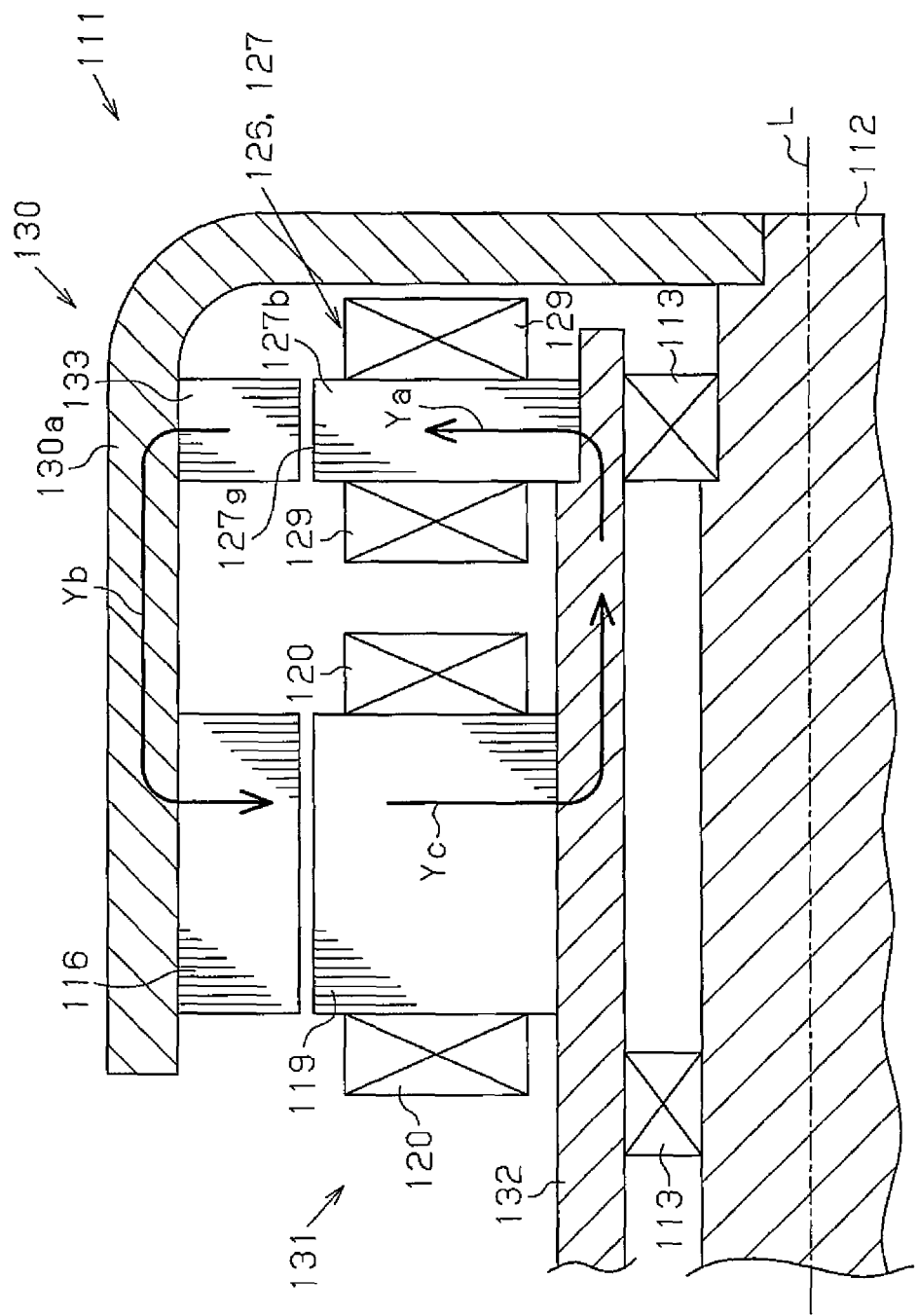
FIG. 22 is a cross-sectional view schematically showing a part of a rotary electric motor according to other examples of the third and fourth embodiments.

In the third and fourth embodiments described above, the motor 111 may be embodied in an outer rotor-type motor. Specifically, as shown in FIG. 22, an outer rotor main body (a first magnetic body, a field yoke) 130a, which is cylindrical, has a closed bottom, and is formed from a soft magnetic material, is fastened to the shaft 112 so as to be integrally rotatable with the shaft 112. A plurality of rotor teeth (magnetic salient poles) 116 are formed on an inner circumferential surface of the outer rotor main body 130a. The outer rotor main body 130a and the rotor teeth 116 form an outer rotor 130. In addition, a stator 131 is arranged on an inner side of the outer rotor 130. In the stator 131, a plurality of stator teeth 119 are formed on an outer circumferential surface of a cylindrical iron core (a second magnetic body) 132 formed from a soft magnetic material, and a stator winding 120 is formed on each stator tooth 119. Further, the shaft 112 is supported so as to be rotatable around the axis L by bearings 113 inside the iron core 132. Moreover, a plurality of arm portions (a third magnetic body) 127b that extend radially outward from the iron core 132 are formed on the outer circumferential surface of the iron core 132 closer to a bottom portion of the outer rotor main body 130a than the stator teeth 119. In the present alternative example, the arm portions 127b form the field pole core 127. A field winding 129 is formed on the arm portions 127b, and an annular protruding portion 133 that protrudes inward in a belt shape is formed at positions corresponding to the arm portions 127b on an inner circumferential surface of the outer rotor main body 130a. The arm portions 127b and the protruding portion 133 are formed by laminating a plurality of steel sheets. Even with such a structure, an annular magnetic path (a flow of field magnetic flux) can be formed so that a magnetic flux generated by applying a current to each field winding 129 sequentially passes through the arm portions 127b, the protruding portion 133, the outer rotor main body 130a, the rotor teeth 116, the stator teeth 119, the iron core 132, and reenters the arm portions 127b (depicted by arrows Ya to Yc). In this case, the arm portions 127b and the protruding portion 133 may be closer to an opening portion of the outer rotor main body 130a than the stator teeth 119.

In the third and fourth embodiments described above, the "third magnetic body" is not limited to being formed as a plurality of arm portions 127b and the "third magnetic body" may be formed to have the shape of a disk.

A fifth embodiment of a motor (rotary electric motor) serving as a rotary electric machine according to the present invention will now be described with reference to FIGS. 23 to 25.

Figure 23:
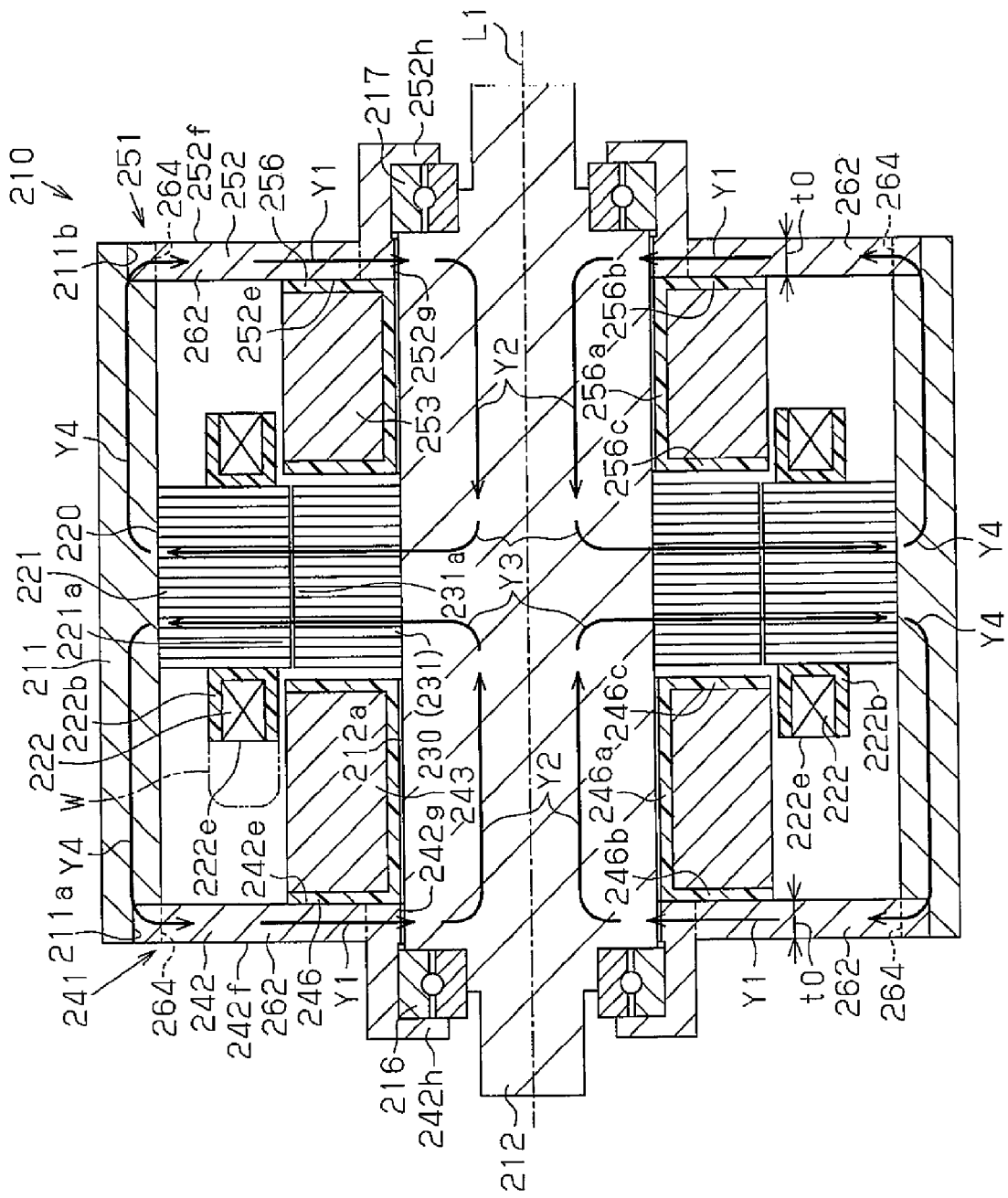
FIG. 23 is a side cross-sectional view of a rotary electric motor according to a fifth embodiment of the present invention.

As shown in FIG. 23, a cylindrical core back (field yoke) 211 that forms an outer hull of a motor 210 is formed from a magnetic material, and in the present embodiment, is formed from soft magnetic composites (SMC). Press-fit recesses 211a and 211b are formed at opening edges of both ends (left and right ends in FIG. 23) of the core back 211. A shaft (rotary shaft) 212 is housed in the core back 211. The shaft 212 is formed of a soft magnetic material (for example, iron or soft magnetic composites) in a generally cylindrical shape. Both ends of the shaft 212 in the direction of the axis L1 of the shaft 212 (an axial direction of the shaft 212) protrude outward from the core back 211.

A stator 220 (stationary part) is fixed to an inner circumferential surface of the core back 211. The stator 220 includes an annular stator core 221 fixed to the inner circumferential surface of the core back 211 and a stator coil (stator winding) 222. The core back 211 covers an entire circumference of an outer circumferential surface of the stator core 221, and the outer circumferential surface of the stator core 221 and the inner circumferential surface of the core back 211 are in close contact with each other. Thus, the stator core 221 and the core back 211 are magnetically connected to each other. The stator core 221 is formed by laminating a plurality of magnetic steel sheets in the direction along the axis L1 of the shaft 212.

Figure 24:
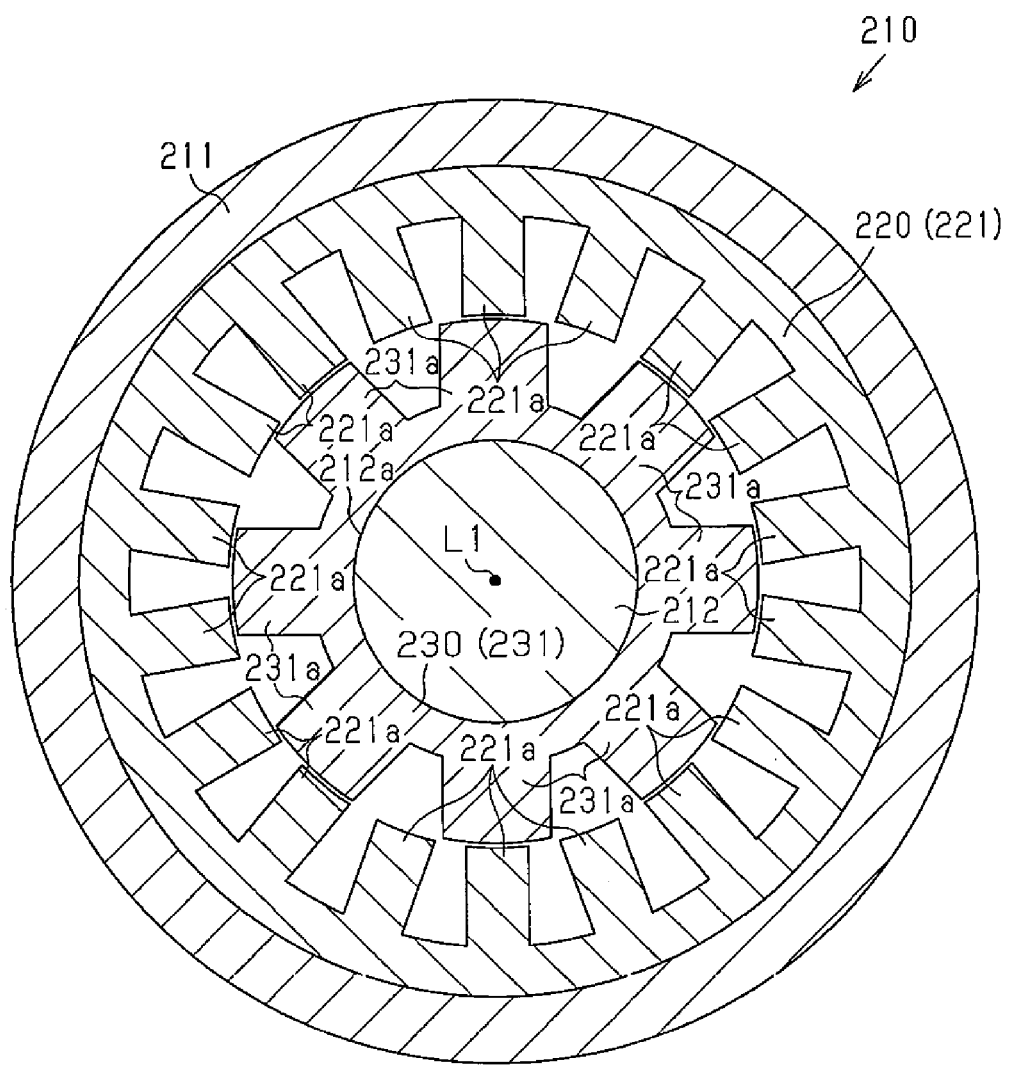
FIG. 24 is a longitudinal cross-sectional view of a core back, a stator core, a rotor core, and a shaft shown in FIG. 23.

As shown in FIG. 24, the stator core 221 includes a plurality of stator teeth 221a that protrude toward the shaft 212 at regular intervals in a circumferential direction of the stator core 221. Distal surfaces of the stator teeth 221a are all positioned on the same circumferential plane. As shown in FIG. 23, each stator tooth 221a is fitted with a stator coil bobbin 222b made of an insulating resin material. In addition, the stator coil 222 is formed by winding a conducting wire made of a conductive metallic material (in the fifth embodiment, copper) around the stator coil bobbin 222b. Moreover, the stator coil 222 is configured so as to have any of a U phase, a V phase, and a W phase and to generate a rotating magnetic field when supplied with currents having phases that differ from each other.

A rotor 230 (rotating part) is provided on an inner side of the stator 220. The rotor 230 has a rotor core 231 fixed to the shaft 212. The rotor core 231 is configured so as to be integrally rotatable with the shaft 212 around the axis L1 of the shaft 212. An outer circumferential surface 212a of the shaft 212 and an inner circumferential surface of the rotor core 231 are in close contact with each other. Thus, the shaft 212 and the rotor core 231 are magnetically connected to each other. The rotor core 231 is formed by laminating a plurality of magnetic steel sheets formed from a soft magnetic material in an axial direction of the shaft 212. Thus, in the rotor core 231, a magnetic flux more readily flows in the rotor core 231 in a radial direction and a circumferential direction of the rotor core 231 that are perpendicular to the axis L1 than in the axial direction of the shaft 212.

In addition, the length of the rotor core 231 in the axial direction of the shaft 212 is the same as the length of the stator core 221 in the axial direction of the shaft 212. The stator coil 222 has a coil end 222e that protrudes from an end surface of the stator teeth 221a in the axial direction of the shaft 212. Thus, both ends of the coil end 222e of the stator coil 222 in the axial direction of the shaft 212 protrude more outward than both ends of the rotor core 231. In addition, in the core back 211, a connecting wire area W (depicted by double-dashed lines in FIG. 22) through which a connecting wire (not shown) of the stator coil 222 of each phase passes is provided closer to one end than the coil end 222e of the one end.

As shown in FIG. 24, the rotor core 231 includes a plurality of rotor teeth 231a serving as magnetic salient poles that protrude outward in the radial direction at regular intervals in a circumferential direction of the rotor core 231. Distal surfaces of the rotor teeth 231a are all positioned on the same circumferential plane. A slight clearance is formed between the distal surfaces of the rotor teeth 231a and the distal surfaces of the stator teeth 221a. In addition, the rotor teeth 231a and the stator teeth 221a are magnetically connected to each other via the clearance.

As shown in FIG. 23, a first field pole 241 for generating a field magnetic flux is arranged closer to one end in the core back 211 than the stator 220 and the rotor 230. The first field pole 241 includes a first field core (field yoke) 242 serving as an annular field core and a first field coil 243 serving as a field winding which is arranged between the first field core 242 and the stator 220 and the rotor 230. The first field core 242 is formed from a magnetic material, and in the fifth embodiment, is formed from soft magnetic composites (SMC). The shaft 212 is inserted into the inner side of the first field core 242, and a slight clearance is formed between an inner circumferential surface 242g of the first field core 242 and an outer circumferential surface 212a of the shaft 212. In addition, the first field core 242 and the shaft 212 are magnetically connected to each other via the clearance. In this case, "the inner circumferential surface 242g of the first field core 242" refers to a part which faces the shaft 212 and which is magnetically connected to the shaft 212.

A first field coil bobbin 246 is fastened to an end surface 242e of the first field core 242. A cylindrical first barrel portion 246a which extends in the axial direction of the shaft 212 from the end surface 242e of the first field core 242 to just before one end surface of the rotor core 231 is formed on the first field coil bobbin 246. In addition, an annular flange portion 246b that extends outward in the radial direction from one end opening portion of the first barrel portion 246a and an annular flange portion 246c that extends outward in the radial direction from another end opening portion of the first barrel portion 246a to just before a surface of the stator coil bobbin 222b on a side of the shaft 212 are also formed on the first field coil bobbin 246. The first field coil 243 is formed by winding the first field coil bobbin 246 with a conducting wire made of a conductive metallic material (in the fifth embodiment, copper) into a plurality of windings around the axis L1 of the shaft 212. Furthermore, a holding portion 242h which holds a first bearing 216 that rotatably supports the shaft 212 is provided in a protruding manner on an end surface 242f of the first field core 242 on a side that is opposite to the side where the first field coil bobbin 246 is fastened.

A second field pole 251 for generating a field magnetic flux is arranged closer to another end in the core back 211 than the stator 220 and the rotor 230. The second field pole 251 includes a second field core (field yoke) 252, which serves as an annular field core, and a second field coil 253, which serves as a field winding arranged between the second field core 252 and the stator 220 and the rotor 230. The second field core 252 is formed from a magnetic material, and in the fifth embodiment, is formed from soft magnetic composites (SMC). The shaft 212 is inserted into the inner side of the second field core 252, and a slight clearance is formed between an inner circumferential surface 252g of the second field core 252 and the outer circumferential surface 212a of the shaft 212. In addition, the second field core 252 and the shaft 212 are magnetically connected to each other through the clearance.

A second field coil bobbin 256 is fastened to an end surface 252e of the second field core 252. A cylindrical second barrel portion 256a, which extends in the axial direction of the shaft 212 from the end surface 252e of the second field core 252 to just before the other end surface of the rotor core 231, is formed on the second field coil bobbin 256. In addition, an annular flange portion 256b, which extends outward in the radial direction from one end opening portion of the second barrel portion 256a, and an annular flange portion 256c, which extends outward in the radial direction from another end opening portion of the second barrel portion 256a to just before a surface of the stator coil bobbin 222b on a side of the shaft 212, are also formed on the second field coil bobbin 256. The second field coil 253 is made by a plurality of windings of a conducting wire made of a conductive metallic material (in the fifth embodiment, copper) around the axis L1 of the shaft 212 on the second field coil bobbin 256. Further, a holding portion 242h, which holds a second bearing 217 that rotatably supports the shaft 212, protrudes from an end surface 252f of the second field core 252 on a side that is opposite to the side where the second field coil bobbin 256 is fastened.

The first field core 242 will now be described in detail.

Figure 25:
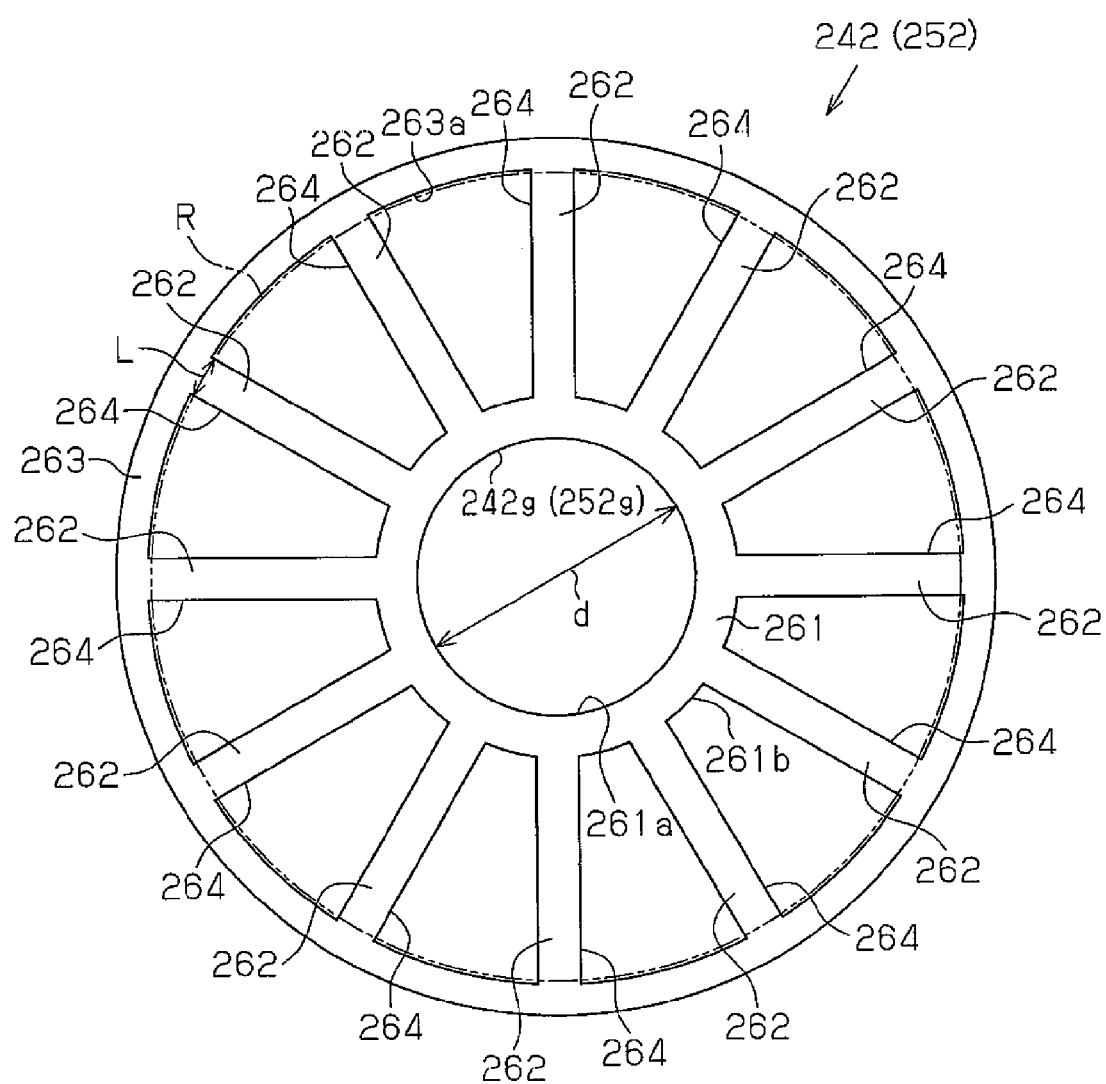
FIG. 25 is a front view of a field core shown in FIG. 23.

As shown in FIG. 25, an annular insertion portion 261 that has an insertion hole 261a into which the shaft 212 is insertable is formed on the first field core 242. A plurality of (in the fifth embodiment, 12) arm portions 262 that extend radially along a radial direction of the first field core 242 are formed on an outer circumferential surface 261b of the insertion portion 261. The arm portions 262 are formed at regular angles. The arm portions 262 function as magnetic path portions. In addition, widths of the arm portions 262 are set to be the same, and the arm portions 262 extend in the radial direction of the first field core 242 at constant widths. Distal ends of the arm portions 262 are coupled to each other by an annular coupling portion 263 extending in a circumferential direction of the first field core 242. Through holes 264 that extend through in the axial direction of the shaft 212 are formed between adjacent arm portions 262. Each through hole 264 is partitioned and formed by side surfaces of adjacent arm portions 262, an inner circumferential surface 263a of the coupling portion 263, and an outer circumferential surface 261b of the insertion portion 261, and has a fan shape as viewed from above. Further, in the first field core 242, a thickness t0 of the insertion portion 261 with the exception of the holding portion 242h, the arm portions 262, and the coupling portion 263 is set to be constant.

Each through hole 264 is formed so that a minimum value of a cross-sectional area along a circumferential direction of the first field core 242 is equal to a surface area of the inner circumferential surface 242g. Here, the "cross-sectional area along a circumferential direction" refers to a cross-sectional area obtained by cutting a field magnetic path in a concentric circuit of which center is the axis of the shaft 212. The width of each arm portion 262 extends at a constant width. Thus, the minimum value of the cross-sectional area along the circumferential direction of the first field core 242 may be obtained as a sum of cross-sectional areas of the first field core 242 in the circumferential direction at arm portions 262 existing on a virtual circle R that passes through parts that are most outward in the radial direction of the arm portions 262 among concentric circles centered around a shaft center of the shaft 212. In addition, in the fifth embodiment, the minimum value of the cross-sectional area along the circumferential direction of the first field core 242 is set the same as a surface area of the inner circumferential surface 242*g* of the first field core 242. In other words, when "L" represents a length of an arc existing on the virtual circle R which passes each arm portion 262, "n" represents the number of the arm portions 262, "d" represents an inner diameter of the inner circumferential surface 242*g* of the first field core 242, and "π" represents the ratio of a circle's circumference to its diameter, then the length L, the number n, and the inner diameter d are set so as to satisfy a relationship expressed as "nL=πd". Moreover, a detailed description of the second field core 252 is similar to the detailed description of the first field core 242 and thus will be omitted.

The first field core 242 is fixed to the core back 211 by being press-fitted into the press-fit recess 211*a* of the core back 211, and the one end side of the core back 211 is closed by the first field core 242. In addition, the second field core 252 is fixed to the core back 211 by being press-fitted into the press-fit recess 211*b* of the core back 211, and the other end side of the core back 211 is closed by the second field core 252. In a state where the first field core 242 is fixed to the core back 211, the first field core 242 is in close contact with the core back 211. Thus, the first field core 242 and the core back 211 are magnetically connected to each other. In addition, in a state where the second field core 252 is fixed to the core back 211, the second field core 252 is in close contact with the core back 211. Thus, the second field core 252 and the core back 211 are magnetically connected to each other.

The operation of the fifth embodiment will now be described.

As shown in FIG. 23, a field magnetic flux generated on the first field core 242 when a current is supplied to the first field coil 243 flows toward the shaft 212 as indicated by an arrow Y1. The field magnetic flux then passes through a magnetic void (gap) and flows to the shaft 212. Subsequently, as indicated by an arrow Y2, the field magnetic flux flows inside the shaft 212 in the axial direction of the shaft 212, and as indicated by an arrow Y3, flows in a direction perpendicular to the axis L1 of the shaft 212, flows through the rotor core 231 (the rotor teeth 231*a*) toward an outer diameter side, and passes through the stator core 221 (the stator teeth 221*a*). Further, as indicated by an arrow Y4, the field magnetic flux is guided through the core back 211 toward the first field pole 241.

In this case, the minimum value of the cross-sectional area along the circumferential direction of the first field core 242 may be obtained as a sum of cross-sectional areas of the first field core 242 in the circumferential direction at the arm portions 262 existing on a virtual circle R which is centered around a shaft center of the shaft 212 and which passes through the through holes 264. In addition, in the fifth embodiment, the minimum value of the cross-sectional area along the circumferential direction of the first field core 242 is set to be the same as the surface area of the inner circumferential surface 242*g* of the first field core 242. Accordingly, for example, since a magnetic flux flows more readily than when the minimum value of the cross-sectional area along the circumferential direction of the first field core 242 is smaller than the surface area of the inner circumferential surface 242*g* of the first field core 242, magnetic saturation of the first field core 242 is suppressed and, in turn, a decline in the torque of the motor 210 is suppressed.

In this manner, a field magnetic path formed by the first field core 242, the shaft 212, the rotor 230, the stator 220, and the core back 211 is formed. Thus, in the fifth embodiment, the core back 211 and the shaft 212 function as magnetic path forming members that form a field magnetic path together with the first field core 242, the rotor 230, and the stator 220. The second field core 252 is similar to the first field core 242 and this will not be described in detail.

In this manner, with the motor 210 of the fifth embodiment, an annular (loop-shaped) magnetic path (a flow of field magnetic flux) is formed, the rotor teeth 231*a* of the rotor 230 attain a polarity of an N-pole due to the field magnetic flux, and the rotor teeth 231*a* (the field magnetic flux) attain the same function as a permanent magnet arranged on a rotor in a permanent magnet synchronous motor.

In addition, with the motor 210 of the fifth embodiment, by increasing an amount of current supplied to the first and second field coils 243 and 253, the field magnetic flux can be increased and a greater torque can be produced. Further, with the motor 210 of the fifth embodiment, by reducing an amount of current supplied to the first and second field coils 243 and 253 during high-speed rotation, the field magnetic flux can be reduced and a maximum rotation speed can be increased.

Heat generated by the energization of the first and second field coils 243 and 253 and heat generated in the motor 210 by the stator coil 222 or the like is apt to accumulating in a space partitioned by the core back 211, the first field core 242, and the second field core 252. However, in the fifth embodiment, since through holes 264 are formed on the first field core 242 and the second field core 252, heat generated from the first and second field coils 243 and 253 and heat generated in the motor 210 by the stator coil 222 or the like is released through the through holes 264. Thus, the heat accumulated in the space formed by the core back 211, the first field core 242, and the second field core 252 is released to the outside through the through holes 264.

The fifth embodiment has the advantages described below.

(25) The plurality of through holes 264 are formed in the first and second field cores 242 and 252. Accordingly, heat generated by the energization of the first and second field coils 243 and 253 and heat generated in the motor 210 by the stator coil 222 can be released to the outside through the through holes 264. In addition, the through holes 264 are formed so that a sum of cross-sectional areas of the plurality of magnetic path portions 262 along a circumferential direction inside the first and second field cores 242 and 252 is greater than or equal to the surface areas of the inner circumferential surfaces 242*g* and 252*g*. Accordingly, even when the through holes 264 are formed on the first and second field cores 242 and 252, a field magnetic path in the circumferential direction in the first and second field cores 242 and 252 can be secured. As a result, heat generated in the motor 210 can be released while securing a field magnetic path.

(26) The through holes 264 are formed between the plurality of arm portions 262 that extend radially along a radial direction of the first and second field cores 242 and 252. Thus, compared to when there is only one through hole or when a plurality of through holes are arranged in concentration at one part of the first and second field cores 242 and 252, heat generated in the motor 210 can be released more readily through the through holes 264.

(27) The through holes 264 are formed so that the sum of cross-sectional areas of the plurality of magnetic path portions 262 along the circumferential direction of the first and second field cores 242 and 252 is greater than or equal to the surface areas of the inner circumferential surfaces 242g and 252g. Thus, sizes of the through holes 264 can be maximized while securing a field magnetic path inside the first and second field cores 242 and 252. As a result, heat generated in the motor 210 can be more readily released.

A sixth embodiment of a motor (rotary electric motor) serving as a rotary electric machine according to the present invention will now be described with reference to FIG. 26. In the sixth embodiment, components that are the same as the fifth embodiment will be denoted by the same reference characters and will not be described in detail.

Figure 26:
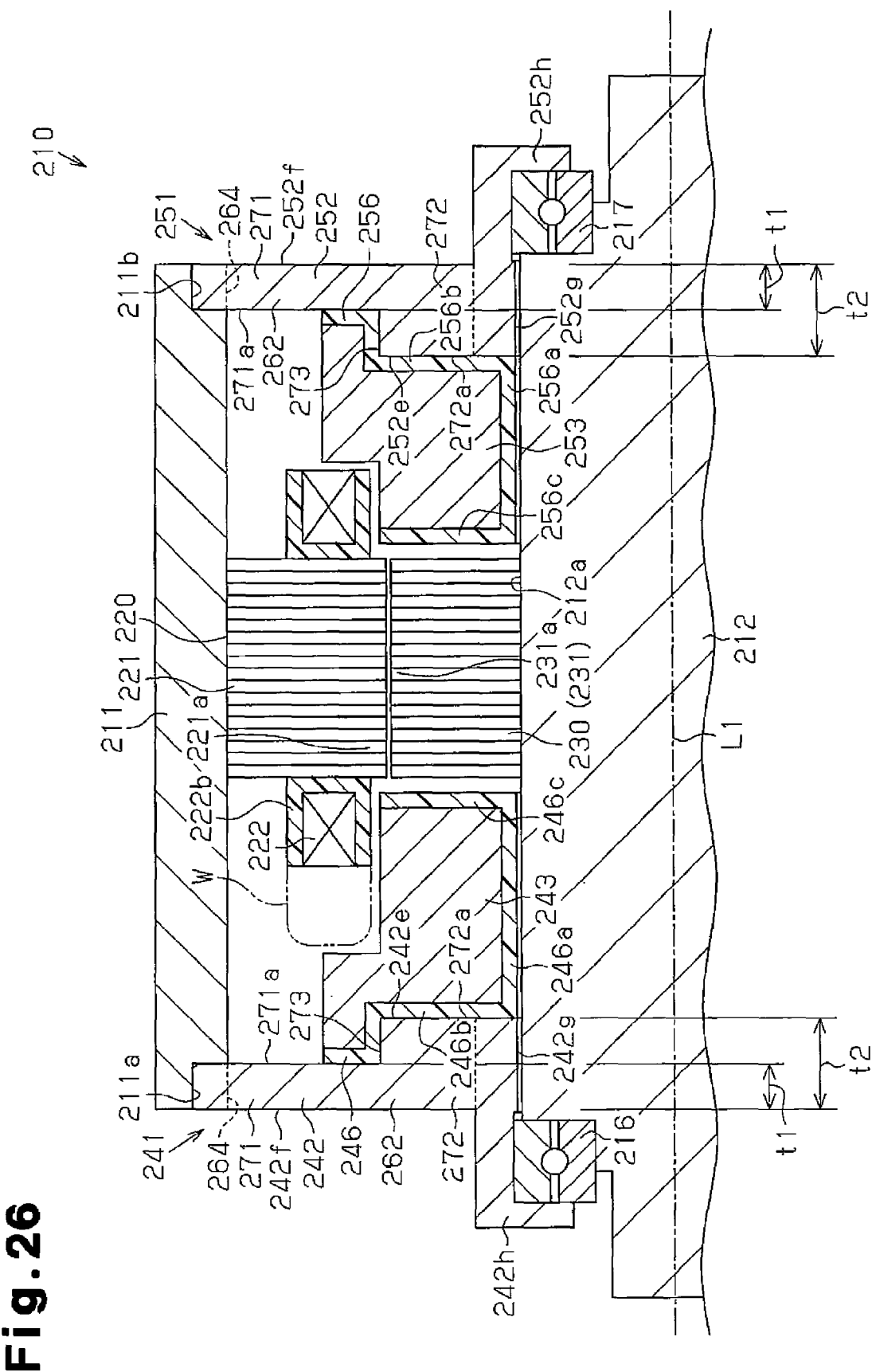
FIG. 26 is a partial side cross-sectional view of a rotary electric motor according to a sixth embodiment of the present invention.

As shown in FIG. 26, an end surface 242e of a first field core 242 on a side which a first field coil 243 is arranged has a stepped shape so that a thickness t1 of each arm portion 262 of a first field core 242 on a side of an outer circumferential portion 271 is smaller than a thickness t2 of each arm portion 262 on a side of an inner circumferential portion 272. Specifically, on the end surface 242e of the first field core 242, a stepped portion 273 that links an end surface 271a of the outer circumferential portion 271 and an end surface 272a of the inner circumferential portion 272 to each other is formed between the outer circumferential portion 271 and the inner circumferential portion 272. The stepped portion 273 is formed so as to extend in an axial direction of a shaft 212. Moreover, the first field core 242 of the sixth embodiment is molded.

Each through hole 264 is formed in the first field core 242 so that a cross-sectional area of the plurality of magnetic path portions 262 along a circumferential direction of the first field core 242 is equal to a surface area of the inner circumferential surface 242g. Specifically, when "L" represents a length of each arm portion 262 on a virtual circle R extending through the arm portion 262, "n" represents the number of the arm portions 262, "d" represents an inner diameter of the inner circumferential surface 242g of the first field core 242, "π" represents the ratio of a circle's circumference to its diameter, t1 represents a thickness on the side of the outer circumferential portion 271 (a thickness of the arm portions 262), and t2 represents a thickness on the side of the inner circumferential portion 272 (a thickness at the inner circumferential surface 242g of the first field core 242), then the first field core 242 is formed so as to satisfy the relationship expressed as "nLt1=πdt2". Moreover, the second field core 252 is similar to the first field core 242 and thus will not be described.

A flange portion 246b at one end of a first field coil bobbin 246 is formed to extend along the end surface 272a of the inner circumferential portion 272 of the first field core 242, bend along an outer circumferential surface of the stepped portion 273, and extend along the end surface 271a of the outer circumferential portion 271 of the first field core 242. In addition, part of the first field coil 243 is arranged closer to the end surface 271a of the outer circumferential portion 271 than the end surface 272a of the inner circumferential portion 272 of the first field core 242.

A flange portion 256b at one end of a second field coil bobbin 256 is formed to extend along the end surface 272a of the inner circumferential portion 272 of the second field core 252, bend along the outer circumferential surface of the stepped portion 273, and extend along the end surface 271a of the outer circumferential portion 271 of the second field core 252. In addition, part of the second field coil 253 is arranged closer to the end surface 271a of the outer circumferential portion 271 than the end surface 272a of the inner circumferential portion 272 of the second field core 252.

The operation of the sixth embodiment will now be described.

The part of the first and second field coils 243 and 253 necessary for generating a field magnetic flux on the first field core 242 and the second field core 252 is arranged closer to the end surface 271a of the outer circumferential portion 271 than the end surface 272a of the inner circumferential portion 272 of the field cores 242 and 252. In other words, the formation of the end surfaces 242e and 252e of the field cores 242 and 252 in a stepped shape increases the space for arrangement of the field coils 243 and 253 between the field cores 242 and 252 and the stator 220 and the rotor 230.

Accordingly, the sixth embodiment has the advantages described below in addition to advantages (25) to (27) of the fifth embodiment.

(28) The end surfaces 242e and 252e (end surfaces close to the rotor core 231) of the field cores 242 and 252 on a side on which the field coils 243 and 253 are arranged have a stepped shape such that the thickness t1 of the first field core 242 and the second field core 252 on the side of the outer circumferential portion 271 is smaller than the thickness t2 on the side of the inner circumferential portion 272. Thus, compared to when the end surfaces 242e and 252e of the field cores 242 and 252 are not stepped, arrangement spaces for the field coils 243 and 253 between the field cores 242 and 252 and the stator 220 and the rotor 230 can be increased. As a result, since part of the field coils 243 and 253 can be arranged in the increased arrangement space, the field cores 242 and 252 can be brought closer to the stator 220 and the rotor 230 by just that much. Thus, the entire motor 210 in the axial direction of the shaft 212 can be downsized.

(29) When "L" represents the length of an arc existing on the virtual circle R that passes through each arm portion 262, "n" represents the number of the arm portions 262, "d" represents the inner diameter of the inner circumferential surface 242g of the first field core 242, "π" represents the circular constant, t1 represents the thickness on the side of the outer circumferential portion 271, and t2 represents the thickness on the side of the inner circumferential portion 272, then the length L, the number n, the inner diameter d, and the thicknesses t1 and t2 are set so as to satisfy a relationship expressed as "nLt1=πdt2". Accordingly, with the first and second field cores 242 and 252 having a stepped shape, largest possible arrangement spaces for the first and second field coils 243 and 253 can be formed on end surfaces 242e and 252e of the first and second field cores 242 and 252 while securing a field magnetic path and, at the same time, the size of each through hole 264 can be made as large as possible.

(30) The end surfaces 242e and 252e of the field cores 242 and 252 have stepped shapes. The shapes of the end surfaces 242e and 252e of the field cores 242 and 252 can be obtained more easily than when, for example, the end surfaces 242e and 252e of the field cores 242 and 252 are given a tapered shape in order to increase the arrangement spaces for the field coils 243 and 253 between the field cores 242 and 252 and the stator 220 and the rotor 230.

The fifth and sixth embodiments may be modified as described below.

Figure 27:
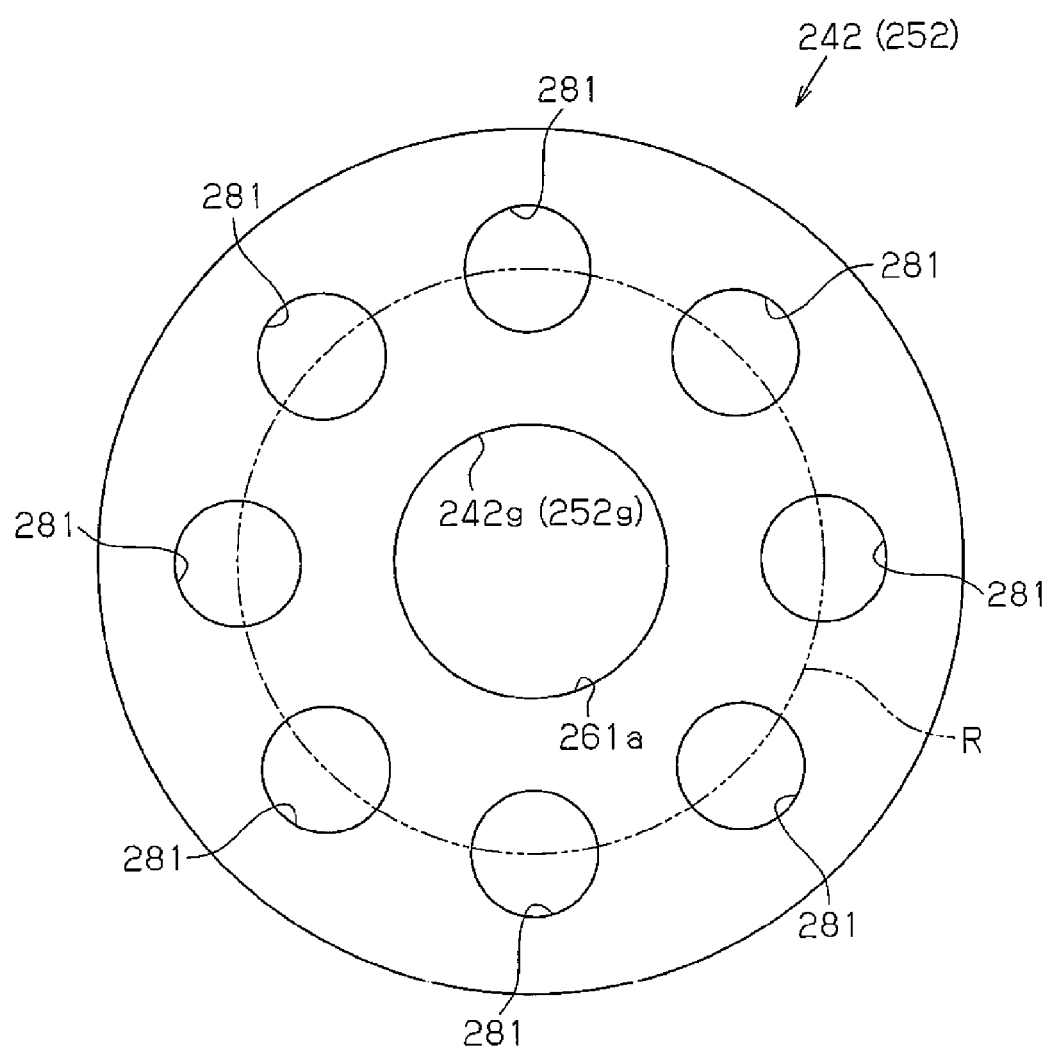
FIG. 27 is a front view of a field core according to other examples of the fifth and sixth embodiments.

As shown in FIG. 27, a plurality of through holes 281 having a circular hole-shape as viewed from above may be formed. In this case, the through holes 281 must be formed so that a minimum value of the cross-sectional areas of the plurality of magnetic path portions in the first and second field cores 242 and 252 along the circumferential direction of the first and second field cores 242 and 252 is greater than or equal to the surface areas of the inner circumferential surfaces 242g and 252g. Here, the "minimum value of the cross-sectional areas of the plurality of magnetic path portions in the first and second field cores 242 and 252 along the circumferential direction of the first and second field cores 242 and 252 is greater than or equal to the surface areas of the inner circumferential surfaces 242g and 252g means that when the diameter of the virtual circle R is varied, the minimum value of the "cross-sectional areas in the circumferential direction" is greater than or equal to the areas of the inner circumferential surfaces 242g and 252g of the first and second field cores 242 and 252.

In the fifth and sixth embodiments, the numbers of through holes 264 and 281 formed on the first and second field cores 242 and 252 may be changed as required.

In the fifth and sixth embodiments, the minimum value of cross-sectional areas of the plurality of magnetic path portions in the first and second field cores 242 and 252 along the circumferential direction of the first and second field cores 242 and 252 may be greater than the surface areas of the inner circumferential surfaces 242g and 252g.

In the fifth and sixth embodiments, the end surfaces 242e and 252e of the first and second field cores 242 and 252 may be formed in a tapered shape in which the thicknesses of the first and second field cores 242 and 252 become smaller toward an outer side in a radial direction. In this case, the widths of the arm portions 262 are arranged to increase toward the outer side in the radial direction.

In the fifth and sixth embodiments, the coupling portion 263 may be eliminated and the outer sides of the through holes 264 in the radial direction may be opened.

In the fifth and sixth embodiments, while the core back 211 is formed from soft magnetic composites (SMC), the core back 211 is not limited in such a manner and may be formed by a magnetic body such as an iron mass.

In the fifth and sixth embodiments, while the field cores 242 and 252 are formed from soft magnetic composites (SMC), the field cores 242 and 252 are not limited in such a manner and may be formed by a magnetic body such as an iron mass.

In the fifth and sixth embodiments, while the rotor core 231 is formed by laminating a plurality of magnetic steel sheets, the rotor core 231 is not limited in such a manner and may be formed by a magnetic body such as soft magnetic composites (SMC) or an iron mass.

In the fifth and sixth embodiments, only the first field pole 241 or only the second field pole 251 may be provided. In other words, a field pole may be arranged on only one side in the direction of the axis L1.

In the fifth and sixth embodiments, while the shaft 212 is used as a magnetic path forming member and a field magnetic path is formed through the shaft 212, the field magnetic path formation is not limited in such a manner, and a field magnetic path may be formed without the shaft 212. For example, a magnetic body with a lower magnetic resistance than the shaft 212 (for example, a magnetic body such as soft magnetic composites (SMC) or an iron mass) may be provided as a magnetic path forming member on an outer circumference of the shaft 212 to form a field magnetic path.

In the fifth and sixth embodiments, the number of the stator teeth 221a of the stator 220 may be changed as required.

In the fifth and sixth embodiments, the number of the rotor teeth 231a of the rotor 230 may be changed as required.

In the fifth and sixth embodiments, while the rotor teeth 231a as salient pole sections have convex shapes, the rotor teeth 231a are not limited to this structure and need only have saliency. For example, the rotor may have an overall cylindrical shape by arranging only the distal ends of the rotor teeth to be coupled to adjacent rotor teeth or by filling the recesses between the rotor teeth with a non-magnetic body.

In the fifth and sixth embodiments, the field coil bobbins 246 and 256 may be eliminated. In this case, a molded field coil is directly fastened to the field cores 242 and 252. Furthermore, when a coating of the field coil provides sufficient insulation, the field coil may be directly wound around the field cores 242 and 252.

In the fifth and sixth embodiments, the insulation of the stator coil 222 is not limited to the stator coil bobbin 222b. For example, an insulating paper may be used. When a coating of the coil provides sufficient insulation, the coil may be directly wound around the stator teeth 221a.

In the fifth and sixth embodiments, the number of steps formed on the end surfaces 242e and 252e of the field cores 242 and 252 is not specifically limited.

In the fifth and sixth embodiments, while the field cores 242 and 252 are fixed to the core back 211 by being press-fitted into press-fit recesses 211a and 211b provided in a recessed manner at the opening portion of the core back 211, the field cores 242 and 252 are not limited to this structure and the core back 211 and the field cores 242 and 252 need only be magnetically connected to each other.

In the fifth and sixth embodiments, cooling may be aggressively performed through the through holes 264 and 281 by blowing ambient air or by agitating air with internal fins formed on the rotor 230.

While the present invention has been embodied in the motor 210 (a rotary electric motor), the present invention may alternatively be embodied in a generator.

A seventh embodiment in which the present invention is embodied in a motor (a rotary electric motor) serving as a rotary electric machine will now be described with reference to FIGS. 28 to 31B.

Figure 28:
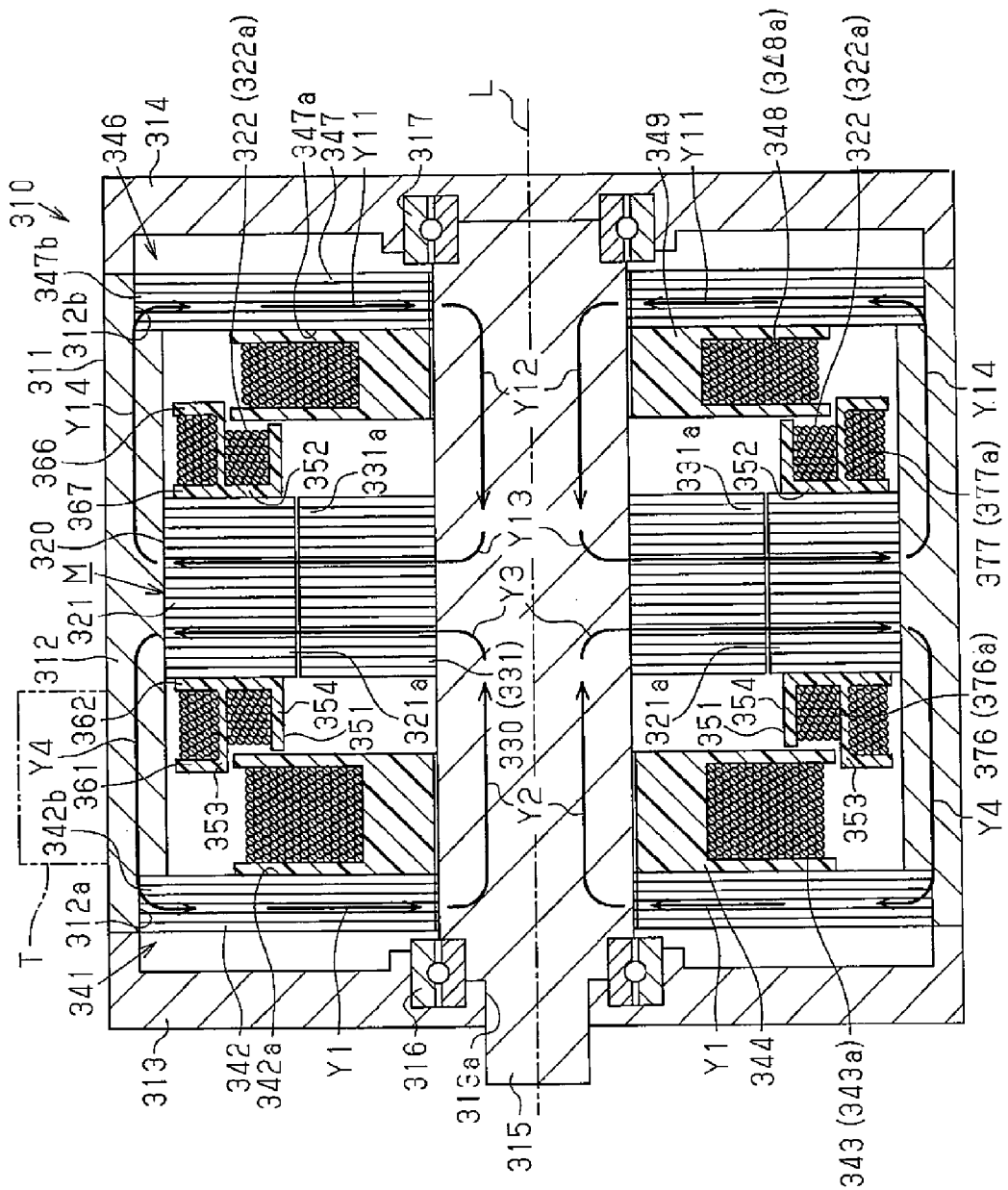
FIG. 28 is a side cross-sectional view of a rotary electric motor according to a seventh embodiment of the present invention.

As shown in FIG. 28, a housing 311 of a motor 10 includes a cylindrical core back (field yoke) 312, a first housing 313 with a bottomed cylindrical shape that is coupled to one end (a left end as shown in FIG. 28) of the core back 312, and a second housing 314, which has a cylindrical shape, includes a closed bottom, and is coupled to another end (a right end as shown in FIG. 28) of the core back 312. The first housing 313 and the second housing 314 are formed from a non-magnetic material. The core back 312 is a magnetic body and formed from soft magnetic composites (SMC) in the seventh embodiments. A through hole 313a is formed in a bottom wall of the first housing 313. A main electric motor portion M is housed in the housing 311.

A shaft (rotary shaft) 315 that forms part of the main electric motor portion M is housed in the core back 312. The shaft 315 is formed of a soft magnetic material (for example, iron or silicon steel) in an generally cylindrical shape. The shaft 315 is rotatably supported by the first housing 313 and the second housing 314 by bearings 316 and 317. One end (left end as shown in FIG. 28) of the shaft 315 protrudes out of the housing 311 from the through hole 313a.

A stator 320 (stationary part) that forms a part of the main electric motor portion M is fixed to an inner circumferential surface of the core back 312. The stator 320 includes an annular stator core 321 fixed to the inner circumferential surface of the core back 312 and an armature coil (stator winding) 322. The core back 312 covers the entire circumference of an outer circumferential surface of the stator core 321, and the outer circumferential surface of the stator core 321 and the inner circumferential surface of the core back 312 are in close contact with each other. Thus, the stator core 321 and the core back 312 are magnetically connected to each other. The stator core 321 is formed by laminating a plurality of steel sheets in a direction along an axis L of the shaft 315.

Figure 29:
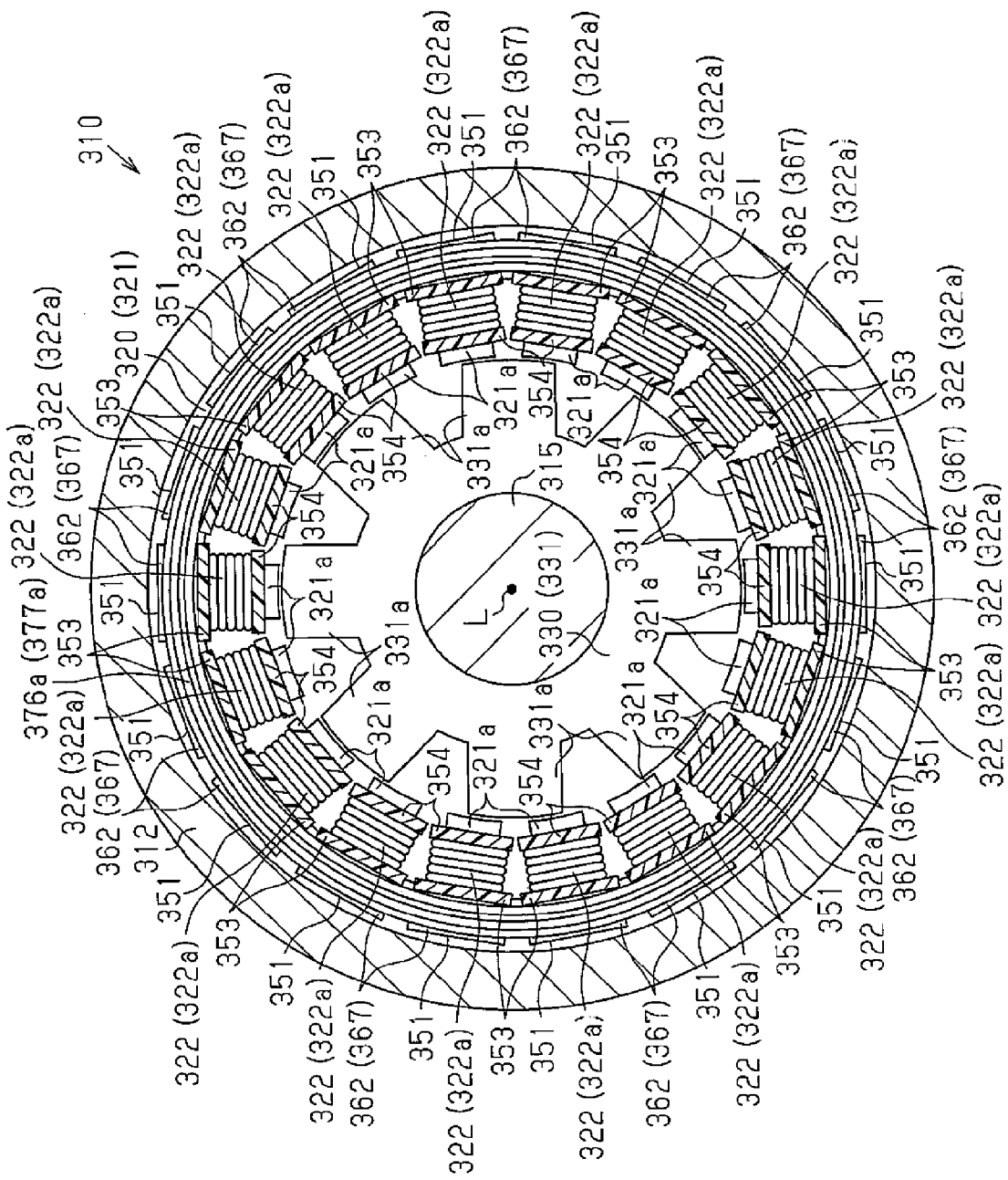
FIG. 29 is a longitudinal cross-sectional view of the rotary electric motor shown in FIG. 28.

As shown in FIG. 29, the stator core 321 includes a plurality of stator teeth 321a that protrude toward the shaft 315 at regular intervals in a circumferential direction of the stator core 321. Distal surfaces of the stator teeth 321a are all positioned on the same circumferential plane. An armature coil bobbin 351 made of an insulating resin material is mounted to each stator tooth 321a. In addition, the armature coil 322 is formed by winding an armature coil conducting wire 322a made of a conductive metallic material (in the seventh embodiment, copper) into a plurality of windings around the armature coil bobbin 351 by concentrated winding. Moreover, the armature coil 322 is configured so as to have any of a U phase, a V phase, and a W phase and to generate a rotating magnetic field when supplied with currents having phases that differ from each other.

As shown in FIG. 28, a rotor 330 (rotating part) that forms a part of the main electric motor portion M is provided on an inner side of the stator 320. The rotor 330 has a rotor core 331 fixedly attached to the shaft 315. The rotor core 331 is configured so as to be integrally rotatable with the shaft 315 around the axis L of the shaft 315. An outer circumferential surface of the shaft 315 and an inner circumferential surface of the rotor core 331 are in close contact with each other. Thus, the shaft 315 and the rotor core 331 are magnetically connected to each other. The rotor core 331 is formed by laminating a plurality of steel sheets formed from a soft magnetic material in a direction along the axis L. Thus, in the rotor core 331, a magnetic flux more readily flows in a radial direction and a circumferential direction of the rotor core 331 that are perpendicular to the axis L than in a direction along the axis L.

The length of the rotor core 331 in the direction along the axis L is set to be the same as the length of the stator core 321 in the direction along the axis L. Thus, coil ends of the armature coil 322 in the direction along the axis L protrude more outward than both ends of the rotor core 331.

As shown in FIG. 29, the rotor core 331 includes a plurality of rotor teeth 331a serving as magnetic salient poles that protrude outward in a radial direction. The plurality of rotor teeth 331a are provided at regular intervals in a circumferential direction of the rotor core 331. Distal surfaces of the rotor teeth 331a are all positioned on the same circumferential plane. A slight clearance is formed between the distal surfaces of the rotor teeth 331a and the distal surfaces of the stator teeth 321a. In addition, the rotor teeth 331a and the stator teeth 321a are magnetically connected to each other through the clearance.

Thus, in the seventh embodiment, the main electric motor portion M is formed by the shaft 315, the stator 320, and the rotor 330.

As shown in FIG. 28, a first field pole 341 for generating a field magnetic flux is arranged at one end opening portion of the core back 312. The first field pole 341 includes an annular first field core 342 and a first field coil 343 serving as a field winding. The first field core 342 is formed by laminating a plurality of steel sheets formed from a magnetic material in a direction along the axis L. A first field coil bobbin 344 is fastened to an end surface 342a of the first field core 342 on a side opposite to an end surface that faces the first housing 313. In addition, the first field coil 343 is formed by winding a first field coil conducting wire 343a made of a conductive metallic material (in the seventh embodiment, copper) into a plurality of windings around the first field coil bobbin 344.

The first field core 342 is fixed to the core back 312 by fitting an outer circumferential portion 342b of the first field core 342 into a recess 312a provided in a recessed manner at one end opening portion of the core back 312. In a state in which the first field core 342 is fixed to the core back 312, the outer circumferential portion 342b of the first field core 342 is in close contact with the core back 312. Thus, the first field core 342 and the core back 312 are magnetically connected to each other. In addition, the shaft 315 is inserted into an inner side of the first field core 342, and a slight clearance is formed between an inner circumferential surface of the first field core 342 and the outer circumferential surface of the shaft 315. Further, the first field core 342 and the shaft 315 are magnetically connected to each other through the clearance.

A second field pole 346 for generating a field magnetic flux is arranged at another end opening portion of the core back 312. The second field pole 346 includes an annular second field core 347 and a second field coil 348 serving as a field winding. The second field core 347 is formed by laminating a plurality of steel sheets formed from a magnetic material in a direction along the axis L. A second field coil bobbin 349 is fastened to an end surface 347a of the second field core 347 on a side opposite to an end surface that faces the second housing 314. In addition, the second field coil 348 is formed by winding a second field coil conducting wire 348a made of a conductive metallic material (in the seventh embodiment, copper) into a plurality of windings around the second field coil bobbin 349.

The second field core 347 is fixed to the core back 312 by fitting an outer circumferential portion 347b of the second field core 347 into a recess 312b provided in a recessed manner at the other end opening portion of the core back 312. In a state in which the second field core 347 is fixed to the core back 312, the outer circumferential portion 347b of the second field core 347 is in close contact with the core back 312. Thus, the second field core 347 and the core back 312 are magnetically connected to each other. In addition, the shaft 315 is inserted into an inner side of the second field core 347, and a slight clearance is formed between an inner circumferential surface of the second field core 347 and the outer circumferential surface of the shaft 315. In addition, the second field core 347 and the shaft 315 are magnetically connected to each other through the clearance.

The armature coil bobbin 351 will now be described in detail.

Figure 31A:
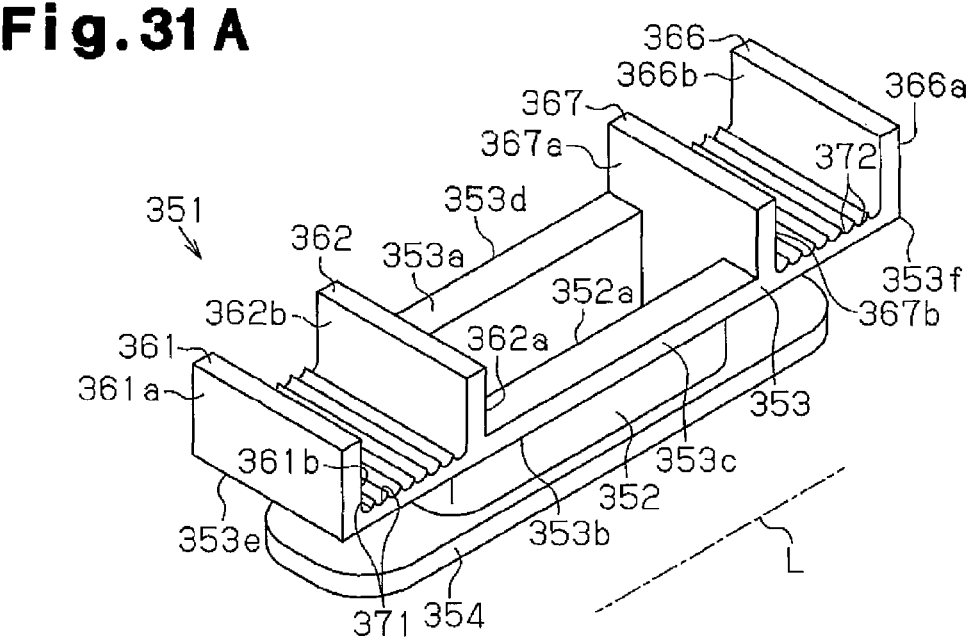
FIG. 31A is a perspective view in which an armature coil bobbin shown in FIG. 28 is viewed from a side of one end opening.
Figure 31B:
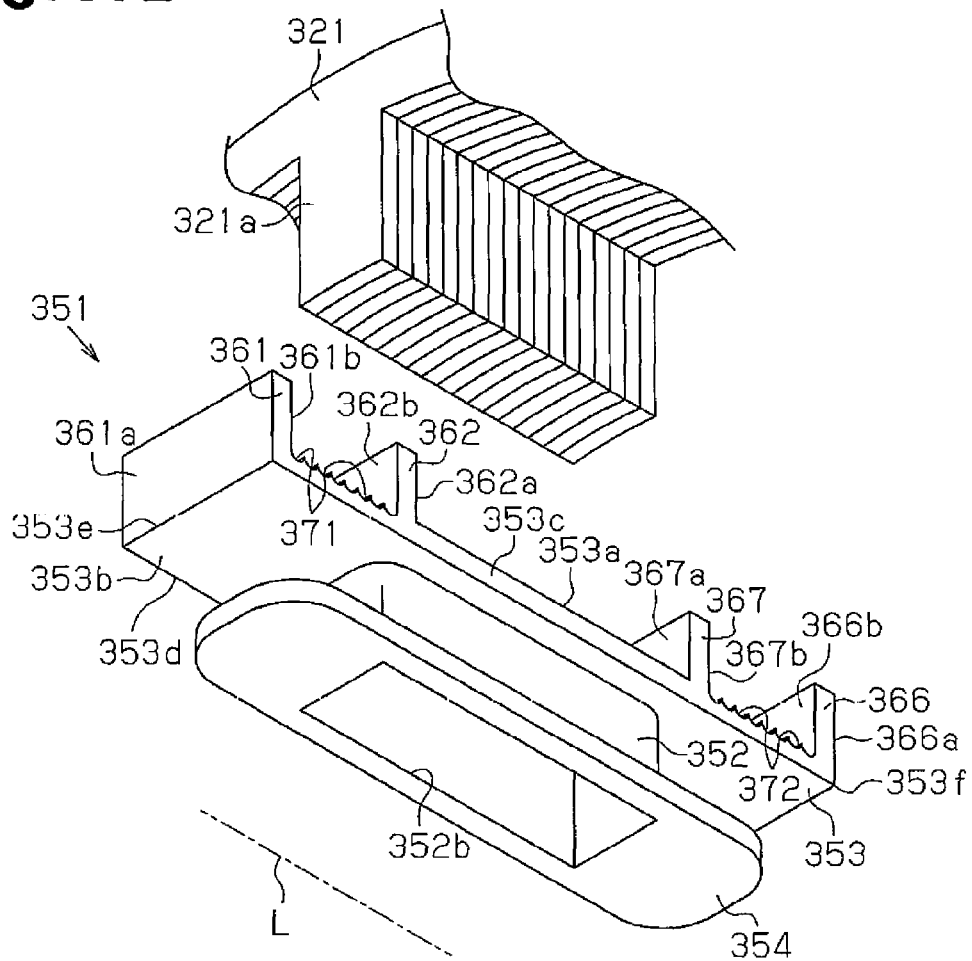
FIG. 31B is a perspective view in which the armature coil bobbin shown in FIG. 28 is viewed from a side of another end opening.

As shown in FIGS. 31A and 31B, the armature coil bobbin 351 includes a coil-wound portion 352 with a square-tube shape that is wound by the armature coil conducting wire 322a, a first flange 353 with a square-tube shape that extends outward from an entire circumference of an opening edge of the one end opening portion 352a of the coil-wound portion 352, and a second flange 354 with a square-tube shape that extends outward from an entire circumference of an opening edge of the other end opening portion 352b. In other words, the first flange 353 and the second flange 354 are a pair of flanges separated from each other in an axial direction of the coil-wound portion 352 on an outer circumferential surface of the coil-wound portion 352.

The armature coil 322 is formed by winding the armature coil conducting wire 322a by concentrated winding in a region sandwiched between the first flange 353 and the second flange 354 on the outer circumferential surface of the coil-wound portion 352. In addition, the first flange 353 and the second flange 354 regulate movement of the armature coil 322 in an axial direction of the coil-wound portion 352 (a movement of the armature coil 322 in a radial direction of the stator core 321).

The stator teeth 321a can be inserted into the coil-wound portion 352 from the side of the one end opening portion 352a of the coil-wound portion 352. The length of the coil-wound portion 352 along the axial direction of the coil-wound portion 352 is shorter than a length of the stator teeth 321a in a protruding direction, and the armature coil bobbin 351 is mounted to the stator teeth 321a by inserting the stator teeth 321a into the coil-wound portion 352.

The first flange 353 and the second flange 354 are provided so that, in a state in which the armature coil bobbin 351 is mounted to each stator tooth 321a, the first flange 353 and the second flange 354 extend parallel to each other along the axis L of the shaft 315. The first flange 353 is positioned more outward in a radial direction than the second flange 354. The length of the first flange 353 along the axis L of the shaft 315 is longer than the length of the second flange 354 along the axis L of the shaft 315.

A first regulating projection 361 and a second regulating projection 362 serving as a pair of regulating projections which protrude outward in the radial direction and which are separated from each other in the direction along the axis L of the shaft 315 are provided close to one end of the first flange 353 in the direction along the axis L of the shaft 315 on one end surface 353a of the first flange 353 which is provided an outer side in the radial direction.

Figure 30:
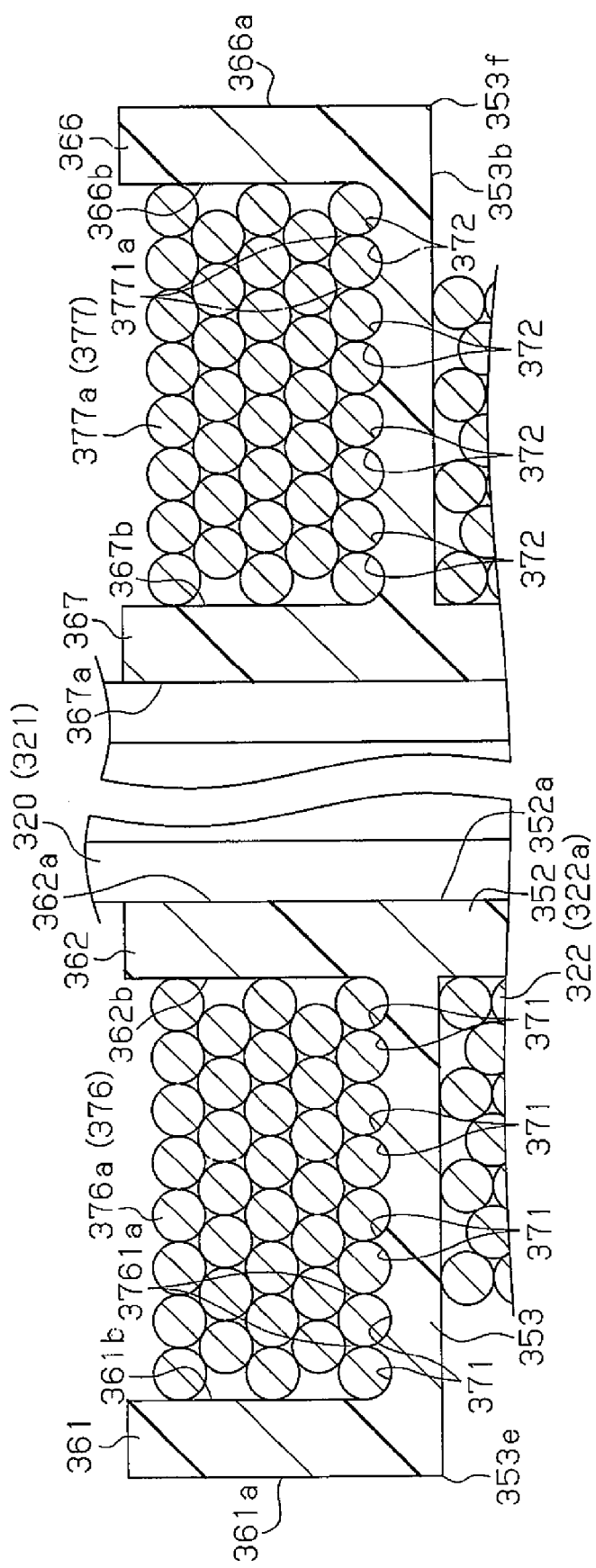
FIG. 30 is a side cross-sectional view showing an enlargement of a part of the rotary electric motor shown in FIG. 28.

A surface 361a of the first regulating projection 361 on a side opposite to a surface that faces the second regulating projection 362 is provided so as to be continuous with a third border portion 353e of the first flange 353 which extends in the direction along the axis L of the shaft 315 and which links ends of a first border portion 353c and a second border portion 353d of the first flange 353 with each other. In addition, as shown in FIG. 30, a surface 362a of the second regulating projection 362 on a side opposite to the first regulating projection 361 is provided so as to be continuous with the end opening portion 352a of the coil-wound portion 352.

As shown in FIG. 31A, a plurality of first engagement recesses 371 serving as engagement recesses are formed continuously in the direction along the axis L of the shaft 315 in a region sandwiched between the first regulating projection 361 and the second regulating projection 362 on the one end surface 353a of the first flange 353. Each first engagement recess 371 is formed extending in a straight line so as to link the first border portion 353c and the second border portion 353d of the first flange 353 with each other. In addition, each first engagement recess 371 is recessed so as to curve in an arc shape from one end surface 353a of the first flange 353 toward the other end surface 353b of the first flange 353 on the side of the coil-wound portion 352.

In the direction along the axis L of the shaft 315, the first engagement recess 371 positioned closest to one end among the first engagement recesses 371 is provided so as to be continuous with the surface 361b of the first regulating projection 361 that faces the second regulating projection 362. In addition, in the direction along the axis L of the shaft 315, the first engagement recess 371 positioned closest to the other end among the first engagement recesses 371 is provided so as to be continuous with the surface 362b of the second regulating projection 362 that faces the first regulating projection 361.

A third regulating projection 366 and a fourth regulating projection 367 serving as a pair of regulating projections which protrude outward in the radial direction and which are separated from each other in the direction along the axis L of the shaft 315 are provided close to the other end of the first flange 353 in the direction along the axis L of the shaft 315 on one end surface 353a of the first flange 353.

A surface 366a of the third regulating projection 366 on a side opposite to the fourth regulating projection 367 is provided so as to be continuous with a fourth border portion 353f which links other end portions of the first border portion 353c and the second border portion 353d of the first flange 353 with each other. In addition, a surface 367a of the fourth regulating projection 367 on a side opposite to the third regulating projection 366 is provided so as to be continuous with the one end opening portion 352a of the coil-wound portion 352.

A plurality of second engagement recesses 372 as engagement recesses are formed in series in the direction along the axis L of the shaft 315 in a region sandwiched between the third regulating projection 366 and the fourth regulating projection 367 on the one end surface 353a of the first flange 353. Each second engagement recess 372 is formed extending in a straight line so as to link the first border portion 353c and the second border portion 353d of the first flange 353 with each other. In addition, each second engagement recess 372 is recessed so as to curve in an arc shape from the one end surface 353a of the first flange 353 toward the other end surface 353b of the first flange 353 on the side of the coil-wound portion 352.

In the direction along the axis L of the shaft 315, the second engagement recess 372 positioned closest to the other end among the second engagement recesses 372 is provided so as to be continuous with a surface 366b of the third regulating projection 366 that faces the fourth regulating projection 367. In addition, in the direction along the axis L of the shaft 315, the second engagement recess 372 positioned closest to one of the ends of the second engagement recesses 372 is continuous with a surface 367b of the fourth regulating projection 367 that faces the third regulating projection 366.

As shown in FIG. 29, the armature coil bobbins 351 are arranged approximately on a concentric circle around the axis L of the shaft 315. In addition, the first engagement recesses 371 and the second engagement recesses 372 of the armature coil bobbins 351 are wound by a third field coil conducting wire 376a and a fourth field coil conducting wire 377a made of a conductive metallic material (in the seventh embodiment, copper) so that the third field coil conducting wire 376a and the fourth field coil conducting wire 377a are wound in an hanging manner around the axis L of the shaft 315 while being engaged by the first engagement recesses 371 and the second engagement recesses 372.

As shown in FIG. 30, the third field coil conducting wire 376a is wound around the first engagement recesses 371 and then wound a plurality of turns so as to pass through recesses 3761a formed between the third field coil conducting wires 376a wound around the first engagement recesses 371. Thus, a third field coil 376 is formed between the first regulating projection 361 and the second regulating projection 362. In other words, the third field coil 376 is arranged more outward in the radial direction than the armature coil 322.

In addition, the fourth field coil conducting wire 377a is wound around the second engagement recesses 372 and then wound into a plurality of windings so as to pass through recesses 3771a formed between fourth field coil conducting wires 377a wound around the second engagement recesses 372. Thus, a fourth field coil 377 is formed between the third regulating projection 366 and the fourth regulating projection 367. In other words, the fourth field coil 377 is arranged more outward in the radial direction than the armature coil 322.

Next, the operation of the motor 310 of the seventh embodiment will be described focusing on a magnetic path (a flow of field magnetic flux) formed when a current is supplied to the field coils 343, 348, 376, and 377. Further, a terminal block T (depicted by double-dashed lines in FIG. 28) for supplying a current to the field coils 343, 348, 376, and 377 is provided on the outer circumferential surface of the housing 311. Starting ends (not shown) of the field coil conducting wires 343a, 348a, 376a, and 377a are routed to the outside of the housing 311 and electrically connected to the terminal block T.

As shown in FIG. 28, a field magnetic flux generated on the first field core 342 when a current is supplied to the field coils 343 and 376 flows toward the shaft 315 as indicated by an arrow Y1. The field magnetic flux then passes through a magnetic void (gap) and flows to the shaft 315. Subsequently, as indicated by an arrow Y2, the field magnetic flux flows inside the shaft 315 in the direction of the axis L, and as indicated by an arrow Y3, flows in a direction perpendicular to the axis L of the shaft 315, flows through the rotor core 331 (the rotor teeth 331a) toward an outer diameter side, and passes through the stator core 321 (the stator teeth 321a). Further, as indicated by an arrow Y4, the field magnetic flux is guided through the core back 312 toward the first field pole 341.

In this manner, a field magnetic path formed by the first field core 342, the shaft 315, the rotor 330, the stator 320 (the stator core 321), and the core back 312 is formed. Thus, in the seventh embodiment, the core back 312, the shaft 315, and the first field core 342 function as magnetic path forming members that form a field magnetic path together with the rotor 330 and the stator 320 (the stator core 321).

In a similar manner, a field magnetic flux generated on the second field core 347 when a current is supplied to the field coils 348 and 377 flows toward the shaft 315 as indicated by an arrow Y11. The field magnetic flux then passes through a magnetic void (gap) and flows to the shaft 315. Subsequently, as indicated by an arrow Y12, the field magnetic flux flows inside the shaft 315 in the direction of the axis L, and as indicated by an arrow Y13, flows in a direction perpendicular to the axis L of the shaft 315, flows through the rotor core 331 (the rotor teeth 331a) toward an outer diameter side, and passes through the stator core 321 (the stator teeth 321a). Further, as indicated by an arrow Y14, the field magnetic flux is guided through the core back 312 toward the second field pole 346.

In this manner, a field magnetic path formed by the second field core 347, the shaft 315, the rotor 330, the stator 320 (the stator core 321), and the core back 312 is formed. Thus, in the seventh embodiment, the core back 312, the shaft 315, and the second field core 347 function as magnetic path forming members that form a field magnetic path together with the rotor 330 and the stator 320.

In this manner, with the motor 310 of the seventh embodiment, an annular (loop-shaped) magnetic path (a flow of field magnetic flux) is formed, the rotor teeth 331a of the rotor 330 attain a polarity of an N-pole due to the field magnetic flux, and the rotor teeth 331a (the field magnetic flux) attain the same function as a permanent magnet arranged on a rotor in a permanent magnet synchronous motor.

With the motor 310 of the seventh embodiment, by increasing an amount of current supplied to the field coils 343, 348, 376, and 377, the field magnetic flux can be increased and a greater torque can be produced. Further, with the motor 310 of the seventh embodiment, by reducing an amount of current supplied to the field coils 343, 348, 376, and 377 during high-speed rotation, the field magnetic flux can be reduced and a maximum rotation speed can be increased. In other words, with the motor 310 of the seventh embodiment, a maximum torque and a maximum rotation speed can be increased by field strengthening control alone. Thus, with the motor 310 of the seventh embodiment, field weakening control that is required when a permanent magnet is arranged on the rotor 330 becomes unnecessary and a structure of the motor 310 can be simplified.

Further, among the field coils 343, 348, 376, and 377 that are required to generate a field magnetic flux on the first field core 342 and the second field core 347, the third field coil 376 and the fourth field coil 377 are wound around the first flange 353 of each armature coil bobbin 351. Thus, the third field coil conducting wire 376a and the fourth field coil conducting wire 377a that are required for generating a sufficient field magnetic flux on the first field core 342 and the second field core 347 need not be wound around the first field coil bobbin 344 and the second field coil bobbin 349. As a result, the size of the first field coil bobbin 344 and the second field coil bobbin 349 in the direction along the axis L of the shaft 315 is suppressed and, in turn, the size of the motor 310 in the direction along the axis L of the shaft 315 is suppressed.

The seventh embodiment has the advantages described below.

(31) The third field coil conducting wire 376a and the fourth field coil conducting wire 377a that form the third field coil 376 and the fourth field coil 377 among the field coils 343, 348, 376, and 377 are wound around the first flange 353 of each armature coil bobbin 351 positioned on the outer side in the radial direction in a hanging manner around the axis L of the shaft 315. Thus, the field coils 376 and 377 can be arranged by effectively utilizing a dead space that exists in the housing 311 on an outer side in the radial direction of the armature coil bobbin 351, and field coil bobbins can be minimized. As a result, a space for arranging field coil bobbins can be minimized in the housing 311 and a size of the motor 310 in the direction along the axis L of the shaft 315 can be downsized.

(32) The first engagement recess 371 and the second engagement recess 372, which are engaged by the third field coil conducting wire 376a and the fourth field coil conducting wire 377a are formed on the first flange 353. Thus, when the third field coil conducting wire 376a and the fourth field coil conducting wire 377a are wound around the first flange 353, the third field coil conducting wire 376a and the fourth field coil conducting wire 377a are engaged with the first engagement recess 371 and the second engagement recess 372. Accordingly, the engagement between the third field coil conducting wire 376a and the fourth field coil conducting wire 377a, and the first engagement recess 371 and the second engagement recess 372 causes the third field coil conducting wire 376a and the fourth field coil conducting wire 377a to be positioned with respect to the first flange 353. As a result, regular winding of the third field coil conducting wire 376a and the fourth field coil conducting wire 377a can be readily performed on the first flange 353.

(33) The first regulating projection 361 and the second regulating projection 362 which protrude outward in the radial direction and which are separated from each other in the direction along the axis L of the shaft 315, are provided close to one end of the first flange 353 in the direction along the axis L of the shaft 315. In addition, the third regulating projection 366 and the fourth regulating projection 367, which protrude outward in the radial direction and which are separated from each other in the direction along the axis L of the shaft 315, are provided close to the other end of the first flange 353 in the direction along the axis L of the shaft 315. Thus, the third field coil conducting wire 376a can be restricted from being separated from the first flange 353 by the first regulating projection 361 and the second regulating projection 362, and the fourth field coil conducting wire 377a can be restricted from being separated from the first flange 353 by the third regulating projection 366 and the fourth regulating projection 367.

The seventh embodiment may be modified as described below.

In the seventh embodiment, the first field coil 343 and the second field coil 348 may be eliminated. In this case, the third field coil 376 and the fourth field coil 377 must be capable of generating a sufficient field magnetic flux on the first field core 342 and the second field core 347. Accordingly, the field coil bobbin can be eliminated and the size of the motor 310 in the direction along the axis L of the shaft 315 can be further downsized.

In the seventh embodiment, while the rotor core 331 is formed by laminating a plurality of steel sheets (magnetic steel sheets), the rotor core 331 is not limited in such a manner and may be formed by a magnetic body such as SMC or an iron mass. In a similar manner, the field cores 342 and 347 may also be formed by a magnetic body such as SMC or an iron mass.

In the seventh embodiment, any of or all of the regulating projections 361, 362, 366, and 367 may be eliminated. Accordingly, molding of a bobbin may be readily performed.

In the seventh embodiment, the engagement recesses 371 and 372 may be eliminated.

In the seventh embodiment, each armature coil bobbin 351 may be separated into an inner diameter-side and an outer diameter-side. Accordingly, molding of a bobbin may be readily performed.

In the seventh embodiment, the number of the stator teeth 321a of the stator 320 may be changed as required. In addition, the number of the rotor teeth 331a of the rotor 330 may be changed as required.

In the seventh embodiment, only the first field pole 341 or only the second field pole 346 may be provided. In other words, a field pole may be provided only on one side in the direction of the axis L.

In the seventh embodiment, while a field magnetic path is formed through the shaft 315, field magnetic path formation is not limited in such a manner and a field magnetic path may be formed without the shaft 315. A magnetic body with a lower magnetic resistance than the shaft 315 may be provided on the shaft 315 to form a field magnetic path. For example, SMC may be used as the magnetic body.

In the seventh embodiment, while the rotor teeth 331a serving as salient pole sections have convex shapes, the rotor teeth 331a are not limited to this structure and need only have saliency. For example, the rotor may have an overall cylindrical shape by arranging only the distal ends of the rotor teeth to be coupled to adjacent rotor teeth or by filling the recesses between the rotor teeth with a non-magnetic body.

In the seventh embodiment, while the core back 312 is formed of SMC, the core back 312 is not limited in such a manner and may be a magnetic body such as an iron mass.

In the seventh embodiment, while the present invention has been embodied in the motor 310 serving as a rotary electric machine, the present invention is not limited in such a manner and may be used as a generator.

An eighth embodiment of the present invention will now be described with reference to FIGS. 32 to 36.

Figure 32:
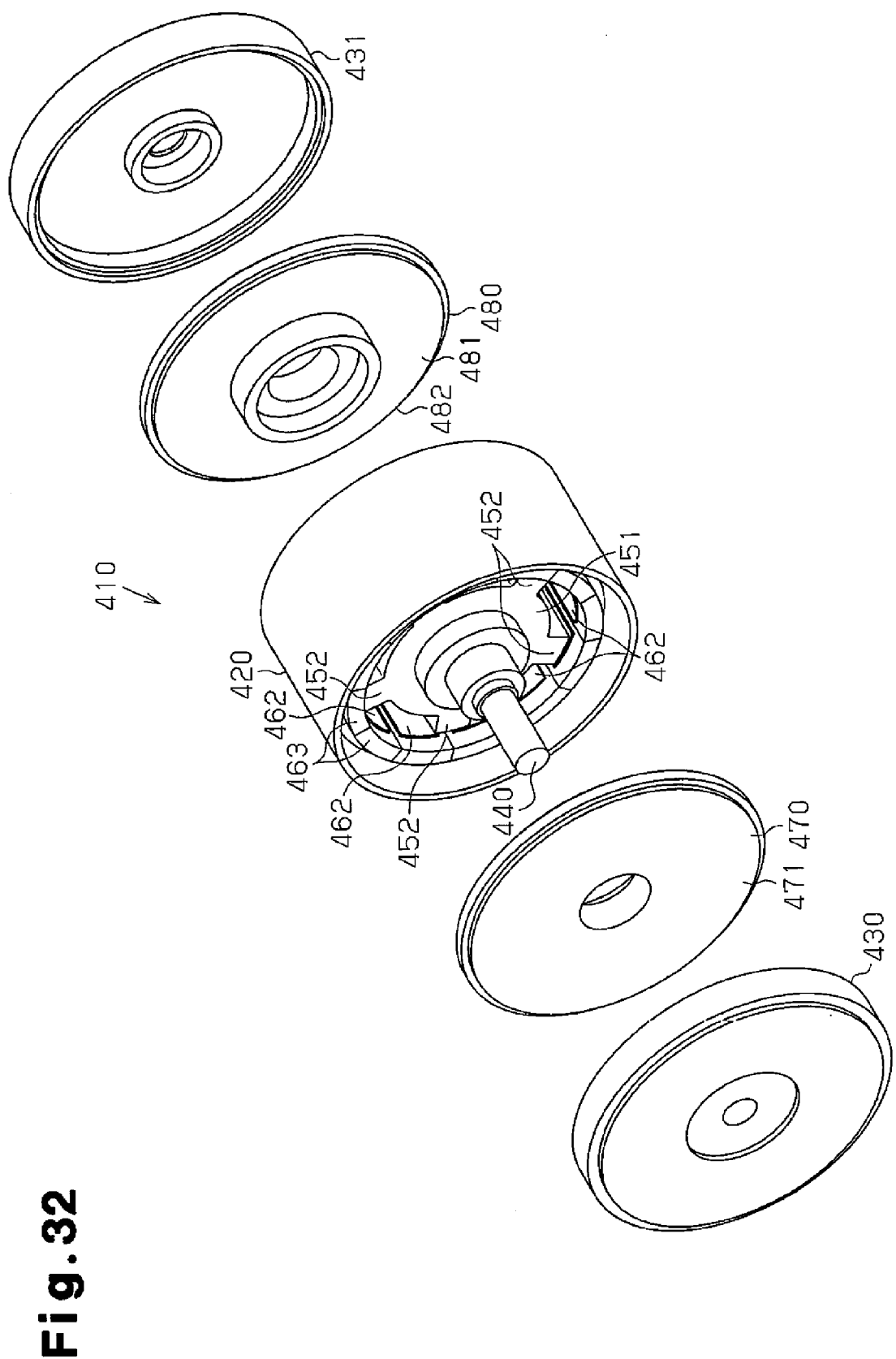
FIG. 32 is an exploded perspective view schematically showing a rotary electric motor according to an eighth embodiment of the present invention.
Figure 33:
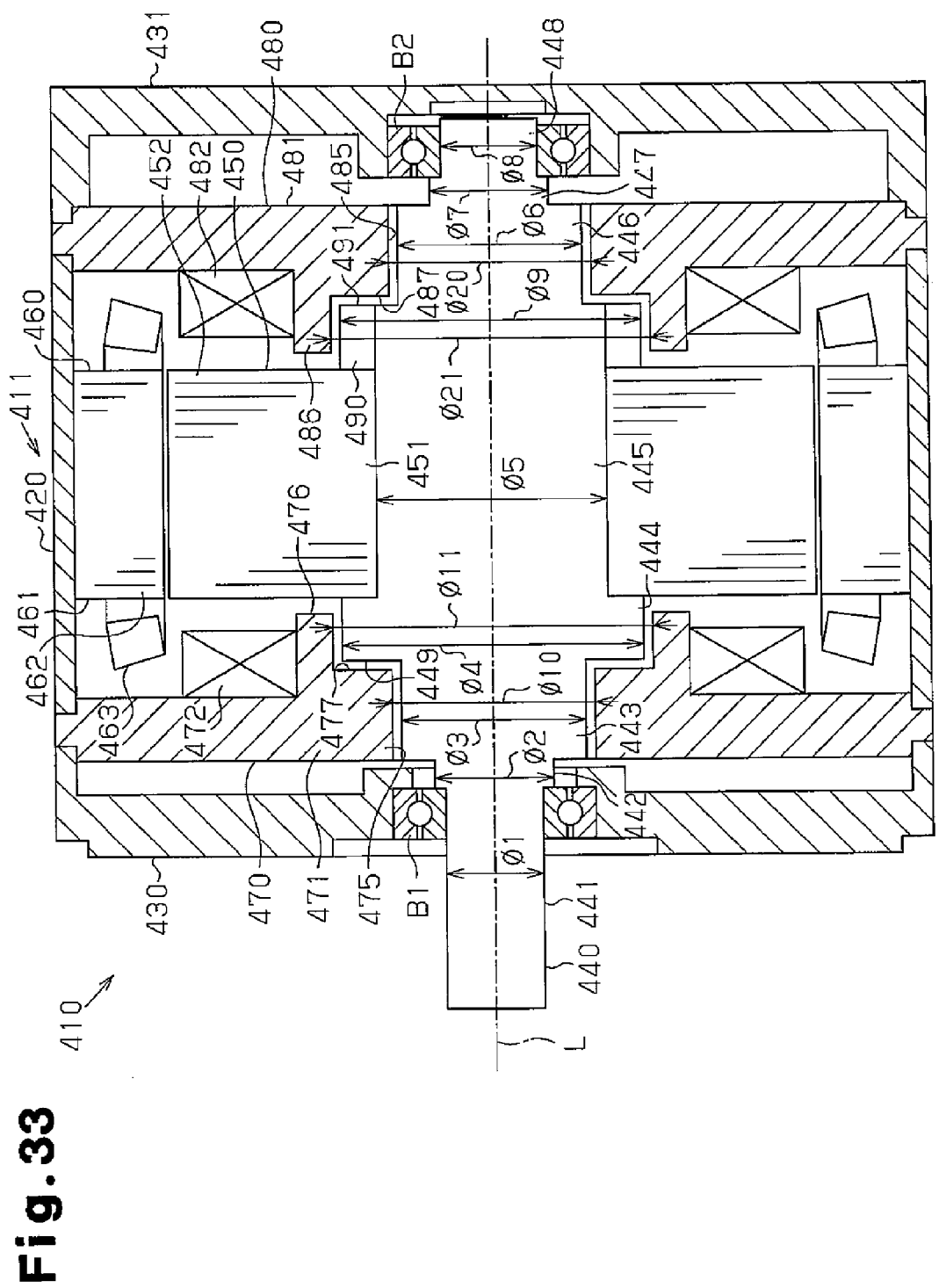
FIG. 33 is a longitudinal cross-sectional view of the rotary electric motor shown in FIG. 32.

As shown in FIGS. 32 and 33, a motor 410 serving as a rotary electric machine is a wound-field synchronous motor that does not use a permanent magnet. The motor 410 that is a rotary electric motor includes a cylindrical bypass core (core back, field pole yoke) 420, a left bracket 430 and a right bracket 431 arranged at opening portions at both ends of the bypass core 420, a shaft (rotary shaft) 440 which has a rod shape and which extends in a horizontal direction, a rotatably supported rotor (rotating part) 450, a stator (stationary part) 460, and field poles 470 and 480.

The shaft 440 is coupled to the left bracket 430 by a shaft bearing (bearing) B1 and is coupled to the right bracket 431 by a shaft bearing (bearing) B2. In addition, the shaft 440 is rotatably supported by the left bracket 430 and the right bracket 431. One end of the shaft 440 on a side of the left bracket 430 extends through the left bracket 430. The shaft 440 is formed by a magnetic body.

The shaft 440 includes, in a left-to-right order on FIG. 33, a first part 441 with a diameter of $\phi1$, a second part 442 with a diameter of $\phi2$, a third part 443 with a diameter of $\phi3$, a fourth part 444 with a diameter of $\phi4$, a fifth part 445 with a diameter of $\phi5$, a sixth part 446 with a diameter of $\phi6$, a seventh part 447 with a diameter of $\phi7$, and an eighth part 448 with a diameter of $\phi8$.

In the eighth embodiment, the diameter $\phi1$ of the first part 441 and the diameter $\phi8$ of the eighth part 448 are equal to each other ($\phi1=\phi8$). In addition, the diameter $\phi2$ of the second part 442 and the diameter $\phi7$ of the seventh part 447 are equal to each other ($\phi2=\phi7$) and are respectively larger than the diameter $\phi1$ of the first part 441 and the diameter $\phi8$ of the eighth part 448 ($\phi2>\phi1$ and $\phi7>\phi8$). The diameter $\phi3$ of the third part 443 and the diameter $\phi6$ of the sixth part 446 are equal to each other ($\phi3=\phi6$) and are respectively larger than the diameter $\phi2$ of the second part 442 and the diameter $\phi7$ of the seventh part 447 ($\phi3>\phi2$ and $\phi6>\phi7$). The diameter $\phi4$ of the fourth part 444 is larger than the diameter $\phi4$ of the third part 443 ($\phi4>\phi3$). The diameter $\phi5$ of the fifth part 445 is larger than the diameter $\phi6$ of the sixth part 446 ($\phi5>\phi6$), and smaller than the diameter $\phi4$ of the fourth part 444 ($\phi5<\phi4$).

A vertical side wall 449 is formed between the third part 443 and the fourth part 444 of the shaft 440. In other words, the side wall 449 is vertical with respect to an axis L that extends in a horizontal direction.

Further, the shaft 440 is rotatably supported by the shaft bearing (bearing) B1 at the first part 441 of the shaft 440. In addition, the shaft 440 is rotatably supported by the shaft bearing (bearing) B2 at the eighth part 448 of the shaft 440.

An annular rotor core-fixing magnetic ring 490 is fitted into the fifth part 445 from a right side of the shaft 440. The iron rotor core-fixing magnetic ring 490 has a diameter of $\phi9$ that is equal to the diameter $\phi4$ of the fourth part 444 of the shaft 440 ($\phi9=\phi4$). An outer circumferential surface of the fifth part 445 of the shaft 440 and an inner circumferential surface of the rotor core-fixing magnetic ring 490 are in close contact with each other and are magnetically coupled to each other.

A right side surface of the rotor core-fixing magnetic ring 490 forms a vertical side wall 491. In other words, the side wall 491 is formed vertical with respect to the axis L that extends in the horizontal direction.

The rotor core 451 is fixed to the fifth part 445 of the shaft 440 inside the bypass core 420. The rotor core 451 is configured so as to be integrally rotatable with the shaft 440 around the axis L of the shaft 440. In addition, an outer circumferential surface of the shaft 440 and an inner circumferential surface of the rotor core 451 are in close contact with each other. Thus, the shaft 440 and the rotor core 451 are magnetically coupled to each other. The rotor core 451 is formed by laminating a plurality of steel sheets in a direction along the axis L. Specifically, the rotor core 451 is formed by laminating a plurality of steel sheets, and the rotor core 451 is inserted into the shaft 440 from a right hand-side in FIG. 33 at the fifth part 445 of the shaft 440 and abutted against the fourth part 444 of the shaft 440. Subsequently, the annular rotor core-fixing magnetic ring 490 formed by a magnetic body is press-fitted into the fifth part 445 of the shaft 440 to clamp and fix the rotor core 451.

Since the rotor core 451 is formed by laminating a plurality of steel sheets in a direction along the axis L, in the rotor core 451, a magnetic flux more readily flows in a radial direction and a circumferential direction of the rotor core 451 which are perpendicular to the axis L than in the direction along the axis L.

The rotor 450 (the rotor core 451) has rotor teeth 452 (refer to FIG. 32), which protrude outward in a radial direction. The rotor teeth 452 serving as magnetic salient poles are formed in plurality (in the eighth embodiment, five). The rotor teeth 452 are formed at regular intervals in a circumferential direction, and distal surfaces of the rotor teeth 452 are all positioned on the same circumferential plane.

The stator 460 (a stator core 461) is arranged inside the bypass core 420 on an outer side in a radial direction of the rotor teeth 452 of the rotor core 451, and the stator core 461 has an annular shape that encloses the rotor core 451. The stator core 461 is formed by laminating a plurality of steel sheets in a direction along the axis L. Thus, in the stator core 461, a magnetic flux more readily flows in a radial direction and the circumferential direction of the stator core 461 that are perpendicular to the axis L of the shaft 440 than in a direction along the axis L. In addition, a dimension of the stator core 461 along the axis L is the same as a dimension of the rotor core 451 along the axis L.

Furthermore, the stator 460 (the stator core 461) has stator teeth 462 (refer to FIG. 32) which protrude toward the shaft 440. The stator teeth 462 are formed in plurality (in the eighth embodiment, twelve) at regular intervals in the circumferential direction.

A slight clearance (for example, 0.5 mm) is formed between distal surfaces of the rotor teeth 452 (an outer circumferential surface of the rotor core 451) and an inner circumferential surface of the stator teeth 462 (the stator core 461).

A stator coil (stator winding) 463 is wound around each stator tooth 462. In other words, a conducting wire is wound around the stator teeth 462 to form the stator coils 463 as armature coils. Each stator coil 463 is any of a U-phase winding, a V-phase winding, and a W-phase winding, and a rotating magnetic field is generated by respectively supplying currents with varying phases to the windings.

In addition, since dimensions along the axis L of the stator 461 (the stator teeth 462) and the rotor core 451 are the same, both end portions (coil ends) of the stator coil 463 in the direction along the axis L protrude more outward among the directions along the axis L than both ends of the rotor core 451.

Further, the cylindrical bypass core 420 that extends in the axis L covers an entire circumference of an outer circumferential surface of the stator core 461. The bypass core 420 is formed of a magnetic body. In the present embodiment, the bypass core 420 is formed by soft magnetic composites (SMC). In addition, the outer circumferential surface of the stator core 461 and an inner circumferential surface of the bypass core 420 are in close contact with each other. Thus, the stator core 461 and the bypass core 420 are magnetically coupled to each other. The bypass core 420 forms an outer diameter-side field magnetic path.

In the eighth embodiment, the shaft 440, the rotor 450, and the stator 460 form a main electric motor portion 411.

A field pole 470 for generating a field magnetic flux is provided between the left bracket 430 and the rotor core 451 in the direction along the axis L. In addition, a field pole 480 for generating a field magnetic flux is provided between the right bracket 431 and the rotor core 451 in the direction along the axis L.

The field pole 470 includes an annular field core 471 and a field coil (field winding) 472. The field core 471 is formed from a magnetic material. The shaft 440 is inserted into the annular field core 471.

A field coil 472 is arranged in a motor inner surface portion of the field core 471 in the axial direction. The field coil 472 is formed by winding a bobbin (not shown) with a conducting wire around the shaft 440. A dimension from the axis L to an end portion of the field coil 472 positioned on an outer side in the direction perpendicular to the axis L is set smaller than a dimension from the axis L to an inner circumferential surface of the stator coil 463. In other words, the field coil 472 is arranged on an inner diameter side of the stator coil 463.

An outer circumferential portion of the field core 471 is fixed and fitted between a left end portion of the bypass core 420 and an outer circumferential portion of the left bracket 430. Accordingly, the field pole 470 is coupled to the main electric motor portion 411. When the field core 471 is coupled to the main electric motor portion 411, the field core 471 is in close contact with the bypass core 420. Thus, the field core 471 and the bypass core 420 are magnetically coupled to each other. In the eighth embodiment, the left bracket 430 is formed by a non-magnetic material and functions to reduce magnetic flux leakage of the field magnetic flux and prevent electric corrosion of the shaft bearing B1.

The field core 471 into which the shaft 440 is inserted has a first part 475 with an inner diameter of $\phi 10$ and a second part 476 with an inner diameter of $\phi 11$. The inner diameter $\phi 11$ of the second part 476 is larger than the inner diameter $\phi 10$ of the first part 475 ($\phi 111 > \phi 10$).

An inner circumferential surface of the first part 475 of the field core 471 and an outer circumferential surface of the third part 443 of the shaft 440 are arranged facing to and parallel to each other, and a slight clearance (for example, 0.5 mm) is formed between both circumferential surfaces. The first part 475 and the third part 443 are magnetically coupled to each other through the clearance (gap). This forms a first radial gap Gr1 (refer to FIG. 34) formed between members that face each other in a direction perpendicular to the axis (a radial direction).

An inner circumferential surface of the second part 476 of the field core 471 and an outer circumferential surface of the fourth part 444 of the shaft 440 are arranged facing to and parallel to each other, and a slight clearance (for example, 0.5 mm) is formed between both circumferential surfaces. The second part 476 and the fourth part 444 are magnetically coupled to each other via the clearance (gap). This forms a second radial gap Gr2 (refer to FIG. 34).

Figure 35:
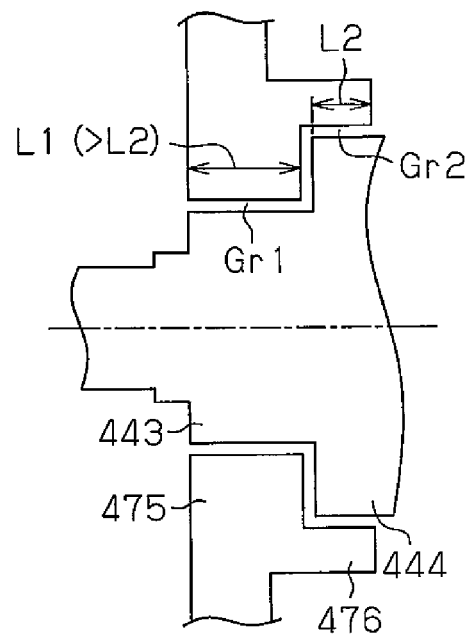
FIG. 35 is an enlarged view of a substantial part of the rotary electric motor shown in FIG. 32.

In this case, as shown in FIG. 35, a comparison between a length L1 of the first radial gap Gr1 in the axial direction and a length L2 of the second radial gap Gr2 in the axial direction reveals that the length L1 of the first radial gap Gr1 in the axial direction is longer than the length L2 of the second radial gap Gr2 in the axial direction (L1>L2).

Further, a vertical wall 477 is formed between the first part 475 and the second part 476 of the field core 471 shown in FIG. 33. In other words, the side wall 477 is formed vertically with respect to the axis L that extends in the horizontal direction. The side wall 477 of the field core 471 and the side wall 449 of the shaft 440 are arranged facing to and parallel to each other, and a slight clearance (for example, 0.5 mm) is formed between both surfaces. The side wall 477 and the side wall 449 are magnetically coupled to each other via the clearance (gap). This forms a first axial gap Ga1 (refer to FIG. 34) formed between members that face each other in an axial direction.

A right side surface (a vertical side wall) of the second part 476 of the field core 471 and a left side surface of the rotor core 451 are arranged facing to and parallel to each other, and a slight clearance (for example, 0.5 mm) is formed between both surfaces. The second part 476 and the rotor core 451 are magnetically coupled to each other via the clearance (gap). This forms a second axial gap Ga2 (refer to FIG. 34).

The first radial gap Gr1, the first axial gap Ga1, the second radial gap Gr2, and the second axial gap Ga2 all have stepped shapes.

In a similar manner, the field pole 480 includes an annular field core 481 and a field coil (field winding) 482. The field core 481 is formed from a magnetic material. The shaft 440 is inserted into the annular field core 481.

The field coil 482 is arranged in a motor inner surface portion of the field core 481 in the axial direction. The field coil 482 is formed by winding a bobbin (not shown) with a conducting wire around the shaft 440. A dimension from the axis L to an end portion of the field coil 482 positioned on an outer side in a direction perpendicular to the axis L is set smaller than a dimension from the axis L to an inner circumferential surface of the stator coil 463 (the field coil 482 is arranged on an inner diameter side of the stator coil 463).

An outer circumferential portion of the field core 481 is fixed and fitted between a right end portion of the bypass core 420 and an outer circumferential portion of the right bracket 431. Accordingly, the field pole 480 is coupled to the main electric motor portion 411. When the field core 481 is coupled to the main electric motor portion 411, the field core 481 is in close contact with the bypass core 420. Thus, the field core 481 and the bypass core 420 are magnetically coupled to each other. In the eighth embodiment, the right bracket 431 is formed by a non-magnetic material and functions to reduce magnetic flux leakage of the field magnetic flux and prevent electric corrosion of the shaft bearing B2.

In addition, the field core 481 into which the shaft 440 is inserted has a first part 485 with an inner diameter of φ20 and a second part 486 with an inner diameter of φ21. The inner diameter φ21 of the second part 486 is larger than the inner diameter φ20 of the first part 485 (φ21>φ20).

An inner circumferential surface of the first part 485 of the field core 481 and an outer circumferential surface of the sixth part 446 of the shaft 440 are arranged facing to and parallel to each other, and a slight clearance (for example, 0.5 mm) is formed between both circumferential surfaces. The first part 485 and the sixth part 446 are magnetically coupled to each other via the clearance (gap). This forms a third radial gap Gr3 (refer to FIG. 34).

An inner circumferential surface of the second part 486 of the field core 481 and an outer circumferential surface of the rotor core-fixing magnetic ring 490 are arranged facing to and parallel to each other, and a slight clearance (for example, 0.5 mm) is formed between both circumferential surfaces. The second part 486 and the rotor core-fixing magnetic ring 490 are magnetically coupled to each other through the clearance (gap). This forms a fourth radial gap Gr4 (refer to FIG. 34). Even in this case, as described earlier with reference to FIG. 35, a length of the third radial gap Gr3 in the axial direction is longer than a length of the fourth radial gap Gr4 in the axial direction in the same manner as the relationship between the first radial gap Gr1 and the second radial gap Gr2.

Further, a vertical wall 487 is formed between the first part 485 and the second part 486 of the field core 481 shown in FIG. 33. In other words, the side wall 487 is formed vertically with respect to the axis L that extends in the horizontal direction. The side wall 487 of the field core 471 and a side wall (right side surface) 491 of the rotor core-fixing magnetic ring 490 are arranged facing to and parallel to each other, and a slight clearance (for example, 0.5 mm) is formed between both surfaces. The side wall 487 and the side wall 491 are magnetically coupled to each other through the clearance (gap). This forms a third axial gap Ga3 (refer to FIG. 34).

A left side surface (a vertical side wall) of the second part 486 of the field core 481 and a right side surface of the rotor core 451 are arranged facing to and parallel to each other, and a slight clearance (for example, 0.5 mm) is formed between both surfaces. The second part 486 and the rotor core 451 are magnetically coupled to each other through the clearance (gap). This forms a fourth axial gap Ga4 (refer to FIG. 34).

The third radial gap Gr3, the third axial gap Ga3, the fourth radial gap Gr4, and the fourth axial gap Ga4 all have stepped shapes.

In this manner, in the eighth embodiment, a void between the field cores 471 and 481 of the field poles and field magnetic path forming portions that faces the field cores 471 and 481 is formed by the axial gaps Ga1, Ga2, Ga3, and Ga4 and the radial gaps Gr1, Gr2, Gr3, and Gr4.

Next, the operation of the motor 410 will be described focusing on a magnetic path (a flow of field magnetic flux) formed when the field coils 472 and 482 are energized.

Figure 34:
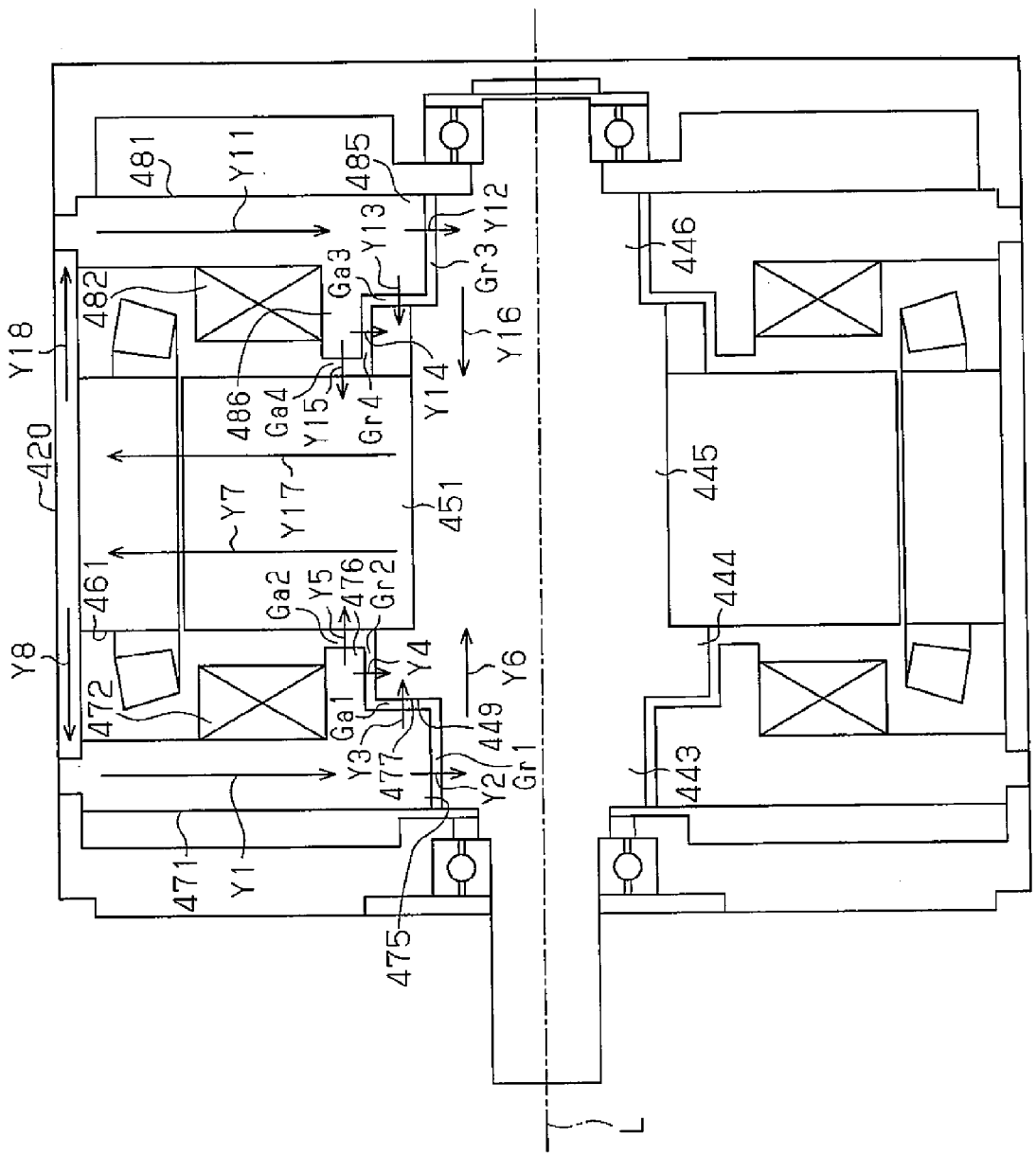
FIG. 34 is a longitudinal cross-sectional view showing a flow of field magnetic flux in the rotary electric motor shown in FIG. 32.

As shown in FIG. 34, a field magnetic flux generated on the field core 471 when a current is supplied to the field coil 472 in the motor 410 of the eighth embodiment flows toward the shaft 440 as indicated by an arrow Y1. Then, as indicated by arrows Y2, Y3, and Y4, the field magnetic flux flows through the first radial gap Gr1, the second radial gap Gr2, the first axial gap Ga1, and reaches the shaft 440. Further, as indicated by an arrow Y5, the field magnetic flux flows through the second axial gap Ga2 and reaches the rotor core 451. In this manner, a magnetic flux traverses the axial gaps Ga1 and Ga2 in a direction parallel to the axis L, and traverses the radial gaps Gr1 and Gr2 in a direction perpendicular to the axis L (a radial direction).

Subsequently, as indicated by an arrow Y6, the field magnetic flux flows inside the shaft 440 in the axial direction, and as indicated by an arrow Y7, flows in a direction perpendicular to the axis L of the shaft 440, flows through the rotor core 451 (the rotor teeth 452) toward an outer diameter side, and passes through the stator core 461 (the stator teeth 462). Further, as indicated by an arrow Y8, the field magnetic flux is guided through the bypass core 420 toward the field core 471.

In this manner, a field magnetic path formed by the field core 471, the shaft 440, the rotor 450, the stator 460, and the bypass core 420, and a field magnetic path formed by the field core 471, the rotor 450, the stator 460, and the bypass core 420 are formed.

In a similar manner, a field magnetic flux generated on the field core 481 when a current is supplied to the field coil 482 flows toward the shaft 440 as indicated by an arrow Y11. Then, as indicated by arrows Y12, Y13, and Y14, the field magnetic flux flows through the third radial gap Gr3, the fourth radial gap Gr4, the third axial gap Ga3, and reaches the shaft 440. Further, as indicated by an arrow Y15, the field magnetic flux flows through the fourth axial gap Ga4 and reaches the rotor core 451.

Subsequently, as indicated by an arrow Y16, the field magnetic flux flows inside the shaft 440 in the axial direction, and as indicated by an arrow Y17, flows in a direction perpendicular to the axis L of the shaft 440, flows through the rotor core 451 (the rotor teeth 452) toward an outer diameter side, and passes through the stator core 461 (the stator teeth 462). Further, as indicated by an arrow Y18, the field magnetic flux is guided through the bypass core 420 toward the field core 481.

In this manner, a field magnetic path formed by the field core 481, the shaft 440, the rotor 450, the stator 460, and the bypass core 420, and a field magnetic path formed by the field core 481, the rotor 450, the stator 460, and the bypass core 420 are formed.

In this manner, with the motor 410 of the eighth embodiment, an annular (loop-shaped) magnetic path (a flow of field magnetic flux) is formed, the rotor teeth 452 of the rotor 450 attain a polarity of an N-pole due to the field magnetic flux, and the rotor teeth 452 (the field magnetic flux) attain the same function as a permanent magnet arranged on a rotor in a permanent magnet synchronous motor.

In addition, with the motor 410 of the eighth embodiment, by increasing an amount of current supplied to the field coils 472 and 482, the field magnetic flux can be increased and a greater torque can be produced. Further, with the motor 410 of the eighth embodiment, by reducing an amount of current supplied to the field coils 472 and 482 during high-speed rotation, the field magnetic flux can be reduced and a maximum rotation speed can be increased. In other words, with the motor 410 of the eighth embodiment, a maximum torque and a maximum rotation speed can be increased by field strengthening control alone. Thus, with the motor 410 of the eighth embodiment, field weakening control that is required when a permanent magnet is arranged on the rotor 450 becomes unnecessary and a structure of the motor 410 can be simplified.

Furthermore, as shown in FIGS. 32 and 33, a magnet-less wound-field motor is achieved and, as shown in FIG. 34, a magnetic path (a magnetic path of a field pole) is formed in which a magnetic flux flows from the field poles 470 and 480. In this case, the magnetic path is configured so as to use both the axial gaps (Ga1, Ga2, Ga3, and Ga4) and the radial gaps (Gr1, Gr2, Gr3, and Gr4). By using both the axial gaps (Ga1, Ga2, Ga3, and Ga4) and the radial gaps (Gr1, Gr2, Gr3, and Gr4), void areas can be expanded compared to when only the axial gaps or only the radial gaps are used, and an increase in torque (a reduction in size) can be achieved. In addition, an axial load to the shaft bearings can be reduced compared to when only the axial gaps are used.

As described above, the eighth embodiment has the advantages described below.

(34) Voids between the field cores 471 and 481 of the field poles and field magnetic path forming portions that face the field cores 471 and 481 are formed by axial gaps (Ga1, Ga2, Ga3, and Ga4) and radial gaps (Gr1, Gr2, Gr3, and Gr4). Accordingly, by using a combination of axial gaps and radial gaps, a gap area (void area) between the field cores 471 and 481 and field magnetic path forming portions that face the field cores 471 and 481 can be secured in an efficient manner.

This will be described in detail.

A wound-field synchronous motor that does not use a permanent magnet (a magnet-less wound-field synchronous motor) is a structure that uses a field magnetic path to cause a magnetic flux to flow three-dimensionally, and includes a gap (void) between a field core and a member that faces the field core in addition to a void between a rotor and a stator. Thus, a void area for the additional void must also be secured.

Specifically, measures for securing a void area using radial gaps alone include increasing lengths of the radial gaps in an axial direction and increasing diameters of the radial gaps. In the former case, an increase in a length of a motor shaft causes an increase in motor size and degrades mountability of the motor to a vehicle. In the latter case, an increase in a size of the shaft results in an increase in the rotor's inertial mass. As a result, drivability of the vehicle mounted with the electric motor is adversely affected. Furthermore, in both cases, an increase in the size of the shaft may lead to a decline in efficiency due to an increase in a mass of the electric motor and to an increase in cost. On the other hand, securing the void area using axial gaps alone causes an increase in a thrust force between a rotor and a field pole and a large thrust load acts on the shaft bearing. In addition, when the void area is formed by axial gaps alone, a torque fluctuation due to a tolerance variation in a laminated thickness of the rotor fabricated by laminating thin plates (thin plate lamination) increases. To avoid this, assembling must be performed while selecting a shim (a thickness/dimension adjustment plate) or the like to adjust an axial void. As a result, the number of processes and cost may increase.

In contrast, in the eighth embodiment, by combining axial gaps instead of using radial gaps alone, a gap area can be enlarged and an increase in torque or a reduction in size can be achieved. In addition, by combining radial gaps instead of using axial gaps alone, advantages similar to those described above may be gained and, at the same time, an axial load applied to the shaft bearings can be reduced. As a result, durability of the shaft bearings increases. Further, since a ratio of the axial gaps to the radial gaps can be freely adjusted during designing, the torque fluctuation caused by a variation in axial voids attributable to a tolerance variation in a laminated thickness of the rotor core fabricated by laminating steel sheets (steel sheet lamination) can be more easily absorbed.

In this manner, with the eighth embodiment, a reduction in mass or size of a wound-field motor can be achieved and, at the same time, a thrust force applied to shaft bearings can be adjusted to an appropriate range in order to increase endurance reliability of the motor.

(35) Since the field magnetic path forming portions facing the field cores 471 and 481 include the fourth part 444 and the rotor core-fixing magnetic ring 490 as positioning members of the rotor core 451 of the rotor, a gap can be formed using positioning members of the rotor core 451 of the rotor. Since the positioning members have a cylindrical circumferential surface that is adjacent to the rotor core 451 and a wall surface that is perpendicular to the axis L, the positioning members are preferred for forming an axial gap and a radial gap.

(36) The axial gaps and the radial gaps are respectively formed in a plurality of steps. Thus, by respectively forming the axial gaps and the radial gaps in a plurality of steps, the greater the number of steps, the smoother stress and magnetic flux flow can be distributed to improve motor performance.

(37) Since the field magnetic path forming portions facing the field cores 471 and 481 include the shaft 440 fixed to the rotor 450, a field magnetic path can be formed through the shaft 440.

The eighth embodiment is not limited in the manner described above and may be modified as described below.

Figure 36:
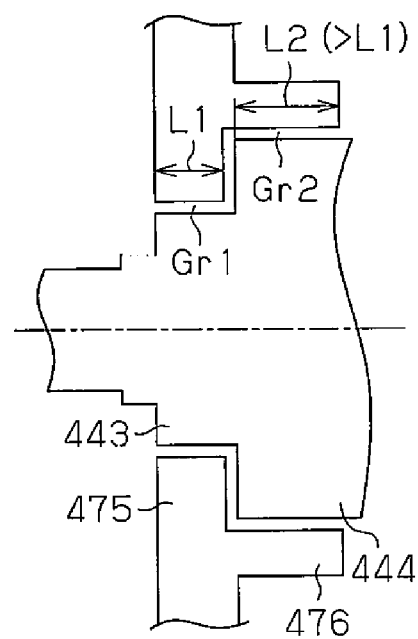
FIG. 36 is an enlarged view of a substantial part of a rotary electric motor according to another example of the eighth embodiment.

In the eighth embodiment, the length L1 of the first radial gap Gr1 in the axial direction is longer than the length L2 of the second radial gap Gr2 in the axial direction as shown in FIG. 35. Alternatively, as shown in FIG. 36, the length L2 of the second radial gap Gr2 in the axial direction may be longer than the length L1 of the first radial gap Gr1 in the axial direction (L2>L1). Accordingly, a facing area of the gap can be increased more efficiently.

The axial gaps and the radial gaps need not have two steps as shown in FIG. 34, and may instead have one step or three or more steps. As described earlier, the greater the number of steps, the smoother stress and magnetic flux flow can be distributed.

In the eighth embodiment, while shaft bearings B1 and B2 are arranged at the left and right brackets 30 and 31, a structure for preventing electric corrosion of the shaft bearings may be adopted in which bearing are arranged at field core end portions.

In the eighth embodiment, while a structure is adopted in which the diameter φ1 of the first part 441 and the diameter φ8 of the eighth part 448 are equal to each other and the diameter φ2 of the second part 442 and the diameter φ7 of the seventh part 447 are equal to each other, the eighth embodiment is not limited to this structure. Modifications may be made as long as there are no inconveniences during assembling.

Figure 37:
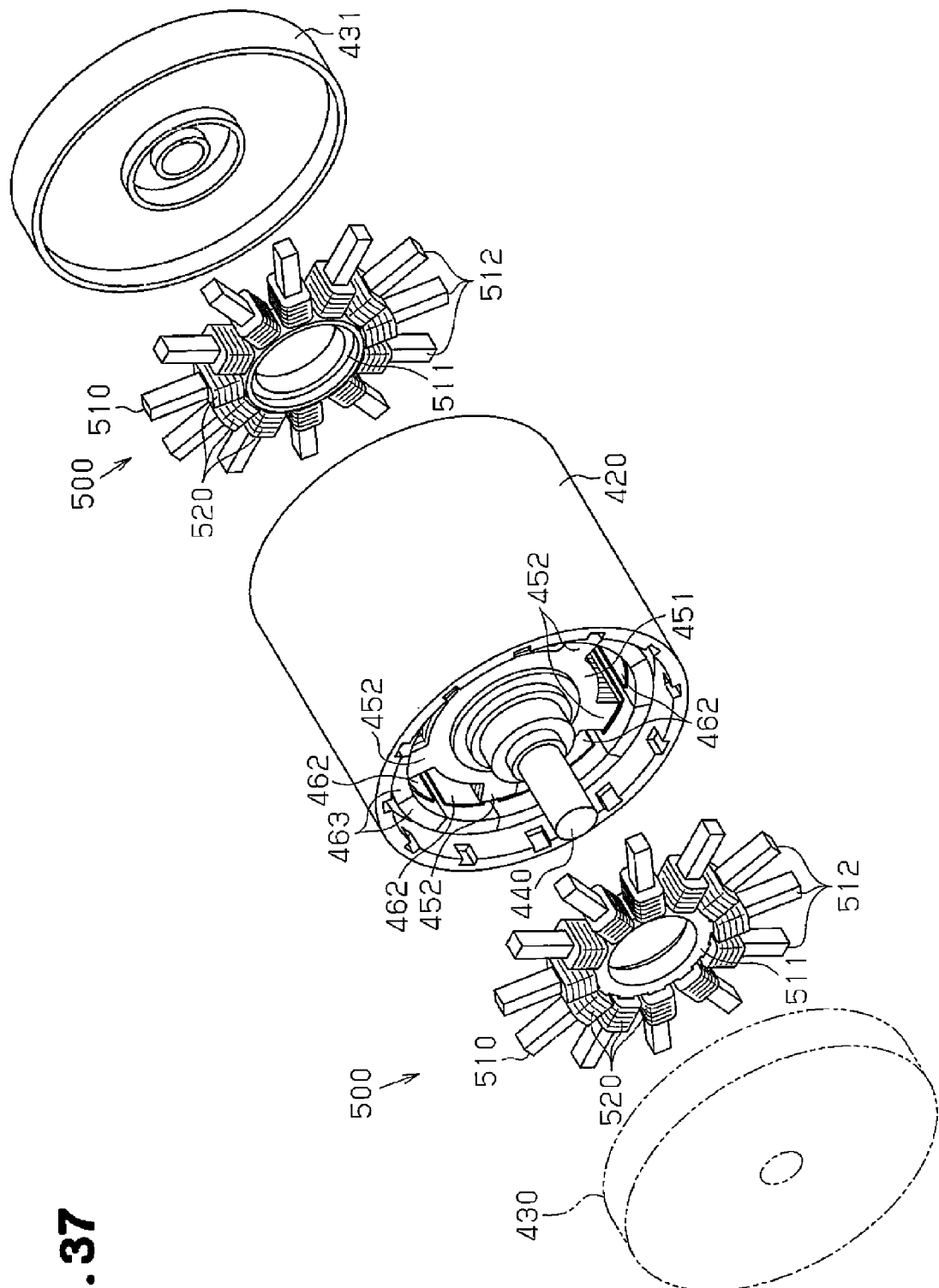
FIG. 37 is an exploded perspective view schematically showing a rotary electric motor according to another example of the eighth embodiment.
Figure 38:
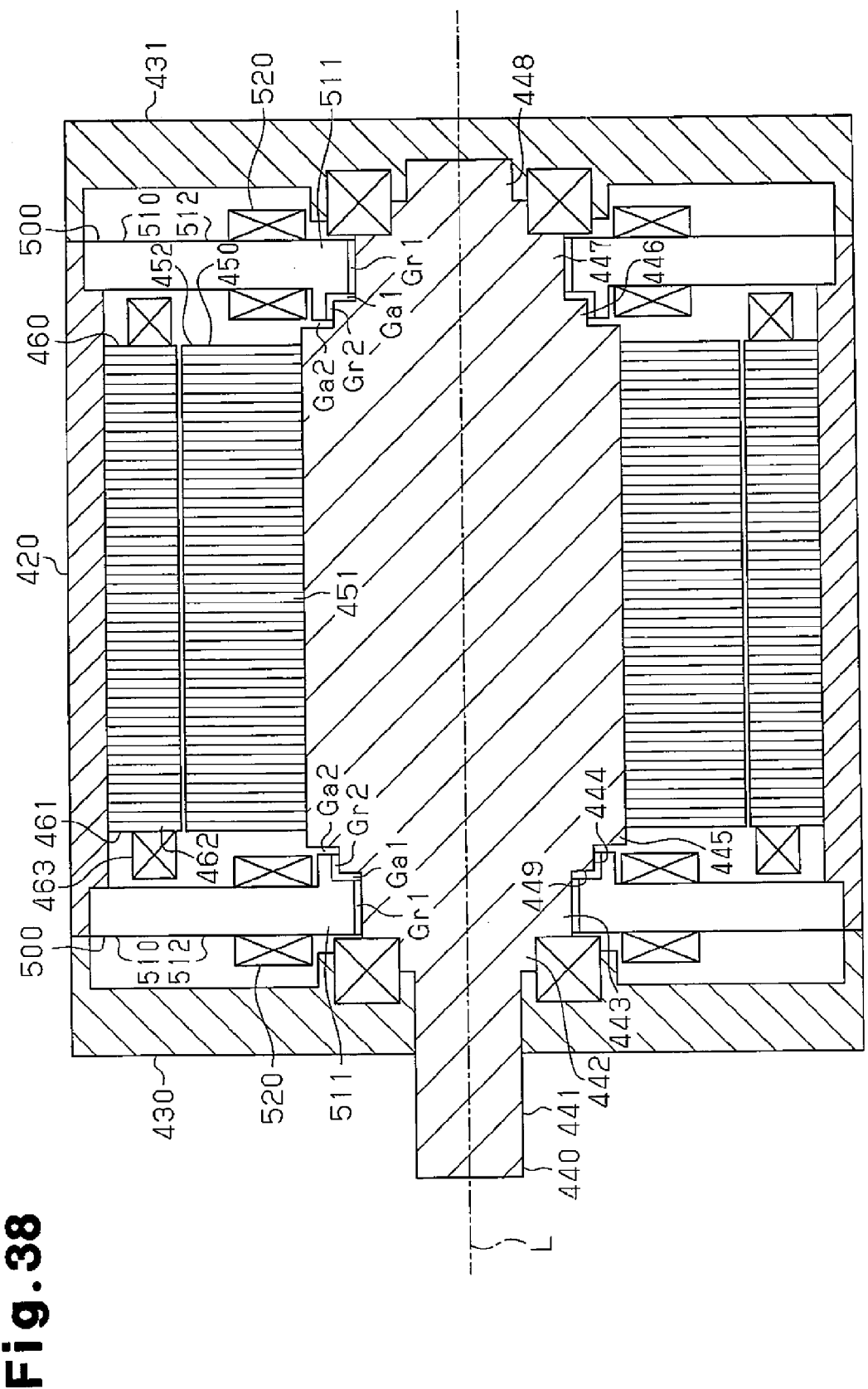
FIG. 38 is a longitudinal cross-sectional view of the rotary electric motor shown in FIG. 37.

The eighth embodiment is not limited to the field pole structures shown in FIGS. 32 and 33, and the field pole structures shown in FIGS. 37 and 38 may be adopted instead.

In FIGS. 37 and 38, a field pole 500 is arranged at both end portions of a bypass core 420. The field pole 500 includes a field core 510 and a field coil (field winding) 520. The field core 510 is formed from a magnetic material. The field core 510 includes a fixed portion 511 which is formed in an annular shape and into which the shaft 440 is to be inserted, and a plurality of arm portions 512 which extend from the fixed portion 511 so as to orthogonally intersect the axis L and which extend radially outward from the axis L. The arm portions 512 are formed at regular intervals. A side of the shaft 440 (the fixed portion 511) of each arm portion 512 is wound by a conducting wire to form a field coil 520. A distal part of each arm portion 512 of the field core 510 is fixed to the bypass core 420, and a distal surface of each arm portion 512 is in close contact with and magnetically coupled to the bypass core 420. In addition, the shaft 440 is inserted into the fixed portion 511 of the field core 510, an inner circumferential surface of the fixed portion 511 and an outer circumferential surface of the shaft 440 are arranged facing to and parallel to each other, and a slight clearance (for example, 0.5 mm) is formed between both circumferential surfaces.

In this case, steps are formed so as to have different diameters on an inner surface of the fixed portion 511 of the field core 510 into which the shaft 440 is to be inserted. In addition, the inner circumferential surface of the fixed portion 511 of the field core 510 and the outer circumferential surface of the third part 443 of the shaft 440 are arranged facing to and parallel to each other, and a first radial gap Gr1 is formed. Further, the inner circumferential surface of the fixed portion 511 of the field core 510 and the outer circumferential surface of the fourth part 444 of the shaft 440 are arranged facing to and parallel to each other, and a second radial gap Gr2 is formed. In addition, a vertical side wall of the fixed portion 511 of the field core 510 and a side wall 449 of the shaft 440 are arranged facing to and parallel to each other, and a first axial gap Ga1 is formed. A side surface (vertical side wall) of the fixed portion 511 of the field core 510 and a side surface of the rotor core 451 are arranged facing to and parallel to each other, and a second axial gap Ga2 is formed.

The other field pole 500 of the bypass core 420 has a similar structure.

In FIGS. 32 and 33, only the field pole 470 or only the field pole 480 may be provided. In addition, in FIGS. 37 and 38, the field pole 500 may be provided on only one side of the main electric motor portion 411 (the shaft 440).

In the eighth embodiment, the number of the rotor teeth 452 of the rotor may be changed as required. In addition, the number of the stator teeth 462 of the stator may be changed as required.

While a field magnetic path is formed through the shaft 440, alternatively, a field magnetic path may be formed without the shaft 440. For example, an SMC member may be interposed between the shaft and the rotor core 451 and shaped so that an axial gap and a radial gap are formed with respect to the field core and that the SMC member forms a field magnetic path.

In the eighth embodiment, while the rotor teeth 452 as salient pole sections have convex shapes, the rotor teeth 452 are not limited to this structure. The rotor teeth need only have saliency. For example, the rotor may have an overall cylindrical shape by arranging only the distal ends of the rotor teeth to be coupled to adjacent rotor teeth or by filling the recesses between the rotor teeth with a non-magnetic body.

In the eighth embodiment, while the rotor core 451 is formed by laminating a plurality of steel sheets (magnetic steel sheets), the rotor core 451 is not limited in such a manner and may be formed by a magnetic body such as SMC or an iron mass.

In the eighth embodiment, the present invention is embodied in a motor serving as a rotary electric machine. However, the present invention is not limited in such a manner and may be used as a generator.

A ninth embodiment of a motor (rotary electric motor) serving as a rotary electric machine according to the present invention will now be described with reference to FIGS. 39 and 40.

Figure 39:
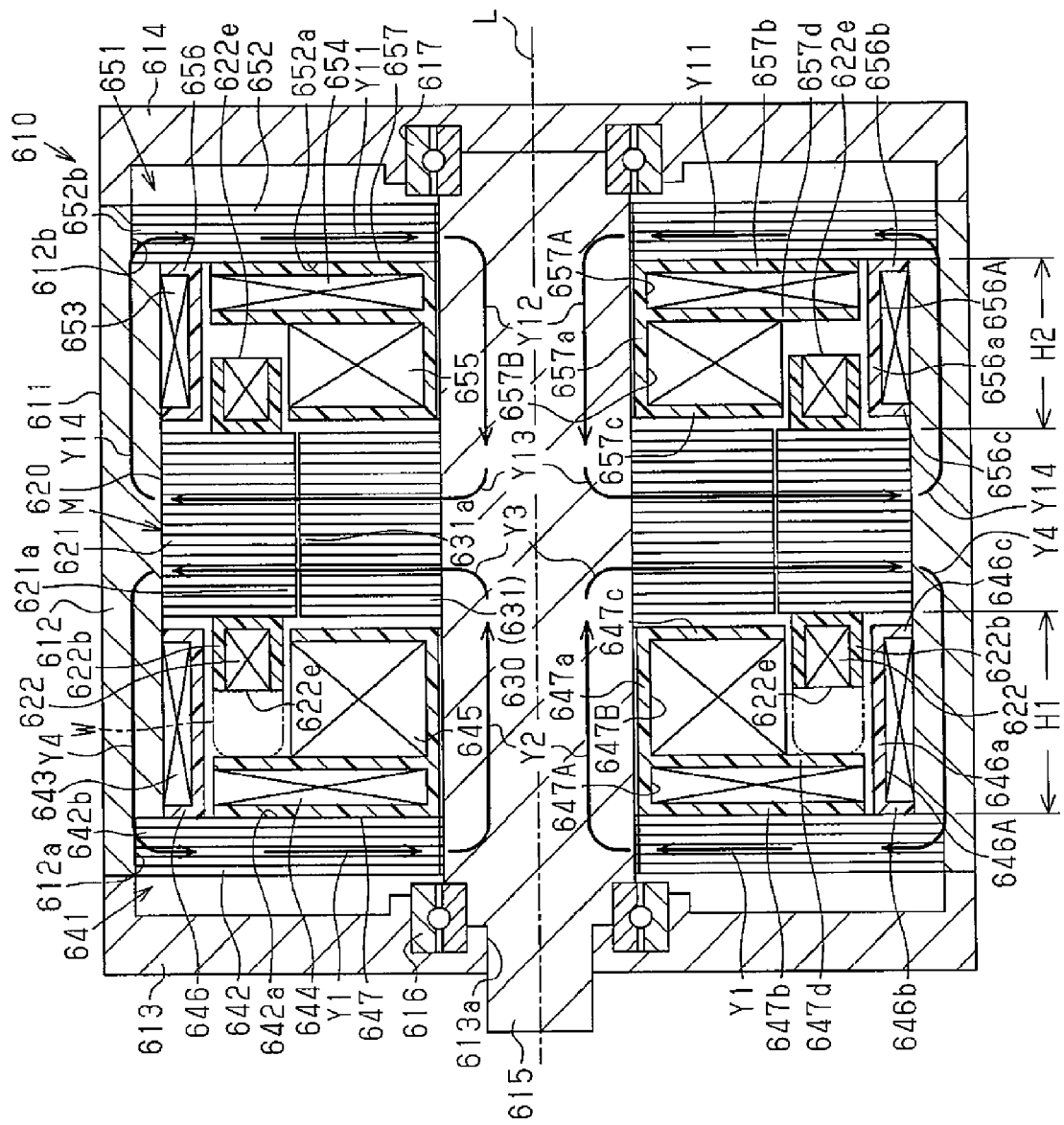
FIG. 39 is a side cross-sectional view of a rotary electric motor according to a ninth embodiment of the present invention.

As shown in FIG. 39, a housing 611 of a motor 610 includes a cylindrical core back (field yoke) 612, a first housing 613 with a bottomed cylindrical shape that is coupled to one end (a left end as shown in FIG. 39) of the core back 612, and a second housing 614, which is cylindrical, includes a closed bottom, and is coupled to another end (a right end as shown in FIG. 39) of the core back 612. The first housing 613 and the second housing 614 are formed from a non-magnetic material. The core back 612 is formed from a magnetic material, and in the ninth embodiment, is formed from soft magnetic composites (SMC). A through hole 613a is formed on a bottom wall of the first housing 613. A main electric motor portion M is housed in the housing 611.

A shaft (rotary shaft) 615 that forms part of the main electric motor portion M is housed in the core back 612. The shaft 615 is formed from a soft magnetic material (for example, iron or silicon steel) in a generally cylindrical shape. The shaft 615 is rotatably supported by the first housing 613 and the second housing 614 by bearings 616 and 617. One end (a left end as shown in FIG. 39) of the shaft 615 protrudes out of the housing 611 through the through hole 613a.

A stator 620 (stationary part) that forms part of the main electric motor portion M is fixed to an inner circumferential surface of the core back 612. The stator 620 includes an annular stator core 621 fixed to the inner circumferential surface of the core back 612 and a stator coil (stator winding) 622. The core back 612 covers an entire circumference of an outer circumferential surface of the stator core 621, and the outer circumferential surface of the stator core 621 and the inner circumferential surface of the core back 612 are in close contact with each other. Thus, the stator core 621 and the core back 612 are magnetically connected to each other. The stator core 621 is formed by laminating a plurality of steel sheets in a direction along an axis L of the shaft 615 (an axial direction of the shaft 615).

The stator core 621 includes a plurality of stator teeth 621a that protrude toward the shaft 615 at regular intervals in a circumferential direction of the stator core 621. Distal surfaces of the stator teeth 621a are all positioned on the same circumferential plane. A stator coil bobbin 622b made of an insulating resin material is mounted to each stator tooth 621a. In addition, the stator coil 622 is formed by winding a conducting wire made of a conductive metallic material (in the ninth embodiment, copper) around the stator coil bobbin 622b. Moreover, the stator coil 622 is configured so as to have any of a U phase, a V phase, and a W phase and to generate a rotating magnetic field when supplied with currents having phases that differ from each other.

A rotor 630 (rotating part) that forms a part of the main electric motor portion M is provided on an inner side of the stator 620. The rotor 630 has a rotor core 631 fixedly attached to the shaft 615. The rotor core 631 is configured so as to be integrally rotatable with the shaft 615 around the axis L of the shaft 615. An outer circumferential surface of the shaft 615 and an inner circumferential surface of the rotor core 631 are in close contact with each other. Thus, the shaft 615 and the rotor core 631 are magnetically connected to each other. The rotor core 631 is formed by laminating a plurality of steel sheets formed from a soft magnetic material in the axial direction of the shaft 615. Thus, in the rotor core 631, a magnetic flux more readily flows in a radial direction and a circumferential direction of the rotor core 631 that are perpendicular to the axis L than in the axial direction of the shaft 615.

In addition, the length of the rotor core 631 in the axial direction of the shaft 615 is set to be the same as a length of the stator core 621 in the axial direction of the shaft 615. A coil end 622e protrudes from an end surface of the stator teeth 621a in the axial direction of the shaft 615. Thus, both ends of the coil end 622e of the stator coil 622 in the axial direction of the shaft 615 protrude more outward than both ends of the rotor core 631. In addition, in the housing 611, a connecting wire area W (depicted by double-dashed lines in FIG. 39), through which a connecting wire (not shown) of the stator coil 622 of each phase passes, is provided closer to the first housing 613 than the coil end 622e of one end (the side of the first housing 613).

Figure 40:
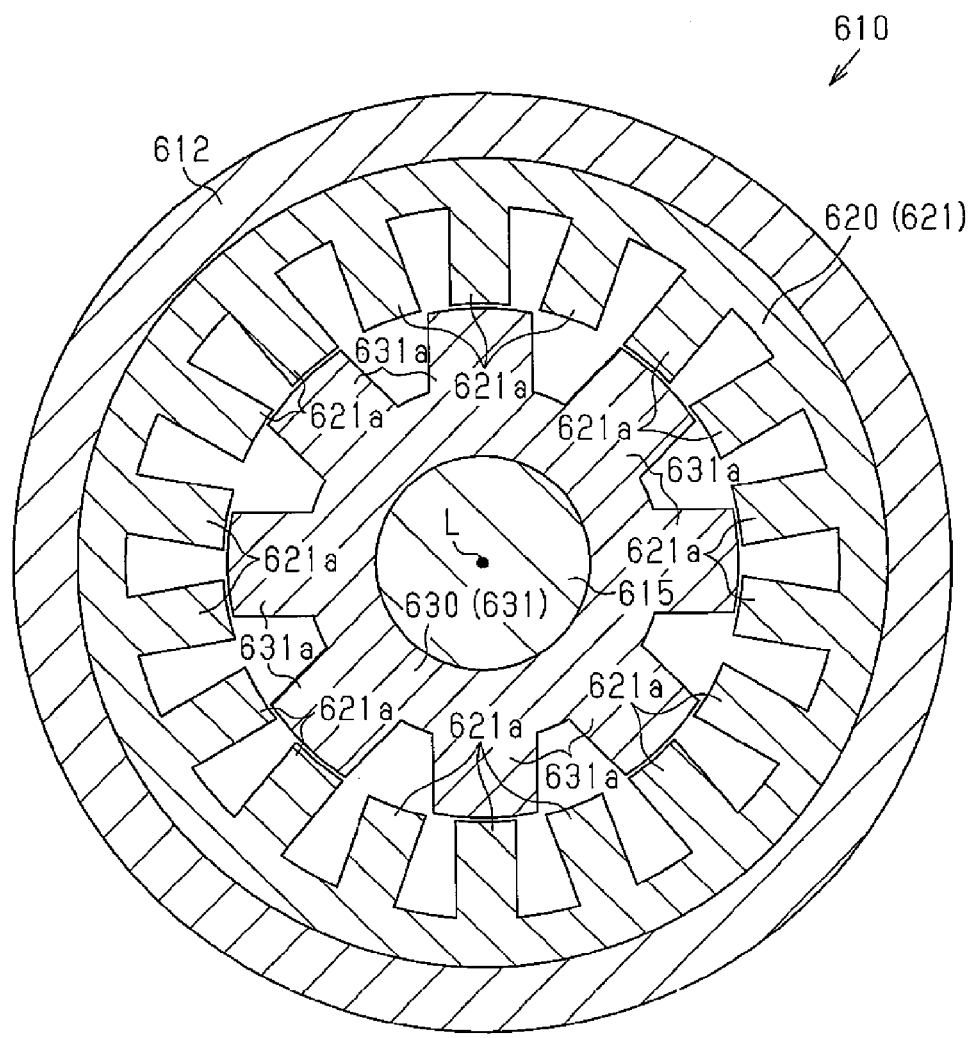
FIG. 40 is a longitudinal cross-sectional view of a core back, a stator, and a rotor shown in FIG. 39.

As shown in FIG. 40, the rotor core 631 includes a plurality of rotor teeth 631a as magnetic salient poles that protrude outward in the radial direction at regular intervals in a circumferential direction of the rotor core 631. Distal surfaces of the rotor teeth 631a are all positioned on the same circumferential plane. A slight clearance is formed between the distal surfaces of the rotor teeth 631a and the distal surfaces of the stator teeth 621a. In addition, the rotor teeth 631a and the stator teeth 621a are magnetically connected to each other through the clearance.

Accordingly, in the ninth embodiment, the main electric motor portion M is formed by the shaft 615, the stator 620, and the rotor 630.

As shown in FIG. 39, a first field pole 641 for generating a field magnetic flux is arranged closer to one end in the core back 612 than the stator 620 and the rotor 630. The first field pole 641 includes a first field core 642 serving as an annular field core, and a first field coil 643, a second field coil 644, and a third field coil 645 as field windings. The first field core 642 is formed by laminating a plurality of steel sheets formed from a magnetic material in an axial direction of the shaft 615.

The first field core 642 is fixed to the core back 612 by press-fitting an outer circumferential portion 642b of the first field core 642 into a press-fit recess 612a provided in a recessed manner at one end opening portion of the core back 612. In a state where the first field core 642 is fixed to the core back 612, the outer circumferential portion 642b of the first field core 642 is in close contact with the core back 612. Thus, the first field core 642 and the core back 612 are magnetically connected to each other. In addition, the shaft 615 is inserted into an inner side of the first field core 642, and a slight clearance is formed between an inner circumferential surface of the first field core 642 and the outer circumferential surface of the shaft 615. Furthermore, the first field core 642 and the shaft 615 are magnetically connected to each other through the clearance.

A second field pole 651 for generating a field magnetic flux is arranged closer to another end in the core back 612 than the stator 620 and the rotor 630. The second field pole 651 includes a second field core 652 serving as an annular field core. Further, the second field pole 651 includes a fourth field coil 653, a fifth field coil 654, and a sixth field coil 655 serving as field windings. The second field core 652 is formed by laminating a plurality of steel sheets formed from a magnetic material in a direction along the axis L.

The second field core 652 is fixed to the core back 612 by press-fitting an outer circumferential portion 652b of the second field core 652 into a press-fit recess 612b provided in a recessed manner at another end opening portion of the core back 612. In a state in which the second field core 652 is fixed to the core back 612, the outer circumferential portion 652b of the second field core 652 is in close contact with the core back 612. Thus, the second field core 652 and the core back 612 are magnetically connected to each other. In addition, the shaft 615 is inserted into an inner side of the second field core 652, and a slight clearance is formed between an inner circumferential surface of the second field core 652 and the outer circumferential surface of the shaft 615. Further, the second field core 652 and the shaft 615 are magnetically connected to each other via the clearance.

In the core back 612, the distance H1 from an end surface 642a of the first field core 642 on a side opposite to an end surface that faces the first housing 613 to the one end portion of the stator core 621 is longer than the distance H2 from an end surface 652a of the second field core 652 on a side opposite to an end surface that faces the second housing 614 to the other end portion of the stator core 621 by an amount corresponding to the length of the connecting wire area W.

A first field coil bobbin 646 serving as a field coil bobbin is fastened to the end surface 642a of the first field core 642. The first field coil bobbin 646 includes a cylindrical first barrel portion 646a, which extends in the axial direction of the shaft 615 from the end surface 642a of the first field core 642 to just before one end surface of the stator core 621, and a pair of annular flange portions 646b and 646c, which extend outward in a radial direction from both end opening portions of the first barrel portion 646a. In addition, the first barrel portion 646a and the pair of flange portions 646b and 646c form a radially outward wound portion 646A having a part positioned more outward in a radial direction than the coil end 622e of one end.

The first field coil 643 is formed by winding the radially outward wound portion 646A with a conducting wire made of a conductive metallic material (in the ninth embodiment, copper) into a plurality of windings around the axis L of the shaft 615. In a state in which the first field coil 643 is wound around the radially outward wound portion 646A, part of the first field coil 643 is arranged more outward in the radial direction than the coil end 622e of one end.

A second field coil bobbin 647 serving as a field coil bobbin is fastened to the end surface 642a of the first field core 642. The second field coil bobbin 647 has a cylindrical second barrel portion 647a, which extends in the axial direction of the shaft 615 from the end surface 642a of the first field core 642 to just before one end surface of the rotor core 631. In addition, the second field coil bobbin 647 includes one end with an annular flange portion 647b, which extends outward in the radial direction from one end opening portion of the second barrel portion 647a to just before an inner circumferential surface of the first barrel portion 646a, and another end with an annular flange portion 647c, which extends outward in the radial direction from another end opening portion of the second barrel portion 647a to just before a surface of the stator coil bobbin 622b on a side of the shaft 615. Further, the second field coil bobbin 647 has an annular partitioning flange portion 647d, which is positioned between the flange portion 647b and the flange portion 647c and which extends outward in the radial direction from an outer circumferential surface of the second barrel portion 647a to just before the inner circumferential surface of the first barrel portion 646a. The length of the flange portion 647b along the radial direction and length of the partitioning flange portion 647d along the radial direction are the same.

In addition, part of the second barrel portion 647a, the flange portion 647b, and the partitioning flange portion 647d form an axially outward wound portion 647A positioned more outward in an axial direction of the shaft 615 than the coil end 622e at one end. Further, part of the second barrel portion 647a, the flange portion 647c, and the partitioning flange portion 647d form a radially inward wound portion 647B having a part that is positioned more inward in the radial direction than one end of the coil end 622e. In other words, the second field coil bobbin 647 is configured so as to integrate the axially outward wound portion 647A and the radially inward wound portion 647B.

The second field coil 644 is formed by winding the axially outward wound portion 647A with a conducting wire made of a conductive metallic material (in the ninth embodiment, copper) into a plurality of windings around the axis L of the shaft 615. In a state in which the second field coil 644 is wound around the axially outward wound portion 647A, the second field coil 644 is arranged more outward in the axial direction of the shaft 615 than the coil end 622e of one end. The third field coil 645 is formed by winding the radially inward wound portion 647B with a conducting wire made of a conductive metallic material (in the ninth embodiment, copper) into a plurality of windings around the axis L of the shaft 615. In a state in which the third field coil 645 is wound around the radially inward wound portion 647B, part of the third field coil 645 is arranged more inward in the radial direction than the coil end 622e at one end.

A third field coil bobbin 656 serving as a field coil bobbin is fastened to an end surface 652a of the second field core 652. The third field coil bobbin 656 includes a cylindrical third barrel portion 656a, which extends in the axial direction of the shaft 615 from the end surface 652a of the second field core 652 to just before the other end surface of the stator core 621, and a pair of annular flange portions 656b and 656c, which extend outward in a radial direction from both end opening portions of the third barrel portion 656a. The length of the third barrel portion 656a along the axial direction of the shaft 615 is shorter than the length of the first barrel portion 646a along the axial direction of the shaft 615. In addition, the third barrel portion 656a and the pair of flange portions 656b and 656c form a radially outward wound portion 656A having a part positioned more outward in the radial direction than the coil end 622e at the other end.

The fourth field coil 653 is formed by winding the radially outward wound portion 656A with a conducting wire made of a conductive metallic material (in the ninth embodiment, copper) into a plurality of windings around the axis L of the shaft 615. In a state in which the fourth field coil 653 is wound around the radially outward wound portion 656A, part of the fourth field coil 653 is arranged more outward in the radial direction than the coil end 622e at the other end.

A fourth field coil bobbin 657 serving as a field coil bobbin is fastened to the end surface 652a of the second field core 652. The fourth field coil bobbin 657 has a cylindrical fourth barrel portion 657a, which extends in the axial direction of the shaft 615 from the end surface 652a of the second field core 652 to just before one end surface of the rotor core 631. The length of the fourth barrel portion 657a along the axial direction of the shaft 615 is shorter than the length of the second barrel portion 647a along the axial direction of the shaft 615.

Further, the fourth field coil bobbin 657 includes one end with an annular flange portion 657b, which extends outward in the radial direction from one end opening portion of the fourth barrel portion 657a to just before an inner circumferential surface of the third barrel portion 656a, and another end with a flange portion 657c, which extends outward in the radial direction from another end opening portion of the fourth barrel portion 657a to just before a surface of the stator coil bobbin 622b at the side of the shaft 615. Further, the fourth field coil bobbin 657 has an annular partitioning flange portion 657d, which is positioned between the flange portion 657b and the flange portion 657c and which extends outward in the radial direction from an outer circumferential surface of the fourth barrel portion 657a to just before the inner circumferential surface of the third barrel portion 656a. The length of the flange portion 657b along the radial direction and the length of the partitioning flange portion 657d along the radial direction are the same.

Part of the fourth barrel portion 657a, the flange portion 657b, and the partitioning flange portion 657d form an axially outward wound portion 657A positioned more outward in the axial direction of the shaft 615 than the coil end 622e of the other end side. Further, part of the fourth barrel portion 657a, the other flange portion 657c, and the partitioning flange portion 657d form a radially inward wound portion 657B having a part positioned more inward in the radial direction than the coil end 622e of the other end side. In other words, the fourth field coil bobbin 657 is configured so as to integrate the axially outward wound portion 657A and the radially inward wound portion 657B.

The fifth field coil 654 is formed by winding the axially outward wound portion 657A with a conducting wire made of a conductive metallic material (in the ninth embodiment, copper) into a plurality of windings around the axis L of the shaft 615. In a state in which the fifth field coil 654 is wound around the axially outward wound portion 657A, the fifth field coil 654 is arranged more outward in the axial direction of the shaft 615 than the coil end 622e at the other end. The sixth field coil 655 is formed by winding the radially inward wound portion 657B with a conducting wire made of a conductive metallic material (in the ninth embodiment, copper) into a plurality of windings around the axis L of the shaft 615. In a state in which the sixth field coil 655 is wound around the radially inward wound portion 657B, part of the sixth field coil 655 is arranged more inward in the radial direction than the coil end 622e of the other end side.

Next, then operation of the motor 610 of the ninth embodiment will be described focusing on a magnetic path (a flow of field magnetic flux) formed when a current is supplied to the field coils 643, 644, 645, 653, 654, and 655. A terminal block (not shown) for supplying a current to the field coils 643, 644, 645, 653, 654, and 655 is provided on the outer circumferential surface of the housing 611. Starting ends of the conducting wires of the field coils 643, 644, 645, 653, 654, and 655 are drawn out of the housing 611 and electrically connected to the terminal block.

A field magnetic flux generated on the first field core 642 when a current is supplied to the field coils 643, 644, and 645 flows toward the shaft 615 as indicated by an arrow Y1. The field magnetic flux then passes through a magnetic void (gap) and flows to the shaft 615. Subsequently, as indicated by an arrow Y2, the field magnetic flux flows inside the shaft 615 in the axial direction of the shaft 615, and as indicated by an arrow Y3, flows in a direction perpendicular to the axis L of the shaft 615, flows through the rotor core 631 (the rotor teeth 631*a*) toward an outer diameter side, and passes through the stator core 621 (the stator teeth 621*a*). Further, as indicated by an arrow Y4, the field magnetic flux is guided through the core back 612 toward the first field pole 641.

In this manner, a field magnetic path formed by the first field core 642, the shaft 615, the rotor 630, the stator 620, and the core back 612 is formed. Thus, in the ninth embodiment, the core back 612, the shaft 615, and the first field core 642 function as magnetic path forming members that form a field magnetic path together with the rotor 630 and the stator 620.

In the same manner, a field magnetic flux generated on the second field core 652 when a current is supplied to the field coils 653, 654, and 655 flows toward the shaft 615 as indicated by an arrow Y11. The field magnetic flux then passes through a magnetic void (gap) and flows to the shaft 615. Subsequently, as indicated by an arrow Y12, the field magnetic flux flows inside the shaft 615 in the axial direction of the shaft 615, and as indicated by an arrow Y13, flows in a direction perpendicular to the axis L of the shaft 615, flows through the rotor core 631 (the rotor teeth 631*a*) toward an outer diameter side, and passes through the stator core 621 (the stator teeth 621*a*). Further, as indicated by an arrow Y14, the field magnetic flux is guided through the core back 612 toward the second field pole 651.

In this manner, a field magnetic path formed by the second field core 652, the shaft 615, the rotor 630, the stator 620, and the core back 612 is formed. Thus, in the ninth embodiment, the core back 612, the shaft 615, and the second field core 652 function as magnetic path forming members that form a field magnetic path together with the rotor 630 and the stator 620.

In this manner, with the motor 610 of the ninth embodiment, an annular (loop-shaped) magnetic path (a flow of field magnetic flux) is formed, the rotor teeth 631*a* of the rotor 630 attain a polarity of an N-pole due to the field magnetic flux, and the rotor teeth 631*a* (the field magnetic flux) attain the same function as a permanent magnet arranged on a rotor in a permanent magnet synchronous motor.

In addition, with the motor 610 of the ninth embodiment, by increasing an amount of current supplied to the field coils 643, 644, 645, 653, 654, and 655, the field magnetic flux can be increased and a greater torque can be produced. On the other hand, with the motor 610 of the ninth embodiment, by reducing the amount of current supplied to the field coils 643, 644, 645, 653, 654, and 655 during high-speed rotation, the field magnetic flux can be reduced and a maximum rotation speed can be increased. In other words, with the motor 610 of the ninth embodiment, a maximum torque and a maximum rotation speed can be increased by field strengthening control alone. Thus, with the motor 610 of the ninth embodiment, field weakening control that is required when a permanent magnet is arranged on the rotor 630 becomes unnecessary and the structure of the motor 610 can be simplified.

Furthermore, the field coils 643, 644, 645, 653, 654, and 655 that are required to generate a field magnetic flux on the first field core 642 and the second field core 652 are arranged in the housing 611 using the inner side and outer side of the coil end 622*e* in the radial direction and the outer side of the coil end 622*e* in the axial direction of the shaft 615. In other words, since the field coils 643, 644, 645, 653, 654, and 655 are arranged by effectively using dead space that is created in the housing 611, an unnecessary increase in a size of the motor 610 in the axial direction of the shaft 615 can be avoided.

The ninth embodiment has the advantages described below.

(38) Part of the third field coil 645 is arranged more inward in the radial direction than the coil end 622*e* at one end side, and part of the sixth field coil 655 is arranged more inward in the radial direction than the coil end 622*e* at the other end. Thus, dead space that is created in the motor 610 more inward in the radial direction than the coil end 622*e* can be effectively utilized, and the size of the motor 610 in the axial direction of the shaft 615 does not increase even when arranging the field coils 645 and 655. In addition, the second field coil 644 is arranged more outward in the axial direction of the shaft 615 than the coil end 622*e* at one end, and the fifth field coil 654 is arranged more outward in the axial direction of the shaft 615 than the coil end 622*e* at the other end. Thus, dead space that is created in the motor 610 more outward in the axial direction of the shaft 615 than the coil end 622*e* can be effectively utilized, and an unnecessary increase in the size of the motor 610 in the axial direction of the shaft 615 can be avoided.

(39) Due to the field coils 645 and 655 being arranged more inward in the radial direction than the coil end 622*e*, the field coils 644 and 654 that are arranged more outward in the axial direction of the shaft 615 than the coil end 622*e* can be downsized in the axial direction of the shaft 615. Thus, the motor 610 as a whole in the axial direction of the shaft 615 can be downsized.

(40) A part of the first field coil 643 is arranged more outward in the radial direction than the coil end 622*e* at one end, and part of the fourth field coil 653 is arranged more outward in the radial direction than the coil end 622*e* at the other end. Thus, dead space that is created more outward in the radial direction than the coil end 622*e* can be effectively utilized and, at the same time, due to the field coils 643 and 653 being arranged more outward in the radial direction than the coil end 622*e*, the field coils 644 and 654 that are arranged more outward in the axial direction of the shaft 615 than the coil end 622*e* can be downsized in the axial direction of the shaft 615. As a result, the size of the motor 610 as a whole in the axial direction of the shaft 615 can be downsized.

(41) The second field coil bobbin 647 is configured so as to integrate the axially outward wound portion 647A and the radially inward wound portion 647B. Further, the fourth field coil bobbin 657 is configured so as to integrate the axially outward wound portion 657A and the radially inward wound portion 657B. Thus, for example, a field coil bobbin for winding a field coil arranged more inward in the radial direction than the coil end 622*e* and a field coil bobbin for winding a field coil arranged more outward in the axial direction of the shaft 615 than the coil end 622*e* need not be separately arranged. In other words, by arranging just the single field coil bobbins 647 and 657, the field coils 644, 645, 654, and 655 can be arranged more inward in the radial direction than the coil end 622*e* and more outward in the axial direction of the shaft 615 than the coil end 622*e*.

A tenth embodiment of a motor (rotary electric motor) serving as a rotary electric machine according to the present invention will now be described with reference to FIG. 41. In the tenth embodiment, the same components as the ninth embodiment will be denoted by the same reference characters and will not be described in detail.

Figure 41:
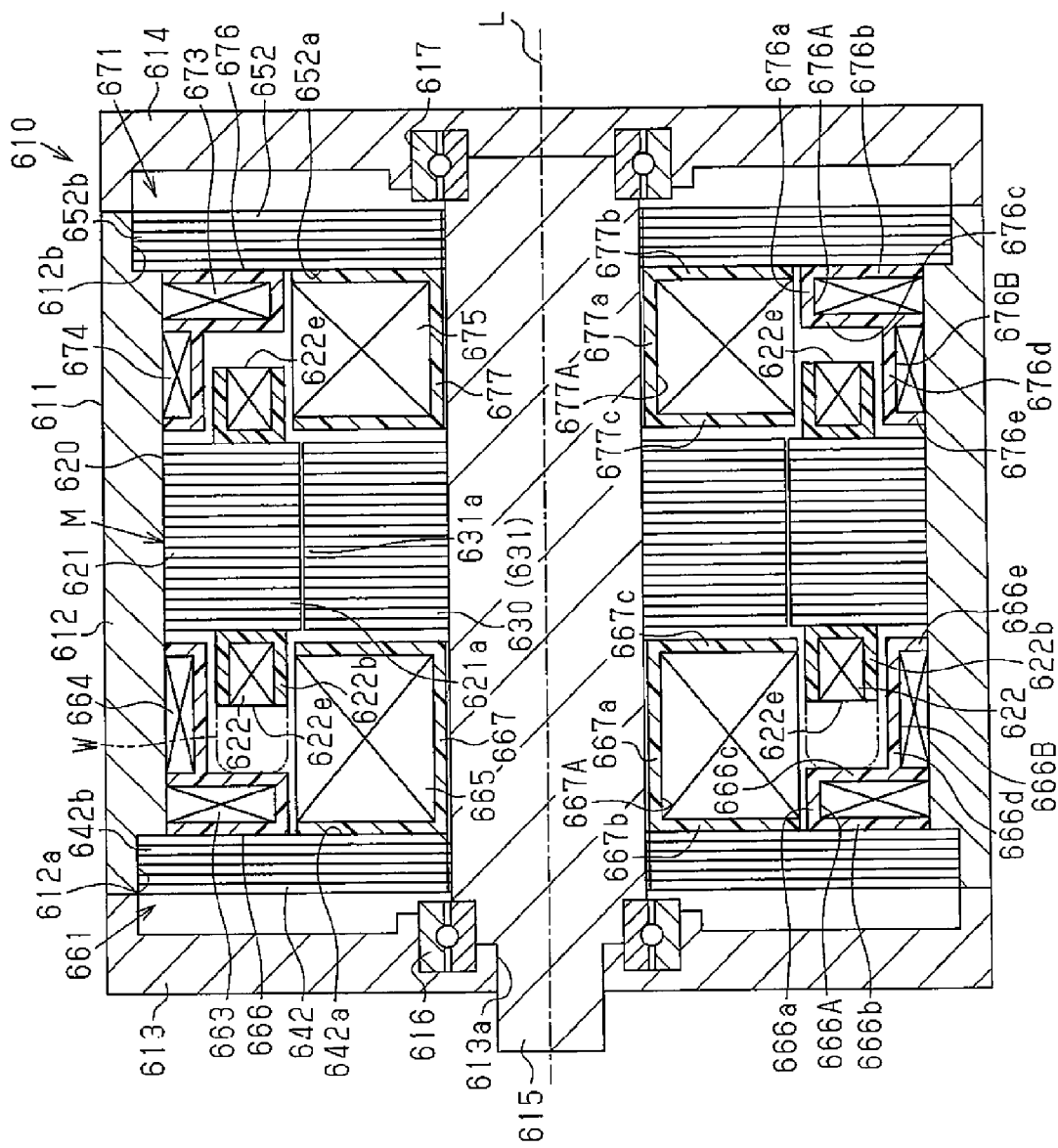
FIG. 41 is a side cross-sectional view of a rotary electric machine according to a tenth embodiment of the present invention.

As shown in FIG. 41, a third field pole 661 for generating a field magnetic flux is arranged closer to one end in the core back 612 than the stator 620 and the rotor 630. The third field pole 661 includes a first field core 642. The third field pole 661 also includes a seventh field coil 663, eighth field coil 664, and ninth field coil 665 serving as field coils.

A fifth field coil bobbin 666 serving as a field coil bobbin is fastened to an end surface 642a of the first field core 642. The fifth field coil bobbin 666 has a cylindrical fifth barrel portion 666a, which extends in the axial direction of the shaft 615 from the end surface 642a of the first field core 642 to a position in the connecting wire area W that is closest to the first housing 613. In addition, the fifth field coil bobbin 666 includes one end with an annular flange portion 666b, which extends outward in the radial direction from one end opening portion of the fifth barrel portion 666a, and another end with an annular flange portion 666c, which extends outward in the radial direction from the other end opening portion of the fifth barrel portion 666a. Further, the fifth field coil bobbin 666 has a cylindrical sixth barrel portion 666d, which extends in the axial direction of the shaft 615 from the flange portion 666c to just before one end surface of the stator core 621. In addition, the fifth field coil bobbin 666 has an annular distal side flange portion 666e, which extends outward in the radial direction from a distal opening of the sixth barrel portion 666d.

The fifth barrel portion 666a, the flange portion 666b, and the flange portion 666c form an axially outward wound portion 666A positioned more outward in the axial direction of the shaft 615 than the coil end 622e of the one end side. In addition, the sixth barrel portion 666d, part of the flange portion 666c, and the flange portion 666e form a radially outward wound portion 666B having a part positioned more outward in the radial direction than the coil end 622e of the one end side. In other words, the fifth field coil bobbin 666 is configured so as to integrate the axially outward wound portion 666A and the radially outward wound portion 666B.

The seventh field coil 663 is formed by winding the axially outward wound portion 666A with a conducting wire made of a conductive metallic material (in the tenth embodiment, copper) into a plurality of windings around the axis L of the shaft 615. In a state in which the seventh field coil 663 is wound around the axially outward wound portion 666A, the seventh field coil 663 is arranged more outward in the axial direction of the shaft 615 than the coil end 622e at one end. The eighth field coil 664 is formed by winding the radially outward wound portion 666B with a conducting wire made of a conductive metallic material (in the tenth embodiment, copper) into a plurality of windings around the axis L of the shaft 615. In a state in which the eighth field coil 664 is wound around the radially outward wound portion 666B, part of the eighth field coil 664 is arranged more outward in the radial direction than the coil end 622e of the one end side.

A sixth field coil bobbin 667 serving as a field coil bobbin is fastened to the end surface 642a of the first field core 642. The sixth field coil bobbin 667 includes a cylindrical seventh barrel portion 667a, which extends in the axial direction of the shaft 615 from the end surface 642e of the first field core 642 to just before one end surface of the rotor core 631, and a pair of annular flange portions 667b and 667c, which extend outward in a radial direction from both end opening portions of the seventh barrel portion 667a. In addition, the seventh barrel portion 667a and the pair of flange portions 667b and 667c form a radially inward wound portion 667A having a part positioned more inward in the radial direction than the coil end 622e at one end.

The ninth field coil 665 is formed by winding the radially inward wound portion 667A with a conducting wire made of a conductive metallic material (in the tenth embodiment, copper) into a plurality of windings around the axis L of the shaft 615. In a state in which the ninth field coil 665 is wound around the radially inward wound portion 667A, part of the ninth field coil 665 is arranged more inward in the radial direction than the coil end 622e of the one end side.

A fourth field pole 671 for generating a field magnetic flux is arranged closer to the other end in the core back 612 than the stator 620 and the rotor 630. The fourth field pole 671 includes a second field core 652. The fourth field pole 671 further includes a tenth field coil 673, an eleventh field coil 674, and a twelfth field coil 675 serving as field coils.

A seventh field coil bobbin 676 serving as a field coil bobbin is fastened to the end surface 652a of the second field core 652. The seventh field coil bobbin 676 has a cylindrical eighth barrel portion 676a, which extends in the axial direction of the shaft 615 from the end surface 652a of the second field core 652 toward the coil end 622e. In addition, the seventh field coil bobbin 676 includes one end with an annular flange portion 676b that extends outward in the radial direction from one end opening portion of the eighth barrel portion 676a and another with an annular flange portion 676c that extends outward in the radial direction from the other end opening portion of the eighth barrel portion 676a. Further, the seventh field coil bobbin 676 has a cylindrical ninth barrel portion 676d, which extends in the axial direction of the shaft 615 from the flange portion 676c to just before the other end surface of the stator core 621. In addition, the seventh field coil bobbin 676 has an annular distal side flange portion 676e that extends outward in the radial direction from a distal opening of the ninth barrel portion 676d.

The eighth barrel portion 676a, the flange portion 676b, and the flange portion 676c form an axially outward wound portion 676A positioned more outward in the axial direction of the shaft 615 than the coil end 622e of the other end side. In addition, the ninth barrel portion 676d, part of the flange portion 676c, and the flange portion 676e form a radially outward wound portion 676B having a part positioned more outward in the radial direction than the coil end 622e of the other end side. In other words, the seventh field coil bobbin 676 is configured so as to integrate the axially outward wound portion 676A and the radially outward wound portion 676B.

The tenth field coil 673 is formed by winding the axially outward wound portion 676A with a conducting wire made of a conductive metallic material (in the tenth embodiment, copper) into a plurality of windings around the axis L of the shaft 615. In a state in which the tenth field coil 673 is wound around the axially outward wound portion 676A, the tenth field coil 673 is arranged more outward in the axial direction of the shaft 615 than the coil end 622e of the other end side. The eleventh field coil 674 is formed by winding the radially outward wound portion 676B with a conducting wire made of a conductive metallic material (in the tenth embodiment, copper) into a plurality of windings around the axis L of the shaft 615. In a state in which the eleventh field coil 674 is wound around the radially outward wound portion 676B, part of the eleventh field coil 674 is arranged more outward in the radial direction than the coil end 622e of the other end side.

An eighth field coil bobbin 677 serving as a field coil bobbin is fastened to the end surface 652a of the second field core 652. The eighth field coil bobbin 677 includes a cylindrical tenth barrel portion 677a, which extends in the axial direction of the shaft 615 from the end surface 652a of the second field core 652 to just before the other end surface of the rotor core 631, and a pair of annular flange portions 677b and 677c, which extend outward in a radial direction from both end openings of the tenth barrel portion 677a. In addition, the tenth barrel portion 677a and the pair of flange portions 677b and 677c form a radially inward wound portion 677A having a part positioned more inward in a radial direction than the coil end 622e of the other end side.

The twelfth field coil 675 is formed by winding the radially inward wound portion 677A with a conducting wire made of a conductive metallic material (in the tenth embodiment, copper) into a plurality of windings around the axis L of the shaft 615. In a state in which the twelfth field coil 675 is wound around the radially inward wound portion 677A, part of the twelfth field coil 675 is arranged more inward in the radial direction than the coil end 622e of the other end side.

The tenth embodiment has the advantages described below in addition to advantages (38) to (41) of the ninth embodiment.

(42) The fifth field coil bobbin 666 is configured so as to integrate the axially outward wound portion 666A and the radially outward wound portion 666B, and the seventh field coil bobbin 676 is configured so as to integrate the axially outward wound portion 676A and the radially outward wound portion 676B. Thus, for example, a field coil bobbin for winding a field coil arranged more outward in the axial direction of the shaft 615 than the coil end 622e and a field coil bobbin for winding a field coil arranged more outward in the radial direction than the coil end 622e need not be separately arranged. In other words, by arranging only the single field coil bobbins 666 and 676, the field coils 663, 664, 673, and 674 can be arranged more outward in the axial direction of the shaft 615 than the coil end 622e and more outward in the radial direction than the coil end 622e.

The ninth and tenth embodiments may be modified as described below.

Figure 42:
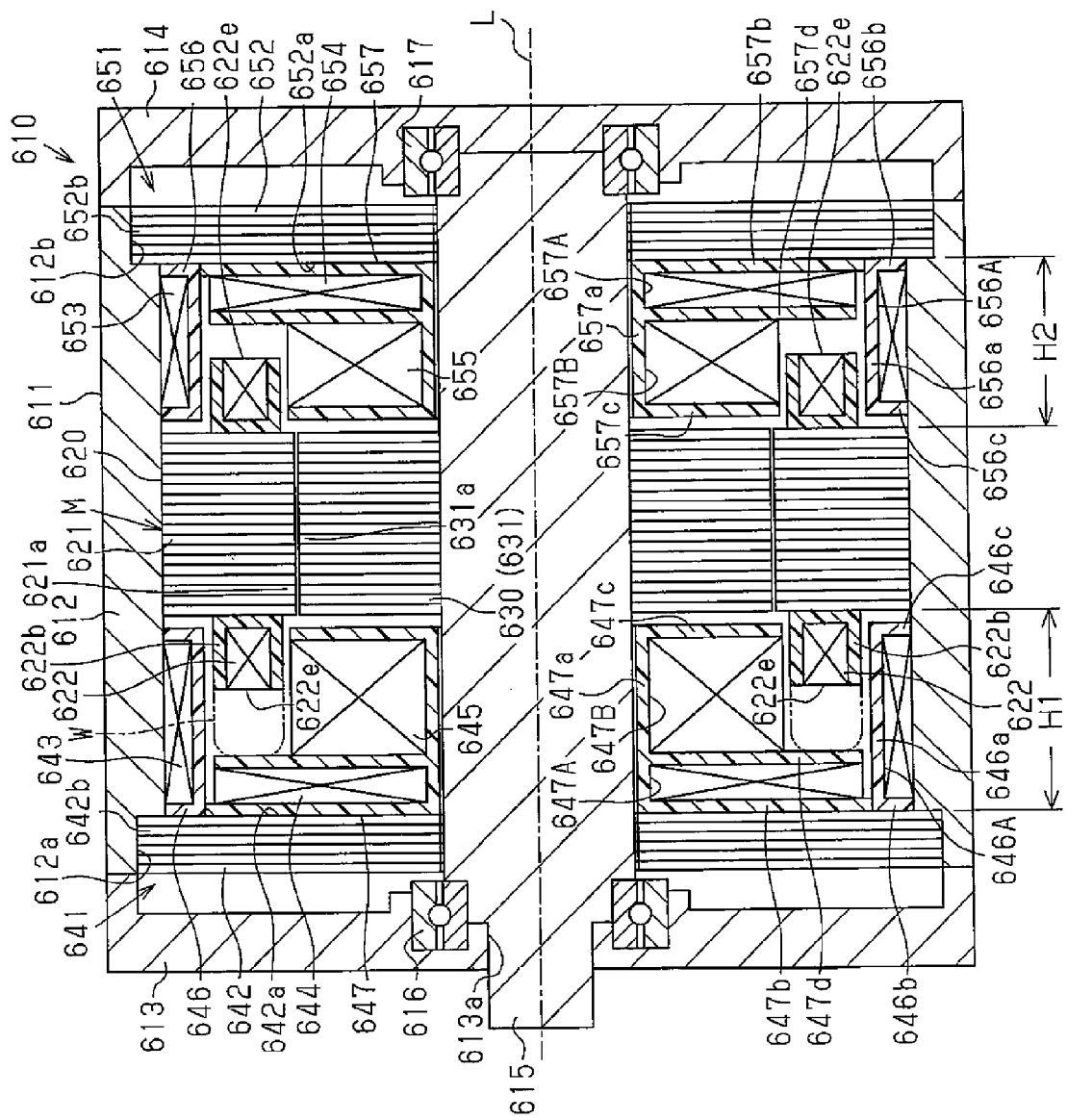
FIG. 42 is a side cross-sectional view of a rotary electric motor according to other examples of the ninth and tenth embodiments.

In the ninth embodiment, as shown in FIG. 42, the first field coil bobbin 646 and the second field coil bobbin 647 may be integrated by coupling the flange portion 647b of the second field coil bobbin 647 to an inner circumferential surface of the first barrel portion 646a of the first field coil bobbin 646. In the same manner, the third field coil bobbin 656 and the fourth field coil bobbin 657 may be integrated by coupling the flange portion 657b of the fourth field coil bobbin 657 to an inner circumferential surface of the third barrel portion 656a of the third field coil bobbin 656. Accordingly, by using only a single field coil bobbin, the field coils 643, 644, 645, 653, 654, and 655 can be arranged in all of the spaces more inward and outward in the radial direction than the coil end 622e and more outward in the axial direction of the shaft 615 than the coil end 622e.

Figure 43:
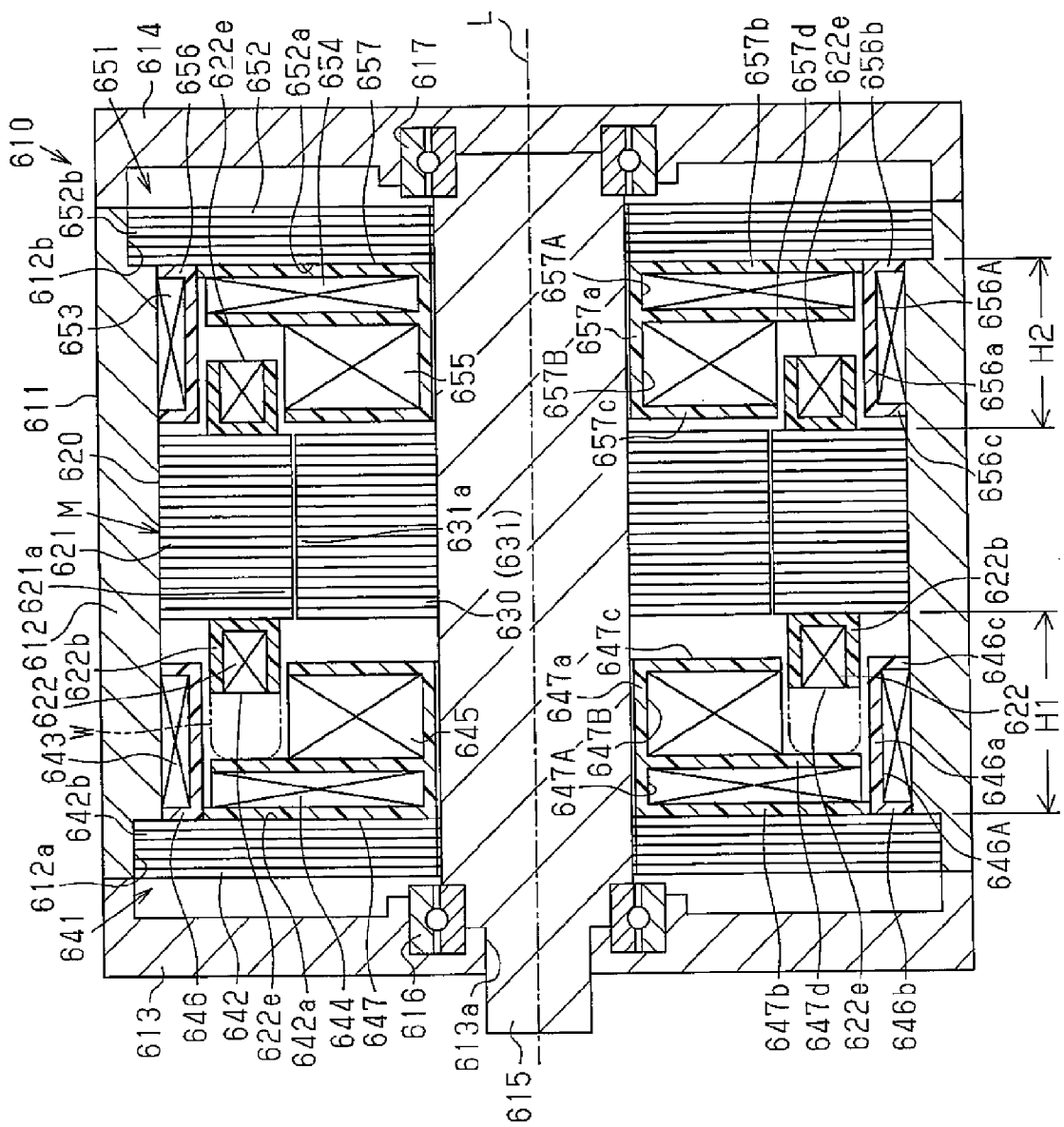
FIG. 43 is a side cross-sectional view of a rotary electric motor according to other examples of the ninth and tenth embodiments.

Further, as shown in FIG. 43, the lengths of the first barrel portion 646a and the second barrel portion 647a along the axial direction of the shaft 615 may be the same as the lengths of the third barrel portion 656a and the fourth barrel portion 657a along the axial direction of the shaft 615. In other words, field coil bobbins with the same shape may be arranged closer to both end sides in the core back 612 than the stator 620 and the rotor 630. Accordingly, by using only one type of field coil bobbin, the field coils can be arranged in all of the spaces more inward and outward in the radial direction than the coil end 622e and more outward in the axial direction of the shaft 615 than the coil end 622e.

Figure 44:
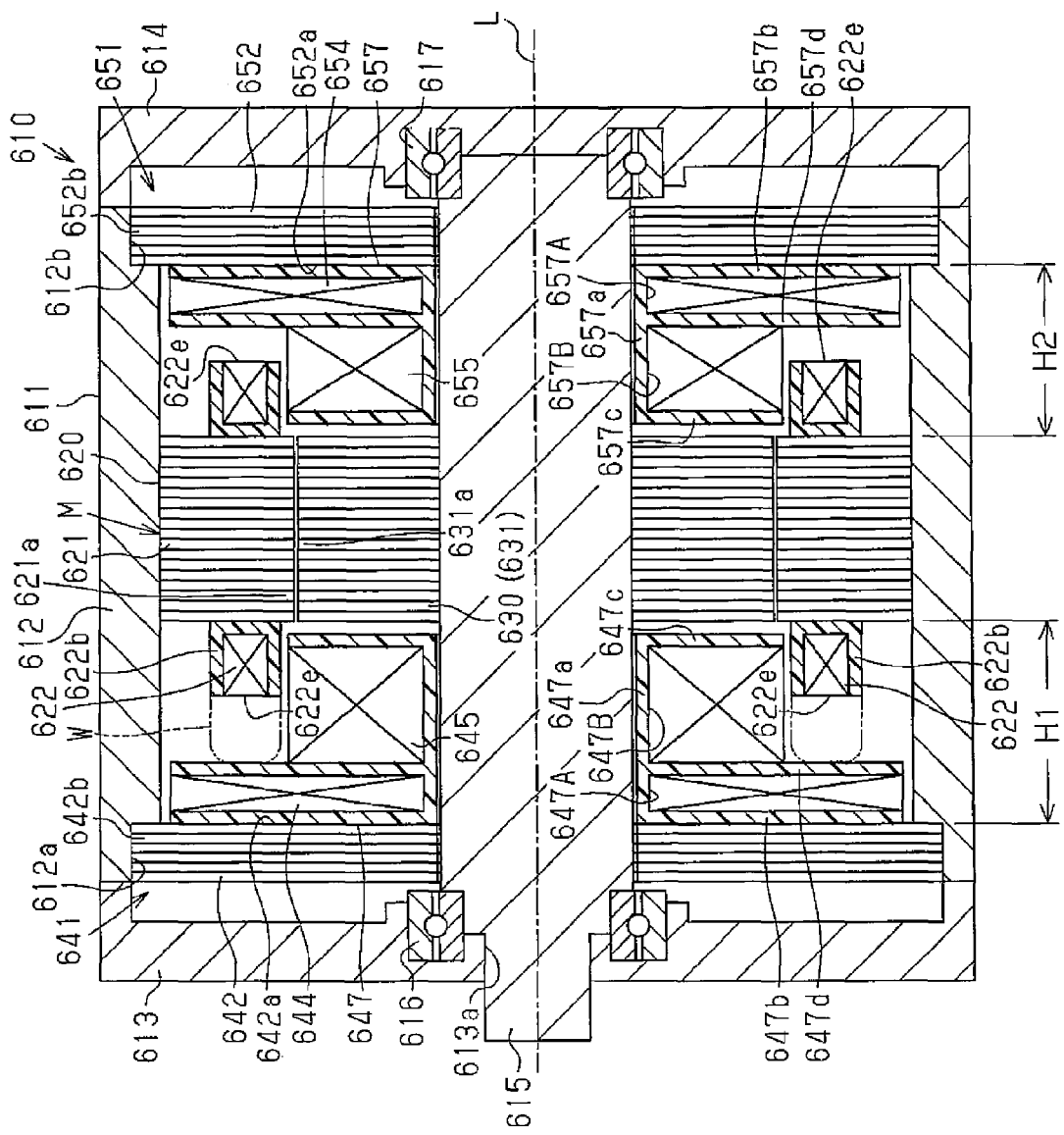
FIG. 44 is a side cross-sectional view of a rotary electric motor according to other examples of the ninth and tenth embodiments.

In the ninth embodiment, as shown in FIG. 44, the first field coil bobbin 646 and the third field coil bobbin 656 may be eliminated. In other words, field coils need not be arranged more outward in the radial direction than the coil end 622e. In this case, as shown in FIG. 44, the flange portion 647b and the partitioning flange portion 647d of the second field coil bobbin 647 are preferably provided so as to extend in the radial direction to just before the inner circumferential surface of the core back 612. In the same manner, the flange portion 657b and the partitioning flange portion 657d of the fourth field coil bobbin 657 are preferably provided so as to extend in the radial direction to just before the inner circumferential surface of the core back 612. Accordingly, the amount of conducting wire that is wound around the axially outward wound portions 647A and 657A can be increased.

In the ninth embodiment, the second field coil bobbin 647 need not be configured so as to integrate the axially outward wound portion 647A and the radially inward wound portion 647B. In other words, a field coil bobbin having the axially outward wound portion 647A and a field coil bobbin having the radially inward wound portion 647B may be arranged separately. In the same manner, the fourth field coil bobbin 657 need not be configured so as to integrate the axially outward wound portion 657A and the radially inward wound portion 657B. In other words, a field coil bobbin having the axially outward wound portion 657A and a field coil bobbin having the radially inward wound portion 657B may be arranged separately.

In the tenth embodiment, the fifth field coil bobbin 666 need not be configured so as to integrate the axially outward wound portion 666A and the radially outward wound portion 666B. In other words, a field coil bobbin having the axially outward wound portion 666A and a field coil bobbin having the radially outward wound portion 666B may be arranged separately. In the same manner, the seventh field coil bobbin 676 need not be configured so as to integrate the axially outward wound portion 676A and the radially outward wound portion 676B. In other words, a field coil bobbin having the axially outward wound portion 676A and a field coil bobbin having the radially outward wound portion 676B may be arranged separately.

In the ninth and tenth embodiments, a structure may be adopted in which a field coil is arranged only on the inner side of the coil end 622e in the radial direction.

In the ninth and tenth embodiments, a structure may be adopted in which a field coil is arranged only on the outer side of the coil end 622e in the axial direction of the shaft 615.

In the ninth and tenth embodiments, a structure may be adopted in which field coils are arranged on the inner side of the coil end 622e in the radial direction and on the outer side of the coil end 622e in the radial direction.

In the ninth and tenth embodiments, a structure may be adopted in which field coils are arranged on the outer side of the coil end 622e in the axial direction of the shaft 615 and on the outer side of the coil end 622e in the radial direction.

In the ninth and tenth embodiments, the number of the stator teeth 621a of the stator 620 may be changed as required. In addition, the number of the rotor teeth 631a of the rotor 630 may be changed as required.

In the ninth and tenth embodiments, while the rotor core 631 is formed by laminating a plurality of steel sheets (magnetic steel sheets), the rotor core 631 is not limited in such a manner and may be formed by a magnetic body such as SMC or an iron mass. In the same manner, the field cores 642 and 652 may also be formed by a magnetic body such as SMC or an iron mass.

In the ninth and tenth embodiments, only the field poles 641 and 661 or only the field poles 651 and 671 may be provided. In other words, field poles may be provided only on one side in the direction of the axis L.

In the ninth and tenth embodiments, while a field magnetic path is formed via the shaft 615, field magnetic path formation is not limited in such a manner and a field magnetic path may be formed without the shaft 615. A magnetic body with a lower magnetic resistance than the shaft 615 may be provided on the shaft 615 to form a field magnetic path. For example, SMC may be used as the magnetic body.

In the ninth and tenth embodiments, while the rotor teeth 631*a* serving as salient pole sections have convex shapes, the rotor teeth 631*a* are not limited to this structure and need only have saliency. For example, the rotor may have an overall cylindrical shape by arranging only the distal ends of the rotor teeth to be coupled to adjacent rotor teeth or by filling the recesses between the rotor teeth with a non-magnetic body.

In the ninth and tenth embodiments, while the present invention has been embodied in the motor 610 serving as a rotary electric machine, the present invention is not limited in such a manner and may be used as a generator.

An eleventh embodiment of the present invention will now be described with reference to FIGS. 45 to 47.

Figure 45:
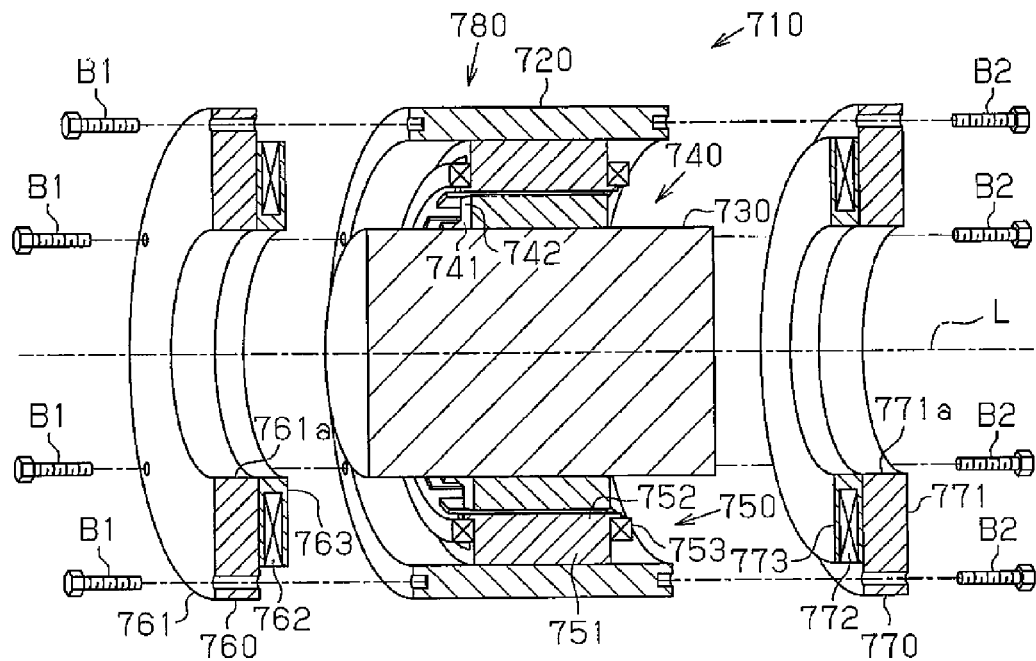
FIG. 45 is an exploded perspective view of a cross section that schematically shows a rotary electric motor according to an eleventh embodiment of the present invention.
Figure 46:
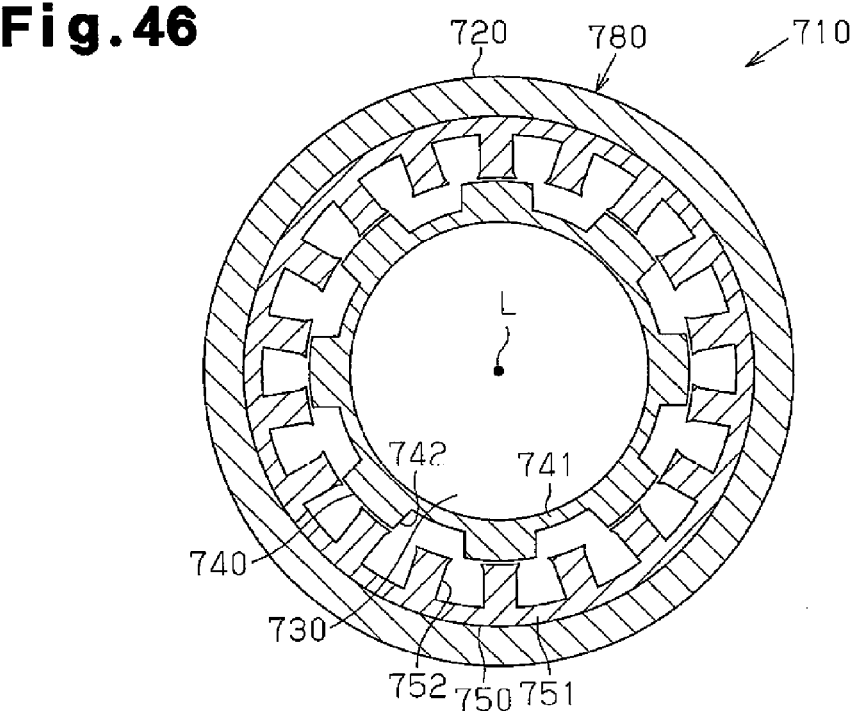
FIG. 46 is a longitudinal cross-sectional view schematically showing a rotor, a stator, and a field yoke of the rotary electric motor shown in FIG. 45.

As shown in FIGS. 45 and 46, a motor 710 serving as a rotary electric machine is a wound-field synchronous motor that does not use a permanent magnet. The motor 710 that is a rotary electric motor includes a cylindrical field yoke 720, a rotary shaft 730 which has a rod shape and which extends in a horizontal direction, a rotor 740 (rotating part) that is rotatably supported inside the field yoke 720, a stator 750 (stationary part) arranged inside the field yoke 720, and field poles 760 and 770. In the eleventh embodiment, the field poles 760 and 770 also function as field yokes.

The rotary shaft 730 is couple by bearings and the like (not shown) and rotatably supported. The rotary shaft 730 is formed by a magnetic body.

A rotor core 741 is fixed to the rotary shaft 730 inside the field yoke 720. The rotor core 741 is configured so as to be integrally rotatable with the rotary shaft 730 around the axis L of the rotary shaft 730. In addition, an outer circumferential surface of the rotary shaft 730 and an inner circumferential surface of the rotor core 741 are in close contact with each other. Thus, the rotary shaft 730 and the rotor core 741 are magnetically coupled to each other. The rotor core 741 is formed by laminating a plurality of steel sheets in a direction along the axis L. Thus, in the rotor core 741, a magnetic flux more readily flows in a radial direction and a circumferential direction of the rotor core 741 that are perpendicular to the axis L than in a direction along the axis L.

The rotor 740 (the rotor core 741) has rotor teeth 742 which protrude outward in a radial direction. The rotor teeth 742 serving as magnetic salient poles are formed in plurality. The rotor teeth 742 are formed at regular intervals in a circumferential direction, and distal surfaces of the rotor teeth 742 are all positioned on the same circumferential plane.

The stator 750 (a stator core 751) is arranged inside the field yoke 720 outward in the radial direction of the rotor teeth 742 of the rotor 740 (the rotor core 741), and the stator core 751 has an annular shape that encloses the rotor core 741. The stator core 751 is formed by laminating a plurality of steel sheets in a direction along the axis L. Thus, in the stator core 751, a magnetic flux more readily flows in a radial direction and the circumferential direction of the stator core 751 that are perpendicular to the axis L of the rotary shaft 730 than in a direction along the axis L. In addition, the dimension of the stator core 751 along the axis L is set to be the same as the dimension of the rotor core 741 along the axis L.

Further, the stator core 751 includes stator teeth 752, which protrude toward the rotary shaft 730. The stator teeth 752 are formed in plurality at regular intervals in the circumferential direction.

A slight clearance (for example, 0.7 mm) is formed between a distal surface of each rotor teeth 742 (an outer circumferential surface of the rotor core 741) and an inner circumferential surface of the stator teeth 752 (the stator core 751).

A stator coil (stator winding) 753 is wound around each stator tooth 752. In other words, a conducting wire is wound around the stator teeth 752 to form stator coils 753 as armature coils. Each stator coil 753 is any of a U-phase winding, a V-phase winding, and a W-phase winding, and a rotating magnetic field is generated by supplying currents with varying phases to the windings.

Since dimensions along the axis L of the stator core 751 (the stator teeth 752) and the rotor core 741 are the same, both end portions (coil ends) of the stator coil 753 in the direction along the axis L protrude more outward among directions along the axis L than both ends of the rotor core 741.

Further, the cylindrical field yoke 720 that extends in the axis L covers an entire circumference of an outer circumferential surface of the stator core 751. The field yoke 720 is formed by a magnetic body, or more specifically, by a steel material (iron mass) such as S45C and SS400. The field yoke 720 has a thickness of around 15 mm to 20 mm. In addition, the outer circumferential surface of the stator core 751 and an inner circumferential surface of the field yoke 720 are in close contact with each other. Thus, the stator core 751 and the field yoke 720 are magnetically coupled to each other.

In the eleventh embodiment, the rotary shaft 730, the rotor 740, and the stator 750 form a main electric motor portion 780.

A field pole 760 for generating a field magnetic flux is provided at a left opening of the field yoke 720 in the direction along the axis L. In addition, a field pole 770 for generating a field magnetic flux is provided at a right opening of the field yoke 720 in the direction along the axis L.

The field pole 760 has a field pole core 761 and a field winding 762. The field pole core 761 is formed by using a magnetic steel sheet as a magnetic material and by laminating a plurality of the magnetic steel sheets in the direction along the axis L. Specifically, non-oriented magnetic steel sheets are used. The field pole core 761 is disk-shaped and arranged to close the left opening of the field yoke 720. The field pole core 761 has a central through hole 761*a*, and the rotary shaft 730 is inserted into the through hole 761*a*.

Figure 47:
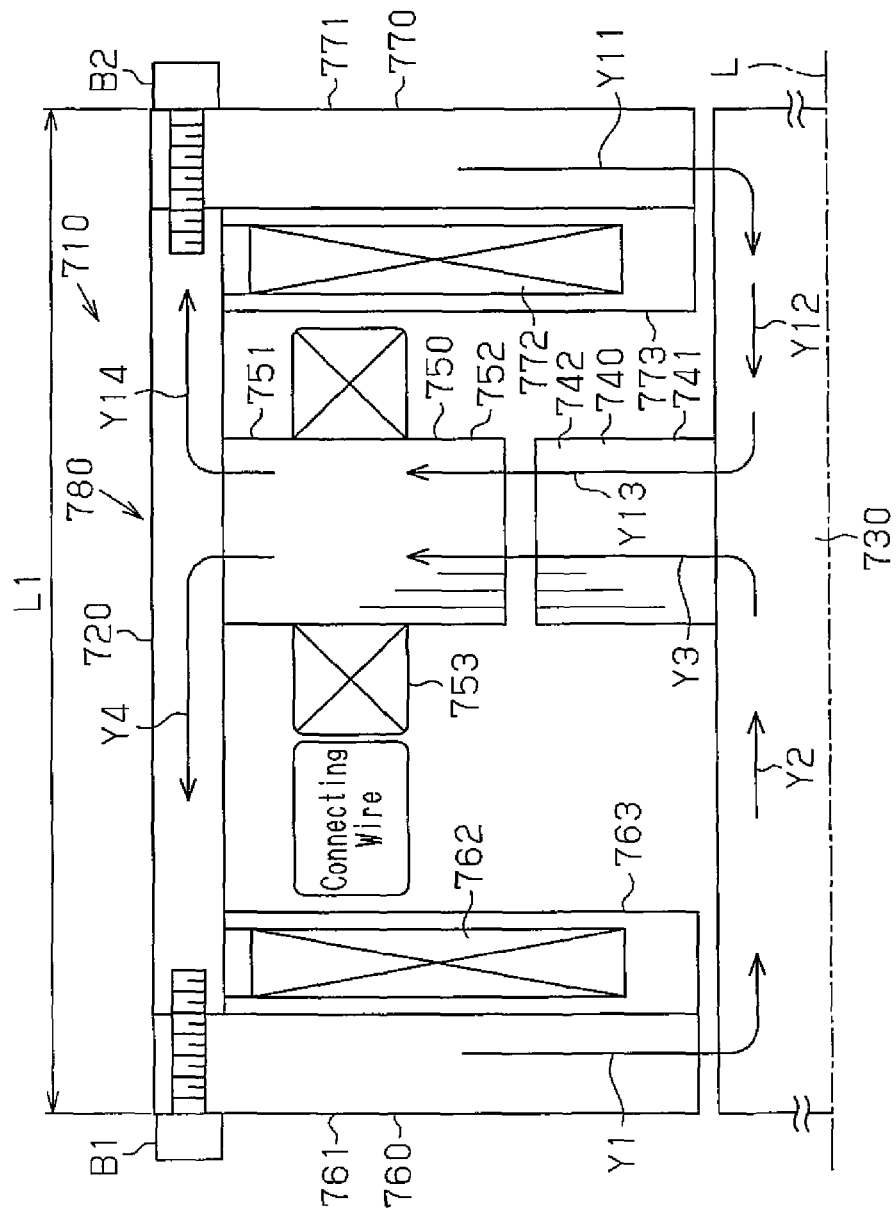
FIG. 47 is a longitudinal cross-sectional view schematically showing the rotary electric motor shown in FIG. 45.

As shown in FIG. 47, the field winding 762 is arranged in the field pole core 761 in a motor inner surface portion in the axial direction. The field winding 762 is formed by winding a conducting wire around a bobbin 763 along a circumferential direction of the rotary shaft 730.

The field pole core 761 is fixed to the field yoke 720 by a bolt B1 (fixed to an opening portion of the field yoke 720 by the bolt B1). In other words, the field pole core 761 is fastened by the bolt B1 that extends through the field pole core 761 into the field yoke 720. Accordingly, the field pole 760 is coupled to the main electric motor portion 780. When the field pole core 761 is coupled to the main electric motor portion 780, the field pole core 761 is in close contact with the field yoke 720. Thus, the field pole core 761 and the field yoke 720 are magnetically coupled to each other.

In the same manner, the field pole 770 has a field pole core 771 and a field winding 772. The field pole core 771 is formed by using a magnetic steel sheet as a magnetic material and by laminating a plurality of the magnetic steel sheets in the direction along the axis L. Specifically, non-oriented magnetic steel sheets are used. The field pole core 771 is disk-shaped and arranged to close the right opening of the field yoke 720. The field pole core 771 has a central through hole 771*a*, and the rotary shaft 730 is inserted into the through hole 771*a*.

The field winding 772 is arranged in the field pole core 771 at a motor inner surface portion in the axial direction. The field winding 772 is formed by winding a conducting wire around a bobbin 773 along a circumferential direction of the rotary shaft 730.

The field pole core 771 is fixed to the field yoke 720 by a bolt B2 (fixed to the opening portion of the field yoke 720 by the bolt B2). In other words, the field pole core 771 is fastened by the bolt B2 that extends through the field pole core 771 into the field yoke 720. Accordingly, the field pole 770 is coupled to the main electric motor portion 780. When the field pole core 771 is coupled to the main electric motor portion 780, the field pole core 771 is in close contact with the field yoke 720. Thus, the field pole core 771 and the field yoke 720 are magnetically coupled to each other.

Next, the operation of the motor 710 will be described focusing on a magnetic path (a flow of field magnetic flux) formed when the field windings 762 and 772 are energized.

As shown in FIG. 47, in the motor 710 of the eleventh embodiment, a field magnetic flux is generated on the field pole core 761 when the field winding 762 is energized. As indicated by an arrow Y1, this field magnetic flux flows toward the rotary shaft 730. The field magnetic flux then passes through a magnetic void (gap) and flows to the rotary shaft 730. Subsequently, as indicated by an arrow Y2, the field magnetic flux flows inside the rotary shaft 730 in the axial direction, and as indicated by an arrow Y3, flows in a direction perpendicular to the axis L of the rotary shaft 730, flows through the rotor core 741 (the rotor teeth 742) toward an outer diameter side, and passes through the stator core 751 (the stator teeth 752). Further, as indicated by an arrow Y4, the field magnetic flux is guided through the field yoke 720 toward the field pole 760.

In this manner, a field magnetic path formed by the field pole core 761, the rotary shaft 730, the rotor 740, the stator 750, and the field yoke 720 is formed.

In the same manner, a field magnetic flux is generated on the field pole core 771 when the field winding 772 is energized. As indicated by an arrow Y11, this field magnetic flux flows toward the rotary shaft 730. The field magnetic flux then passes through a magnetic void (gap) and flows to the rotary shaft 730. Subsequently, as indicated by an arrow Y12, the field magnetic flux flows inside the rotary shaft 730 in the axial direction, and as indicated by an arrow Y13, flows in a direction perpendicular to the axis L of the rotary shaft 730, flows through the rotor core 741 (the rotor teeth 742) toward an outer diameter side, and passes through the stator core 751 (the stator teeth 752). Further, as indicated by an arrow Y14, the field magnetic flux is guided through the field yoke 720 toward the field pole 770.

In this manner, a field magnetic path formed by the field pole core 771, the rotary shaft 730, the rotor 740, the stator 750, and the field yoke 720 is formed.

Further, with the motor 710 of the eleventh embodiment, an annular (loop-shaped) magnetic path (a flow of field magnetic flux) is formed, the rotor teeth 742 of the rotor 740 attain a polarity of an N-pole due to the field magnetic flux, and the rotor teeth 742 (the field magnetic flux) attain the same function as a permanent magnet arranged on a rotor in a permanent magnet synchronous motor.

In addition, with the motor 710 of the eleventh embodiment, by increasing an amount of current supplied to the field windings 762 and 772, the field magnetic flux can be increased and a greater torque can be produced. On the other hand, with the motor 710 of the eleventh embodiment, by reducing an amount of current supplied to the field windings 762 and 772 during high-speed rotation, the field magnetic flux can be reduced and a maximum rotation speed can be increased. In other words, with the motor 710 of the eleventh embodiment, a maximum torque and a maximum rotation speed can be increased by field strengthening control alone. Thus, with the motor 710 of the eleventh embodiment, field weakening control that is required when a permanent magnet is arranged on the rotor 740 becomes unnecessary and a structure of the motor 710 can be simplified.

In addition, magnetic steel sheets are used as the field pole cores 761 and 771 and, as shown in FIG. 47, a magnet-less wound-field synchronous motor structure is realized. In other words, a magnet-less wound-field synchronous motor is realized which uses the rotary shaft 730 in a path in which a magnetic flux flows from the field poles 760 and 770 to the rotor. In this case, since the material of the field pole cores (761 and 771) is changed to a non-oriented magnetic steel sheet and limit contact pressure is increased, the field pole cores (761 and 771) can be fixed by bolt fastening.

By using a non-oriented magnetic steel sheet instead of conventional soft magnetic composites as the material of the field pole cores 761 and 771, saturation magnetic flux density is increased. Thus, the thickness of the field pole cores in the axial direction can be reduced and a motor shaft length can be shortened.

The eleventh embodiment has the advantages described below.

(43) The field pole cores 761 and 771 of the field poles 760 and 770 are formed by a steel material. When an integrally-molded magnetic material (soft magnetic composites) is used as the field pole cores, since soft magnetic composites have a low limit contact pressure, a tightening force necessary when fixing the field pole cores cannot be secured. This makes it difficult to perform bolt fastening. In contrast, by forming the field pole cores 761 and 771 with a steel material, the field pole cores 761 and 771 arranged at the opening portion of the cylindrical field yoke 720 can be bolt-fastened.

(44) Since laminated magnetic steel sheets are used as the steel material that form the field pole cores 761 and 771 of the field poles, the size of the motor can be reduced due to the application of the magnetic steel sheets. Specifically, in Japanese Laid-Open Patent Publication No. 2008-43099 described earlier, since soft magnetic composites have a lower saturation magnetic flux density than a magnetic steel sheet, the size of the motor increases. In contrast, in the eleventh embodiment, the use of magnetic steel sheets increases saturation magnetic flux density, and enables a motor shaft length (a shaft length ratio of the motor) to be reduced (shortened) and the size of the motor to be reduced.

(45) The field pole cores 761 and 771 are fastened to the field yoke 720 by screwing the bolts B1 and B2 which extend through the field pole cores 761 and 771 into the field yoke 720 and can easily be fixed.

The eleventh embodiment is not limited to the foregoing description and may be modified as described below.

Figure 48A:
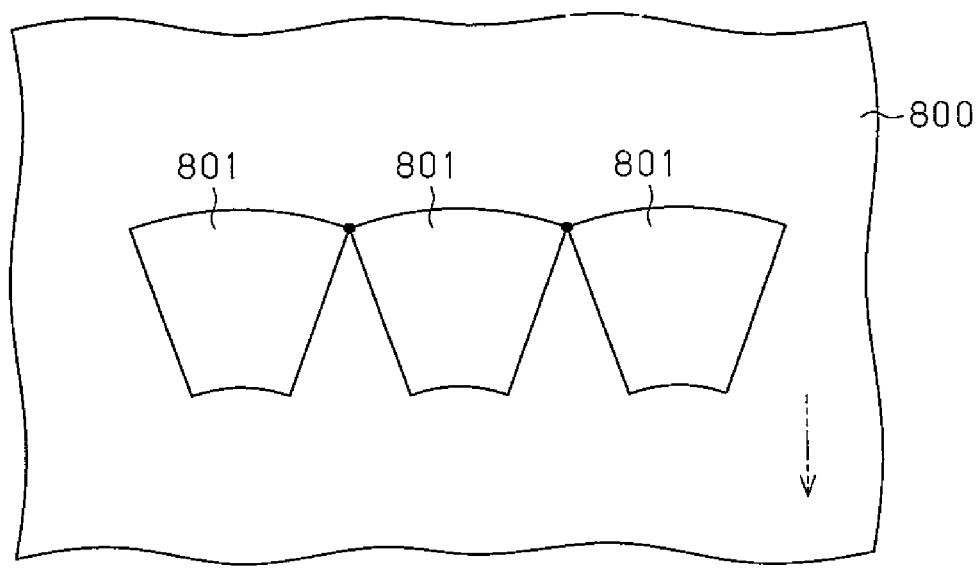
FIG. 48A is a plan view for describing a manufacturing process of a field pole core according to another example of the eleventh embodiment.
Figure 48B:
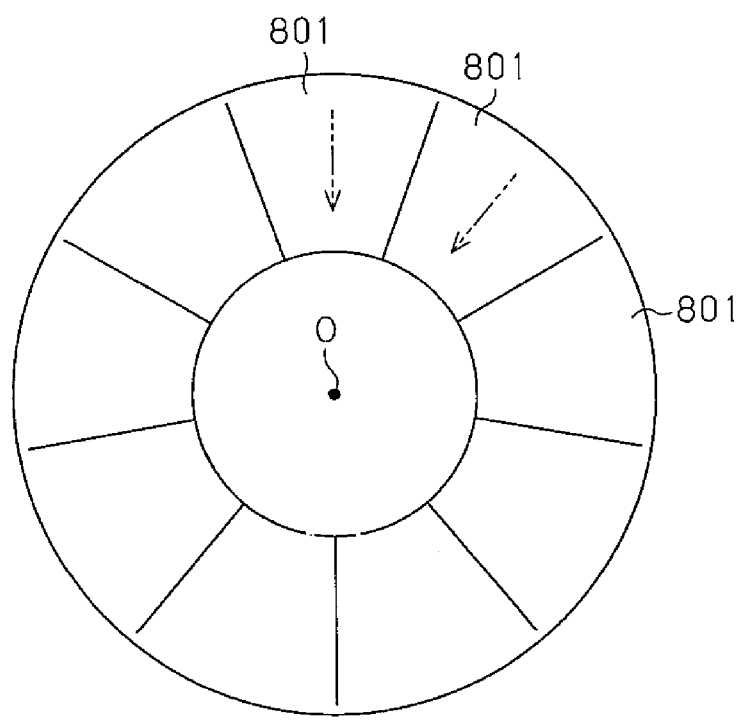
FIG. 48B is a plan view of a field pole core shown in FIG. 48A.

The disk-shaped field pole cores 761 and 771 are formed by laminating disk-shaped non-oriented magnetic steel sheets. Alternatively, as shown in FIG. 48B, the field pole cores 761 and 771 may be formed by split cores, that is, disk-shaped non-oriented magnetic steel sheets divided at predetermined angles. Specifically, as shown in FIG. 48A, a single non-oriented magnetic steel sheet 800 is punched and shaped by a press and divided at predetermined angles. At this point, the divided members 801 are coupled to each other. The members 801 punched out by the press are then spread out into the shape of a disk as shown in FIG. 48B. The disks are laminated to form a field pole core. This also allows for bolt fastening of the field pole cores 761 and 771, fixing of the field pole cores 761 and 771 using a pin shown in FIGS. 50A and 50B (to be described later), and reduction of the motor shaft length can be achieved.

In this manner, the formation of the disk-shaped field pole cores 761 and 771 by punching out the magnetic steel sheet 800 into divided shapes and then combining the divided shapes readily forms the disk-shaped field pole cores 761 and 771.

Figure 49A:
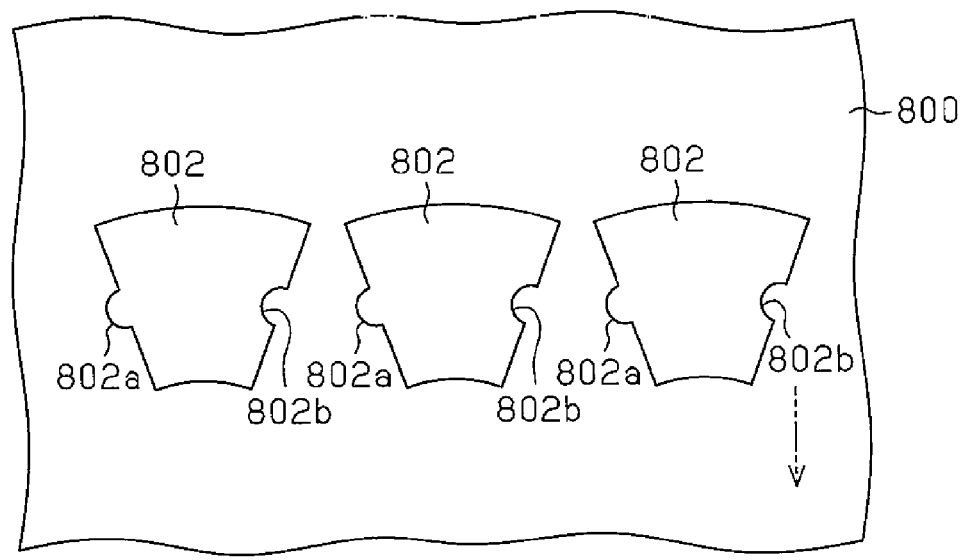
FIG. 49A is a plan view for describing a manufacturing process of a field pole core according to another example of the eleventh embodiment.
Figure 49B:
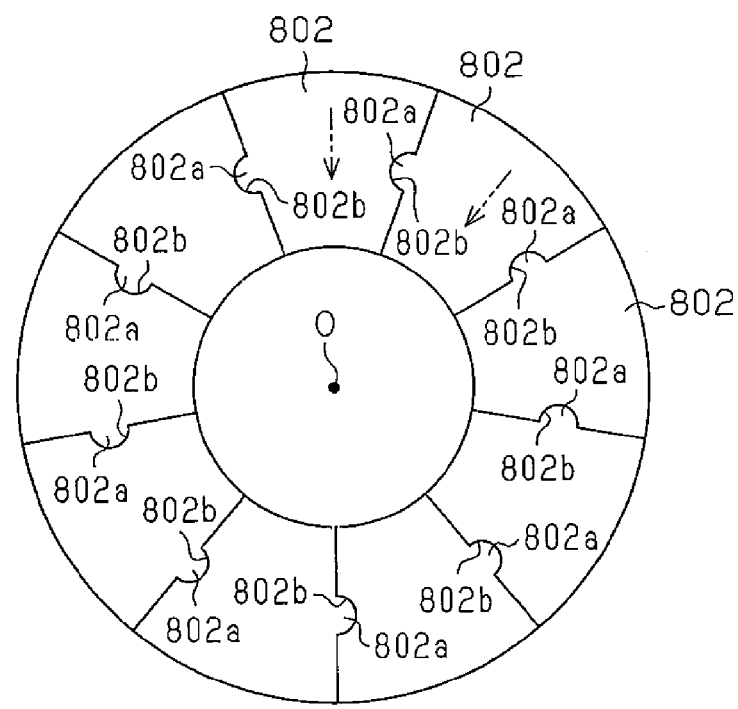
FIG. 49B is a plan view of a field pole core according to another example of FIG. 49A.

The structure shown in FIGS. 49A and 49B may be adopted instead of the structure shown in FIGS. 48A and 48B. As shown in FIG. 49A, a single magnetic steel sheet 800 is punched out by a press in a shape divided at predetermined angles. At this point, the members 802 are completely divided, and a semicircular protrusion 802a and a semicircular recess 802b are formed on each member 802. Subsequently, as shown in FIG. 49B, by fitting the protrusion 802a and the recess 802b of the members 802 punched out by a press to each other, the members 802 are fitted together to form a disk shape. The disk shapes are laminated to construct a field core. Moreover, while the members 802 are fixed by fitting the recess 802b and the protrusion 802a to each other, welding may be performed instead. In other words, besides fitting (swaging), the joint may be realized by welding.

Even in this case, bolt fastening of the field pole cores 761 and 771, fixing of the field pole cores 761 and 771 with the pin shown in FIGS. 50A and 50B (to be described later), and a reduction of the motor shaft length can be achieved.

While laminated bodies of non-oriented steel sheets are used as the field pole cores 761 and 771, laminated bodies of oriented magnetic steel sheets may be used instead. In the steel sheet used, directions in which a magnetic flux readily flows are indicated by virtual lines in FIGS. 48A and 48B and FIGS. 49A and 49B. Members punched out by a press are bent into the shape of a disk. The pressing is performed so that the directions in which a magnetic flux readily flows through the oriented magnetic steel sheet are oriented toward a center O of the disk. Even in this case, bolt fastening of the field pole cores 761 and 771, fixing of the field pole cores 761 and 771 using the pin shown in FIGS. 50A and 50B (to be described later), and a reduction of the motor shaft length can be achieved.

In other words, the disk-shaped field pole cores 761 and 771 can be formed by punching out and combining the divided oriented magnetic steel sheet, and the magnetic flux can be readily oriented toward the center O by using the oriented magnetic steel sheet.

Instead of a laminated body of steel sheets, a steel material (iron mass) such as S45C and SS400 may be used as the field pole cores 761 and 771. In this case, bolt fastening of the field pole cores 761 and 771, and fixing of the field pole cores 761 and 771 using the pin shown in FIGS. 50A and 50B (to be described later) can be achieved.

Figure 50A:
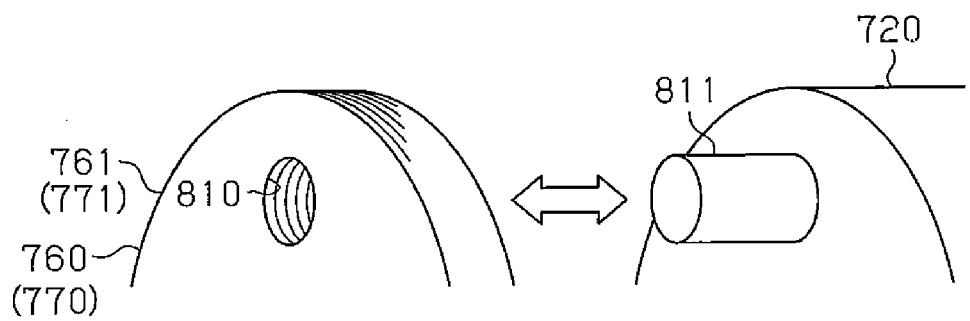
FIG. 50A is a partial exploded perspective view schematically showing a rotary electric motor according to another example of the eleventh embodiment.
Figure 50B:
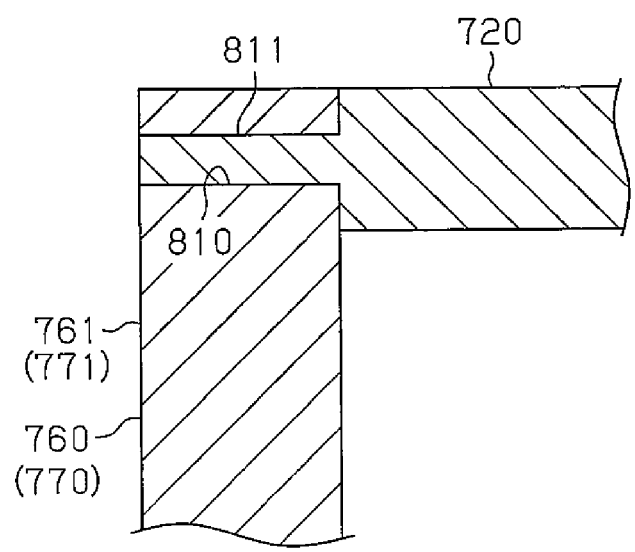
FIG. 50B is a partial cross-sectional view schematically showing the rotary electric motor shown in FIG. 50A.

While the field pole cores 761 and 771 are fixed to the field yoke 720 by fastening using the bolts B1 and B2, alternatively, as shown in FIGS. 50A and 50B, the structure of a fastening portion of the field pole cores may be adopted in which the field pole core 761 is fastened by forming a pin press-fit hole 810 on the field pole core 761, providing a pin 811 on the field yoke 720, and press-fitting the pin 811 of the field yoke 720 into the pin press-fit hole 810 of the field pole core 761. Specifically, the pin 811 is integrated with the field yoke 720, and a material of the field yoke 720 is a steel material such as SS400 and S45C. In addition, the field pole core 761 is made of a magnetic steel sheet or a steel material such as S45C and SS400. Particularly, when a structure is adopted in which steel sheets are laminated, the steel sheets are swaged. Subsequently, the pin is driven in and press-fitted for fastening with the field pole core 761.

In this manner, when the material of the field pole core 761 is a magnetic steel sheet or a steel material such as S45C and SS400, and the material of the field yoke 720 is also a steel material such as SS400 and S45C, the pin press-fit hole 810 can be provided on the field pole core 761 and the pin 811 can be provided on the field yoke 720 shown in FIGS. 50A and 50B, and fixing of the field pole core using the pin can be performed. In other words, the field pole core 761 can be fastened to the field yoke 720 by press-fitting the pin 811 formed on the field yoke 720 into a through hole (or a recess) formed on the field pole core 761.

The field yoke 720 may be formed by soft magnetic composites.

In the structures shown in FIGS. 45 to 47, only the field pole 760 or only the field pole 770 may be provided. In other words, a field pole may be provided only on one side in the axial direction.

While a field magnetic path is formed via the rotary shaft 730, alternatively, a field magnetic path may be formed without involving the rotary shaft 730. In short, any structure may be adopted as long as a field magnetic flux created on the field pole cores 761 and 771 due to the energization of the field windings 762 and 772 forms a field magnetic path formed by the field pole cores 761 and 771 and at least the rotor 740, the stator 750, and the field yoke 720.

In the eleventh embodiment, while the rotor teeth 742 serving as salient pole sections have convex shapes, the rotor teeth 742 are not limited to this structure. The rotor teeth 742 need only have saliency. For example, the rotor may have an overall cylindrical shape by arranging only the distal ends of the rotor teeth to be coupled to adjacent rotor teeth or by filling the recesses between the rotor teeth with a non-magnetic body.

In the eleventh embodiment, while the present invention has been embodied in the motor serving as a rotary electric machine, the present invention is not limited in such a manner and may be used as a generator.

A twelfth embodiment in which the present invention is embodied in a motor (a rotary electric motor) serving as a rotary electric machine will now be described with reference to FIGS. 51 and 52.

Figure 51:
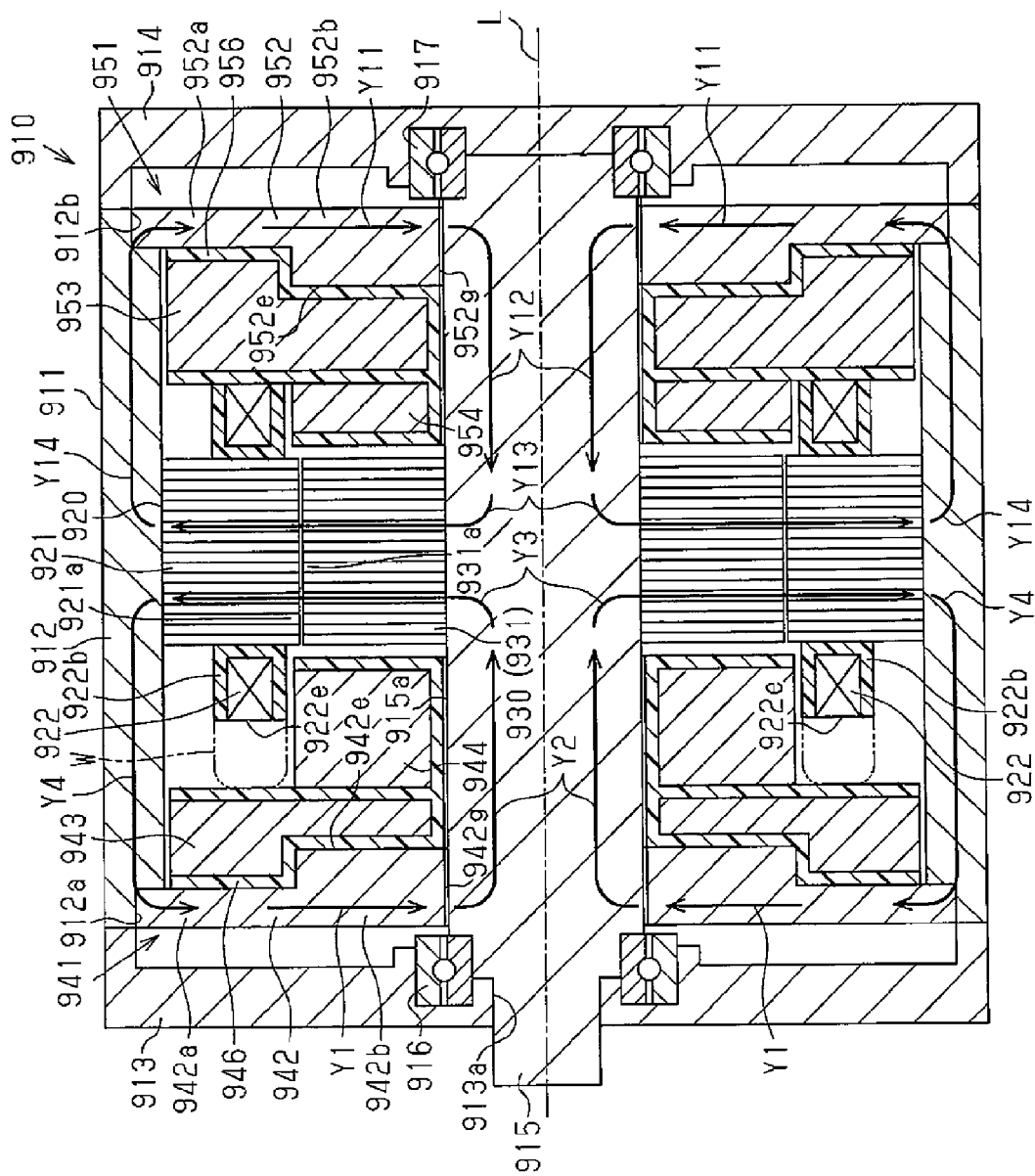
FIG. 51 is a side cross-sectional view of a rotary electric motor according to a twelfth embodiment of the present invention.

As shown in FIG. 51, a housing 911 of a motor 910 includes a cylindrical core back (field yoke) 912, a cylindrical first housing 913 having a closed bottom and coupled to one end (left end as shown in FIG. 51) of the core back 912, and a cylindrical second housing 914 having a closed bottom and coupled to the other end (right end as shown in FIG. 51) of the core back 912. The first housing 913 and the second housing 914 are formed from a non-magnetic material. The core back 912 is formed from a magnetic material, and in the twelfth embodiment, is formed from soft magnetic composites (SMC). A through hole 913a is formed on a bottom wall of the first housing 913.

A shaft (rotary shaft) 915 is housed in the core back 912. The shaft 915 is formed from a soft magnetic material (for example, iron or soft magnetic composites) and has a generally cylindrical shape. The shaft 915 is rotatably supported by the first housing 913 and the second housing 914 by bearings 916 and 917. One end (a left end as shown in FIG. 51) of the shaft 915 protrudes out of the housing 911 through the through hole 913a.

A stator 920 (stationary part) is fixed to an inner circumferential surface of the core back 912. The stator 920 includes an annular stator core 921 fixed to the inner circumferential surface of the core back 912 and a stator coil (stator winding)

922. The core back 912 covers an entire circumference of an outer circumferential surface of the stator core 921, and the outer circumferential surface of the stator core 921 and the inner circumferential surface of the core back 912 are in close contact with each other. Thus, the stator core 921 and the core back 912 are magnetically connected to each other. The stator core 921 is formed by laminating a plurality of magnetic steel sheets in a direction along an axis L of the shaft 915 (an axial direction of the shaft 915).

Figure 52:
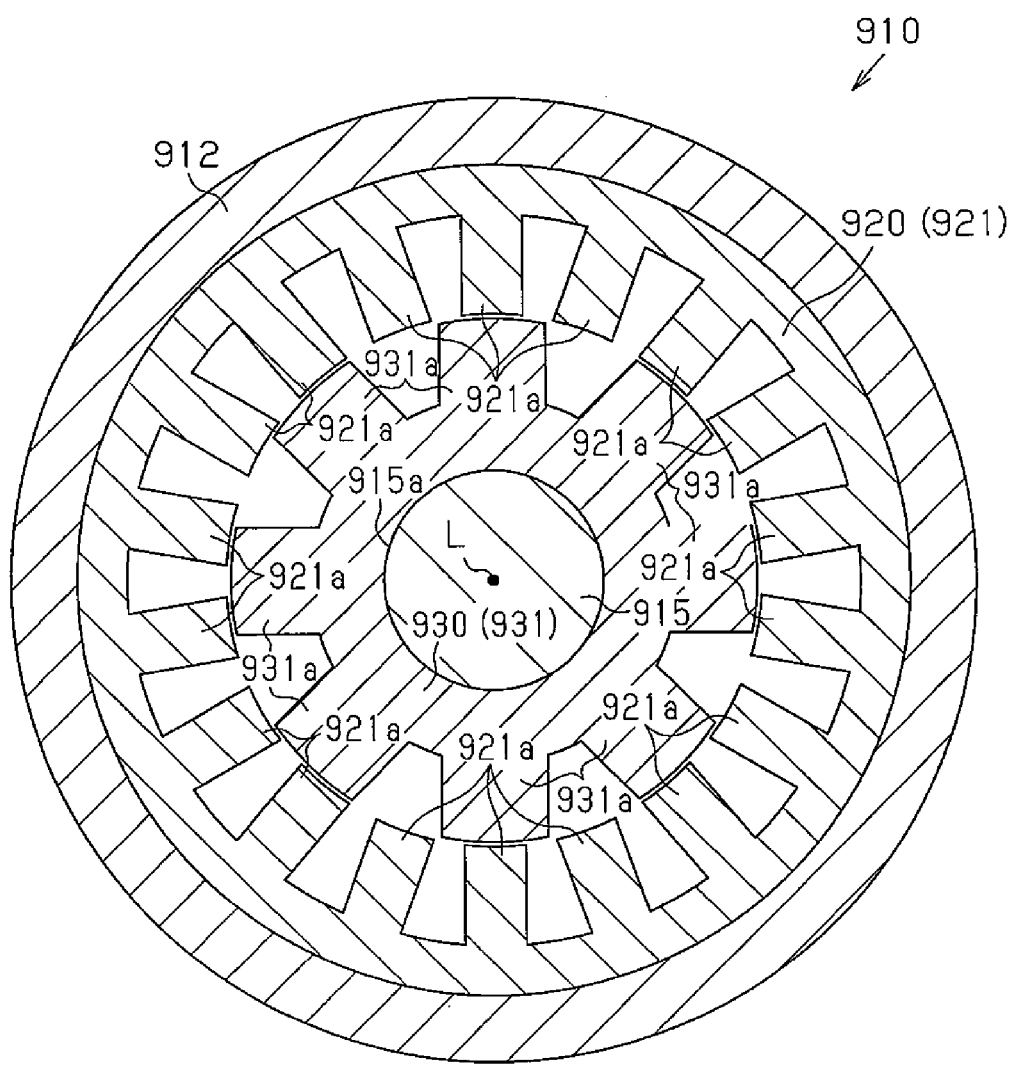
FIG. 52 is a longitudinal cross-sectional view of a core back, a stator core, a rotor core, and a shaft shown in FIG. 51.

As shown in FIG. 52, the stator core 921 includes a plurality of stator teeth 921a that protrude toward the shaft 915 at regular intervals in a circumferential direction of the stator core 921. Distal surfaces of the stator teeth 921a are all positioned on the same circumferential plane. As shown in FIG. 51, a stator coil bobbin 922b made of an insulating resin material is attached to each stator tooth 921a. In addition, the stator coil 922 is formed by winding a conducting wire made of a conductive metallic material (in the twelfth embodiment, copper) around the stator coil bobbin 922b. The stator coil 922 is configured so as to have any of a U phase, a V phase, and a W phase and to generate a rotating magnetic field when supplied with currents having phases that differ from each other.

A rotor 930 (rotating part) is provided on an inner side of the stator 920. The rotor 930 has a rotor core 931 fixedly attached to the shaft 915. The rotor core 931 is configured so as to be integrally rotatable with the shaft 915 around the axis L of the shaft 915. An outer circumferential surface 915a of the shaft 915 and an inner circumferential surface of the rotor core 931 are in close contact with each other. Thus, the shaft 915 and the rotor core 931 are magnetically connected to each other. The rotor core 931 is formed by laminating a plurality of magnetic steel sheets formed from a soft magnetic material in an axial direction of the shaft 915. Thus, in the rotor core 931, a magnetic flux more readily flows in a radial direction and a circumferential direction of the rotor core 931 that are perpendicular to the axis L than in the axial direction of the shaft 915.

The length of the rotor core 931 in the axial direction of the shaft 915 is the same as the length of the stator core 921 in the axial direction of the shaft 915. The stator coil 922 has a coil end 922e that protrudes from an end surface of the stator teeth 921a in the axial direction of the shaft 915. Thus, both ends of the coil end 922e of the stator coil 922 in the axial direction of the shaft 915 protrude more outward than both ends of the rotor core 931. In addition, in the housing 911, a connecting wire area W (depicted by double-dashed lines in FIG. 51), through which a connecting wire (not shown) of the stator coil 922 of each phase passes, is provided closer to the first housing 913 than the coil end 922e of one end side (the side of the first housing 913).

As shown in FIG. 52, the rotor core 931 includes a plurality of rotor teeth 931a as magnetic salient poles that protrude outward in the radial direction at regular intervals in a circumferential direction of the rotor core 931. Distal surfaces of the rotor teeth 931a are all positioned on the same circumferential plane. A slight clearance is formed between the distal surfaces of the rotor teeth 931a and the distal surfaces of the stator teeth 921a. In addition, the rotor teeth 931a and the stator teeth 921a are magnetically connected to each other via the clearance.

As shown in FIG. 51, a first field pole 941 for generating a field magnetic flux is arranged closer to one end in the core back 912 than the stator 920 and the rotor 930. The first field pole 941 includes a first field core 942 serving as an annular field core, and a first field coil 943 and a second field coil 944 as field windings which are arranged between the first field core 942 and the stator 920 and the rotor 930. The first field core 942 is formed from a magnetic material, and in the twelfth embodiment, is formed from soft magnetic composites (SMC). The shaft 915 is inserted into the inner side of the first field core 942, and a slight clearance is formed between an inner circumferential surface 942g of the first field core 942 and the outer circumferential surface 915a of the shaft 915. The first field core 942 and the shaft 915 are magnetically connected to each other through the clearance.

Figure 53:
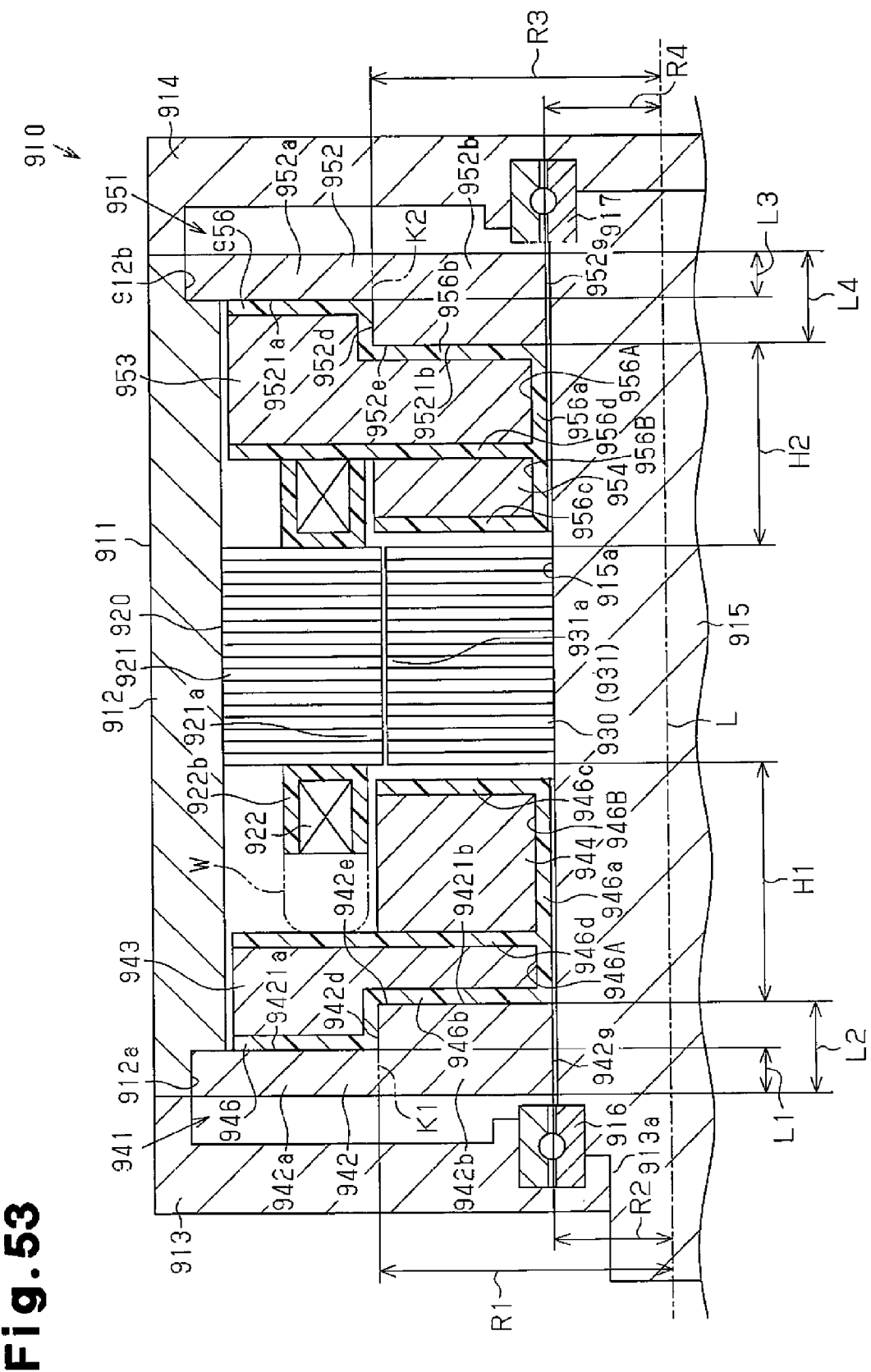
FIG. 53 is a partial side cross-sectional view of the rotary electric motor shown in FIG. 51.

As shown in FIG. 53, an end surface 942e of the first field core 942 at a side which a first field coil 943 and a second field coil 944 are arranged is given a stepped shape so that a thickness L1 of the first field core 942 at a side of an outer circumferential portion 942a is smaller than a thickness L2 on a side of an inner circumferential portion 942b. Specifically, on the end surface 942e of the first field core 942, a stepped portion 942d that links an end surface 9421a of the outer circumferential portion 942a and an end surface 9421b of the inner circumferential portion 942b to each other is formed between the outer circumferential portion 942a and the inner circumferential portion 942b around an entire circumference in a circumferential direction. The stepped portion 942d is formed so as to extend in an axial direction of the shaft 915. The first field core 942 of the twelfth embodiment is molded.

The cross-sectional area in a circumferential direction of a part of a border K1 between the outer circumferential portion 942a and the inner circumferential portion 942b in the first field core 942 (a thickness border in the first field core 942) is the same as the area of the inner circumferential surface 942g of the first field core 942. In other words, when "π" represents the ratio of a circle's circumference to its diameter, "R1" represents a length along a radial direction from the axis L of the shaft 915 to the border K1, and "R2" represents a length along the radial direction from the axis L of the shaft 915 to the inner circumferential surface 942g of the first field core 942, then thicknesses L1 and L2 and lengths R1 and R2 are set so as to satisfy a relationship expressed as "L1×2πR1=L2×2πR2".

The first field core 942 is fixed to the core back 912 by press-fitting an outer circumferential portion 942a of the first field core 942 into a press-fit recess 912a provided in a recessed manner at the open end of the core back 912. In a state where the first field core 942 is fixed to the core back 912, the outer circumferential portion 942a of the first field core 942 is in close contact with the core back 912. Thus, the first field core 942 and the core back 912 are magnetically connected to each other.

As shown in FIG. 51, a second field pole 951 for generating a field magnetic flux is arranged closer to the other end in the core back 912 than the stator 920 and the rotor 930. The second field pole 951 includes a second field core 952 serving as an annular field core. The second field pole 951 also includes a third field coil 953 and a fourth field coil 954 servings as field windings arranged between the second field core 952 and the stator 920 and the rotor 930. The second field core 952 is formed from a magnetic material, and in the twelfth embodiment, is formed from soft magnetic composites (SMC). The shaft 915 is inserted into the inner side of the second field core 952, and a slight clearance is formed between an inner circumferential surface 952g of the second field core 952 and the outer circumferential surface 915a of the shaft 915. In addition, the second field core 952 and the shaft 915 are magnetically connected to each other through the clearance.

As shown in FIG. 53, an end surface 952e of the second field core 952 on a side in which the third field coil 953 and the fourth field coil 954 are arranged is given a stepped shape so that a thickness L3 of the second field core 952 on a side of an outer circumferential portion 952a is smaller than a thickness L4 on a side of an inner circumferential portion 952b. Specifically, on the end surface 952e of the second field core 952, a stepped portion 952d that links an end surface 9521a of the outer circumferential portion 952a and an end surface 9521b of the inner circumferential portion 952b to each other is formed between the outer circumferential portion 952a and the inner circumferential portion 952b around an entire circumference in a circumferential direction. The stepped portion 952d is formed so as to extend in the axial direction of the shaft 915. Moreover, the second field core 952 of the twelfth embodiment is molded.

The cross-sectional area in a circumferential direction of a part of a border K2 between the outer circumferential portion 952a and the inner circumferential portion 952b in the second field core 952 (a thickness border in the second field core 952) is the same as the area of the inner circumferential surface 952g of the second field core 952. In other words, when "π" represents the ratio of a circle's circumference to its diameter, "R3" represents a length along a radial direction from the axis L of the shaft 915 to the border K2, and "R4" represents a length along the radial direction from the axis L of the shaft 915 to the inner circumferential surface 952g of the second field core 952, then thicknesses L3 and L4 and lengths R3 and R4 are set so as to satisfy a relationship expressed as "L3×2πR3=L4×2πR4".

The second field core 952 is fixed to the core back 912 by press-fitting an outer circumferential portion 952a of the second field core 952 into a press-fit recess 912b provided in a recessed manner at the other end opening portion of the core back 912. In a state where the second field core 952 is fixed to the core back 912, the outer circumferential portion 952a of the second field core 952 is in close contact with the core back 912. Thus, the second field core 952 and the core back 912 are magnetically connected to each other.

In the core back 912, a distance H1 from the end surface 9421b of the inner circumferential portion 942b of the first field core 942 to one end portion of the stator core 921 is longer than the distance H2 from the end surface 9521b of the inner circumferential portion 952b of the second field core 952 to the other end portion of the stator core 921 by an amount corresponding to the length of the connecting wire area W.

A first field coil bobbin 946 is fastened to an end surface 942e of the first field core 942. The first field coil bobbin 946 has a cylindrical first barrel portion 946a which extends in the axial direction of the shaft 915 from the end surface 9421b of the inner circumferential portion 942b of the first field core 942 to just before one end surface of the rotor core 931. In addition, the first field coil bobbin 946 includes one end with an annular flange portion 946b, which extends outward in the radial direction from one end opening of the first barrel portion 946a, and another end with an annular flange portion 946c, which extends outward in the radial direction from the other end opening portion of the first barrel portion 946a to just before a surface of the stator coil bobbin 922b on a side of the shaft 915. Further, the first field coil bobbin 946 has an annular partitioning flange portion 946d, which is positioned between the flange portion 946b and the flange portion 946c and which extends outward in the radial direction from an outer circumferential surface of the first barrel portion 946a.

The flange portion 946b is formed so as to extend along the end surface 9421b of the inner circumferential portion 942b of the first field core 942, bend along an outer circumferential surface of the stepped portion 942d, and extend along the end surface 9421a of the outer circumferential portion 942a of the first field core 942. In addition, part of the first barrel portion 946a, the flange portion 946b, and the partitioning flange portion 946d form a first wound portion 946A. Further, part of the first barrel portion 946a, the flange portion 946c, and the partitioning flange portion 946d form a second wound portion 946B.

The first field coil 943 is formed by winding the first wound portion 946A with a conducting wire made of a conductive metallic material (in the twelfth embodiment, copper) into a plurality of windings around the axis L of the shaft 915. In a state in which the first field coil 943 is wound around the first wound portion 946A, part of the first field coil 943 is arranged closer to the end surface 9421a of the outer circumferential portion 942a than the end surface 9421b of the inner circumferential portion 942b of the first field core 942. The second field coil 944 is formed by winding the second wound portion 946B with a conducting wire made of a conductive metallic material (in the twelfth embodiment, copper) into a plurality of windings around the axis L of the shaft 915.

A second field coil bobbin 956 is fastened to an end surface 952e of the second field core 952. The second field coil bobbin 956 has a cylindrical second barrel portion 956a which extends in the axial direction of the shaft 915 from the end surface 9521b of the inner circumferential portion 952b of the second field core 952 to just before the other end surface of the rotor core 931. In addition, the second field coil bobbin 956 includes one end with an annular flange portion 956b, which extends outward in the radial direction from one end opening of the second barrel portion 956a, and another end with an annular flange portion 956c, which extends outward in the radial direction from the other end opening of the second barrel portion 956a to just before a surface of the stator coil bobbin 922b on a side of the shaft 915. Further, the second field coil bobbin 956 has an annular partitioning flange portion 956d, which is positioned between the flange portion 956b and the flange portion 956c and which extends outward in the radial direction from an outer circumferential surface of the second barrel portion 956a.

The flange portion 956b is formed so as to extend along the end surface 9521b of the inner circumferential portion 952b of the second field core 952, to bend along an outer circumferential surface of the stepped portion 952d, and to extend along the end surface 9521a of the outer circumferential portion 952a of the second field core 952. In addition, a part of the second barrel portion 956a, the flange portion 956b, and the partitioning flange portion 956d form a third wound portion 956A. Furthermore, a part of the second barrel portion 956a, the flange portion 956c, and the partitioning flange portion 956d form a fourth wound portion 956B.

The third field coil 953 is formed by winding the third wound portion 956A with a conducting wire made of a conductive metallic material (in the twelfth embodiment, copper) into a plurality of windings around the axis L of the shaft 915. In a state in which the third field coil 953 is wound around the third wound portion 956A, part of the third field coil 953 is arranged closer to the end surface 9521a of the outer circumferential portion 952a than the end surface 9521b of the inner circumferential portion 952b of the second field core 952. The fourth field coil 954 is formed by winding the fourth wound portion 956B with a conducting wire made of a conductive metallic material (in the twelfth embodiment, copper) into a plurality of windings around the axis L of the shaft 915.

The operation of the motor 910 of the twelfth embodiment will now be described focusing on a magnetic path (a flow of field magnetic flux) that is formed when a current is supplied to the field coils 943, 944, 953, and 954. Moreover, a terminal block (not shown) for supplying a current to the field coils 943, 944, 953, and 954 is provided on the outer circumferential surface of the housing 911. Starting ends of the conducting wires of the field coils 943, 944, 953, and 954 are drawn to the outside of the housing 911 and electrically connected to the terminal block.

As shown in FIG. 51, a field magnetic flux generated on the first field core 942 when a current is supplied to the field coils 943 and 944 flows toward the shaft 915 as indicated by an arrow Y1. The field magnetic flux then passes through a magnetic void (gap) and flows to the shaft 915. Subsequently, as indicated by an arrow Y2, the field magnetic flux flows inside the shaft 915 in the axial direction of the shaft 915, and as indicated by an arrow Y3, flows in a direction perpendicular to the axis L of the shaft 915, flows through the rotor core 931 (the rotor teeth 931a) toward an outer diameter side, and passes through the stator core 921 (the stator teeth 921a). Furthermore, as indicated by an arrow Y4, the field magnetic flux is guided through the core back 912 toward the first field pole 941.

In this case, a cross-sectional area in a circumferential direction of a part of a border K1 between the outer circumferential portion 942a and the inner circumferential portion 942b in the first field core 942 is the same as the area of the inner circumferential surface 942g of the first field core 942. Accordingly, for example, since a magnetic flux flows more readily than when the cross-sectional area in the circumferential direction of the border K1 between the outer circumferential portion 942a and the inner circumferential portion 942b in the first field core 942 is smaller than the area of the inner circumferential surface 942g of the first field core 942, magnetic saturation of the first field core 942 is suppressed and, in turn, a decline in the torque of the motor 910 is suppressed.

In this manner, a field magnetic path formed by the first field core 942, the shaft 915, the rotor 930, the stator 920, and the core back 912 is formed. Thus, in the twelfth embodiment, the core back 912 and the shaft 915 function as magnetic path forming members that form a field magnetic path together with the first field core 942, the rotor 930, and the stator 920.

In the same manner, a field magnetic flux generated on the second field core 952 when a current is supplied to the field coils 953 and 954 flows toward the shaft 915 as indicated by an arrow Y11. The field magnetic flux then passes through a magnetic void (gap) and flows to the shaft 915. Subsequently, as indicated by an arrow Y12, the field magnetic flux flows inside the shaft 915 in the axial direction of the shaft 915, and as indicated by an arrow Y13, flows in a direction perpendicular to the axis L of the shaft 915, flows through the rotor core 931 (the rotor teeth 931a) toward an outer diameter side, and passes through the stator core 921 (the stator teeth 921a). Furthermore, as indicated by an arrow Y14, the field magnetic flux is guided through the core back 912 toward the second field pole 951.

In this case, the cross-sectional area in a circumferential direction of a part of a border K2 between the outer circumferential portion 952a and the inner circumferential portion 952b in the second field core 952 is the same as the area of the inner circumferential surface 952g of the second field core 952. Accordingly, for example, since a magnetic flux flows more readily than when the cross-sectional area in the circumferential direction of the border K2 between the outer circumferential portion 952a and the inner circumferential portion 952b in the second field core 952 is smaller than the surface area of the inner circumferential surface 952g of the second field core 952, a magnetic saturation of the second field core 952 is suppressed and, in turn, a decline in the torque of the motor 910 is suppressed.

In this manner, a field magnetic path formed by the second field core 952, the shaft 915, the rotor 930, the stator 920, and the core back 912 is formed. Thus, in the twelfth embodiment, the core back 912 and the shaft 915 function as magnetic path forming members that form a field magnetic path together with the second field core 952, the rotor 930, and the stator 920.

In this manner, with the motor 910 of the twelfth embodiment, an annular (loop-shaped) magnetic path (a flow of field magnetic flux) is formed, the rotor teeth 931a of the rotor 930 attain a polarity of an N-pole due to the field magnetic flux, and the rotor teeth 931a (the field magnetic flux) attain the same function as a permanent magnet arranged on a rotor in a permanent magnet synchronous motor.

In addition, with the motor 910 of the twelfth embodiment, by increasing the amount of current supplied to the field coils 943, 944, 953, and 954, the field magnetic flux can be increased and a greater torque can be produced. Further, with the motor 910 of the twelfth embodiment, by reducing an amount of current supplied to the field coils 943, 944, 953, and 954 during high-speed rotation, the field magnetic flux can be reduced and a maximum rotation speed can be increased.

Part of the field coils 943 and 953 among the field coils 943, 944, 953, and 954 necessary for generating a field magnetic flux on the first field core 942 and the second field core 952 is arranged closer to the end surfaces 9421a and 9521a of the outer circumferential portions 942a and 952a than the end surfaces 9421b and 9521b of the inner circumferential portions 942b and 952b of the field cores 942 and 952. In other words, by forming the end surfaces 942e and 952e of the field cores 942 and 952 in a stepped shape, arrangement spaces for the field coils 943 and 953 increases between the field cores 942 and 952 and the stator 920 and the rotor 930. Accordingly, since part of the field coils 943 and 953 can be arranged by utilizing the increased arrangement space, the field cores 942 and 952 can be brought as close as possible to the stator 920 and the rotor 930. As a result, the motor 910 in the axial direction of the shaft 915 can be downsized.

The twelfth embodiment has the advantages described below.

(46) End surfaces 942e and 952e of the field cores 942 and 952 on a side which the field coils 943, 944, 953, and 954 are arranged have a stepped shape so that thicknesses L1 and L3 of the first field core 942 and the second field core 952 on the side of the outer circumferential portions 942a and 952a are smaller than thicknesses L2 and L4 on the side of the inner circumferential portions 942b and 952b. Thus, compared to when the end surfaces 942e and 952e of the field cores 942 and 952 are not stepped, arrangement spaces for the field coils 943, 944, 953, and 954 can be increased between the field cores 942 and 952 and the stator 920 and the rotor 930. As a result, since part of the field coils 943 and 953 can be arranged in the increased arrangement space, the field cores 942 and 952 can be brought closer to the stator 920 and the rotor 930 accordingly. Thus, from the perspective of the entire motor 910, the shaft 915 can be downsized in the axial direction.

(47) Cross-sectional areas in the circumferential direction of the parts of the borders K1 and K2 between the outer circumferential portions 942a and 952a and the inner circumferential portions 942b and 952b in the field cores 942 and 952 are the same as the surface areas of the inner circumferential surfaces 942g and 952g of the field cores 942 and 952. Accordingly, for example, since a magnetic flux flows more readily than when the cross-sectional areas in the circumferential direction of the parts of the borders K1 and K2 between the outer circumferential portions 942a and 952a and the inner circumferential portions 942b and 952b in the field cores 942 and 952 are smaller than the areas of the inner circumferential surfaces 942g and 952g of the field cores 942 and 952, magnetic saturation of the field cores 942 and 952 is suppressed. As a result, a decline in the torque of the motor 910 can be suppressed. Further, a largest possible arrangement space for arranging part of the field coils 943 and 953 can be formed on the end surfaces 942e and 952e of the field cores 942 and 952.

(48) The end surfaces 942e and 952e of the field cores 942 and 952 have a stepped shape. The shapes of the end surfaces 942e and 952e of the field cores 942 and 952 can be fabricated more easily than when, for example, the end surfaces 942e and 952e of the field cores 942 and 952 are given a tapered shape in order to increase the arrangement spaces for the field coils 943, 944, 953, and 954 between the field cores 942 and 952 and the stator 920 and the rotor 930.

A thirteenth embodiment of a motor (rotary electric motor) serving as a rotary electric machine according to the present invention will now be described with reference to FIG. 54. In the thirteenth embodiment, components that are the same as the twelfth embodiment will be denoted by the same reference characters and will not be described in detail.

Figure 54:
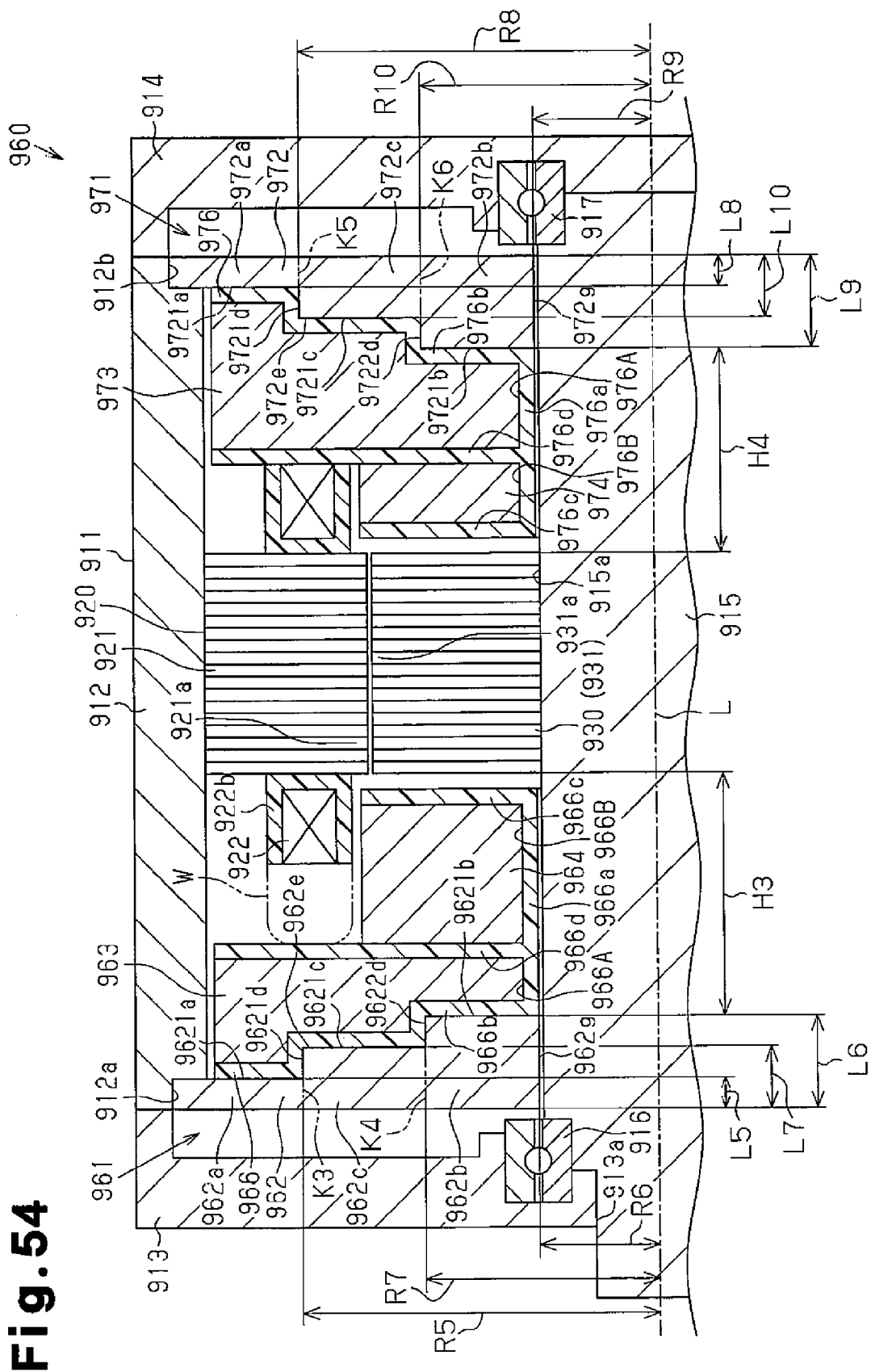
FIG. 54 is a partial side cross-sectional view of a rotary electric motor according to a thirteenth embodiment of the present invention.

As shown in FIG. 54, in a motor 960, a third field pole 961 for generating a field magnetic flux is arranged closer to one end in a core back 912 than a stator 920 and a rotor 930. The third field pole 961 includes a third field core 962 serving as a field core. The third field pole 961 also includes a fifth field coil 963 and a sixth field coil 964 serving as field windings. The third field core 962 is formed from a magnetic material, and in the thirteenth embodiment, is formed from soft magnetic composites (SMC). A shaft 915 is inserted into the inner side of the third field core 962, and a slight clearance is formed between an inner circumferential surface 962g of the third field core 962 and an outer circumferential surface 915a of the shaft 915. In addition, the third field core 962 and the shaft 915 are magnetically connected to each other through the clearance.

An end surface 962e of the third field core 962 at a side where the fifth field coil 963 and the sixth field coil 964 are arranged has a stepped shape. Specifically, in the third field core 962, a thickness L5 at a side of an outer circumferential portion 962a thereof is smaller than a thickness L6 at a side of an inner circumferential portion 962b, and a thickness L7 of a central portion 962c of the third field core 962 is greater than the thickness L5 at the side of the outer circumferential portion 962a and smaller than the thickness L6 at the side of the inner circumferential portion 962b.

On the end surface 962e of the third field core 962, a first stepped portion 9621d that links an end surface 9621a of the outer circumferential portion 962a and an end surface 9621c of the central portion 962c to each other is formed between the outer circumferential portion 962a and the central portion 962c around an entire circumference in a circumferential direction. The first stepped portion 9621d is formed so as to extend in the axial direction of the shaft 915. In addition, on the end surface 962e of the third field core 962, a second stepped portion 9622d that links the end surface 9621c of the central portion 962c and an end surface 9621b of the inner circumferential portion 962b to each other is formed between the central portion 962c and the inner circumferential portion 962b around an entire circumference in a circumferential direction. The second stepped portion 9622d is formed so as to extend in the axial direction of the shaft 915.

A cross-sectional area in a circumferential direction of a part of a border K3 between the outer circumferential portion 962a and the central portion 962c in the third field core 962 (a thickness border in the third field core 962) is the same as a surface area of the inner circumferential surface 962g of the third field core 962. In addition, a cross-sectional area in a circumferential direction of a part of a border K4 between the central portion 962c and the inner circumferential portion 962b in the third field core 962 (a thickness border in the third field core 962) is the same as a surface area of the inner circumferential surface 962g of the third field core 962. In other words, if "π" represents the ratio of a circle's circumference to its diameter, "R5" represents the length along a radial direction from the axis L of the shaft 915 to the border K3, "R6" represents the length along the radial direction from the axis L of the shaft 915 to the inner circumferential surface 962g of the third field core 962, and "R7" represents the length along a radial direction from the axis L of the shaft 915 to the border K4, then thicknesses L5, L6, and L7 and lengths R5, R6, and R7 are set so as to satisfy a relationship expressed as "L5×2πR5=L6×2πR6=L7×2πR7".

A fourth field pole 971 for generating a field magnetic flux is arranged closer to the other end in the core back 912 than the stator 920 and the rotor 930. The fourth field pole 971 includes a fourth field core 972 serving as a field core. The fourth field pole 971 also includes a seventh field coil 973 and an eighth field coil 974 serving as field windings. The fourth field core 972 is formed from a magnetic material, and in the thirteenth embodiment, is formed from soft magnetic composites (SMC). The shaft 915 is inserted into the inner side of the fourth field core 972, and a slight clearance is formed between an inner circumferential surface 972g of the fourth field core 972 and the outer circumferential surface 915a of the shaft 915. In addition, the fourth field core 972 and the shaft 915 are magnetically connected to each other through the clearance.

An end surface 972e of the fourth field core 972 on a side where the seventh field coil 973 and the eighth field coil 974 are arranged has a stepped shape. Specifically, in the fourth field core 972, a thickness L8 at a side of an outer circumferential portion 972a thereof is smaller than a thickness L9 at a side of an inner circumferential portion 972b, and a thickness L10 of a central portion 972c of the fourth field core 972 is greater than the thickness L8 on the side of the outer circumferential portion 972a and smaller than the thickness L9 at the side of the inner circumferential portion 972b.

At the end surface 972e of the fourth field core 972, a first stepped portion 9721d that links an end surface 9721a of the outer circumferential portion 972a and an end surface 9721c of the central portion 972c to each other is formed between the outer circumferential portion 972a and the central portion 972c around an entire circumference in a circumferential direction. The first stepped portion 9721d is formed so as to extend in the axial direction of the shaft 915. In addition, at the end surface 972e of the fourth field core 972, a second stepped portion 9722d that links the end surface 9721c of the central portion 972c and an end surface 9721b of the inner circumferential portion 972b to each other is formed between the central portion 972c and the inner circumferential portion 972b around an entire circumference in a circumferential direction. The second stepped portion 9722d is formed so as to extend in the axial direction of the shaft 915.

The cross-sectional area in a circumferential direction of a part of a border K5 between the outer circumferential portion 972a and the central portion 972c in the fourth field core 972 (a thickness border in the fourth field core 972) is set the same as the surface area of the inner circumferential surface 972g of the fourth field core 972. In addition, the cross-sectional area in a circumferential direction of a part of a border K6 between the central portion 972c and the inner circumferential portion 972b in the fourth field core 972 (a thickness border in the fourth field core 972) is set the same as the surface area of the inner circumferential surface 972g of the fourth field core 972. In other words, if "π" represents the ratio of a circle's circumference to its diameter, "R8" represents a length along a radial direction from the axis L of the shaft 915 to the border K5, "R9" represents a length along the radial direction from the axis L of the shaft 915 to the inner circumferential surface 972g of the fourth field core 972, and "R10" represents a length along the radial direction from the axis L of the shaft 915 to the border K6, then thicknesses L8, L9, and L10 and lengths R8, R9, and R10 are set so as to satisfy a relationship expressed as "L8×πR8=L9×2π9=L10×2πR10".

In the core back 912, a distance H3 from the end surface 9621b of the inner circumferential portion 962b of the third field core 962 to one end portion of the stator core 921 is longer than a distance H4 from the end surface 9721b of the inner circumferential portion 972b of the fourth field core 972 to the other end portion of the stator core 921 by an amount corresponding to the length of the connecting wire area W.

A third field coil bobbin 966 is fastened to the end surface 962e of the third field core 962. The third field coil bobbin 966 has a cylindrical third barrel portion 966a that extends in the axial direction of the shaft 915 from the end surface 9621b of the inner circumferential portion 962b of the third field core 962 to just before one end surface of the rotor core 931. In addition, the third field coil bobbin 966 includes one end with an annular flange portion 966b, which extends outward in the radial direction from one end opening portion of the third barrel portion 966a, and another end with a flange portion 966c, which extends outward in the radial direction from the other end opening portion of the third barrel portion 966a to just before a surface of the stator coil bobbin 922b on a side of the shaft 915. Further, the third field coil bobbin 966 has an annular partitioning flange portion 966d, which is positioned between the flange portion 966b and the flange portion 966c and which extends outward in the radial direction from an outer circumferential surface of the third barrel portion 966a.

The flange portion 966b is formed so as to extend along the end surface 9621b of the inner circumferential portion 962b of the third field core 962, bend along an outer circumferential surface of the second stepped portion 9622d, and extend along the end surface 9621c of the central portion 962c of the third field core 962. Furthermore, the flange portion 966b is formed so as to bend along the outer circumferential surface of the first stepped portion 9621d, and extend toward the end surface 9621a of the outer circumferential portion 962a of the third field core 962.

In addition, part of the third barrel portion 966a, the flange portion 966b, and the partitioning flange portion 966d form a fifth wound portion 966A. Furthermore, part of the third barrel portion 966a, the flange portion 966c, and the partitioning flange portion 966d form a sixth wound portion 966B.

The fifth field coil 963 is formed by winding the fifth wound portion 966A with a conducting wire made of a conductive metallic material (in the thirteenth embodiment, copper) into a plurality of windings around the axis L of the shaft 915. In a state in which the fifth field coil 963 is wound around the fifth wound portion 966A, part of the fifth field coil 963 is arranged closer to the end surface 9621c of the central portion 962c and to the end surface 9621a of the outer circumferential portion 962a than the end surface 9621b of the inner circumferential portion 962b of the third field core 962. The sixth field coil 964 is formed by winding the sixth wound portion 966B with a conducting wire made of a conductive metallic material (in the thirteenth embodiment, copper) into a plurality of windings around the axis L of the shaft 915.

A fourth field coil bobbin 976 is fastened to an end surface 972e of the fourth field core 972. The fourth field coil bobbin 976 has a cylindrical fourth barrel portion 976a, which extends in the axial direction of the shaft 915 from the end surface 9721b of the inner circumferential portion 972b of the fourth field core 972 to just before the other end surface of the rotor core 931. In addition, the fourth field coil bobbin 976 includes one end with an annular flange portion 976b, which extends outward in the radial direction from one end opening portion of the fourth barrel portion 976a, and another end with an annular flange portion 976c, which extends outward in the radial direction from the other end opening portion of the fourth barrel portion 976a to just before a surface of the stator coil bobbin 922b on a side of the shaft 915. Further, the fourth field coil bobbin 976 has an annular partitioning flange portion 976d, which is positioned between the flange portion 976b and the flange portion 976c and which extends outward in the radial direction from an outer circumferential surface of the fourth barrel portion 976a.

The flange portion 976b is formed so as to extend along the end surface 9721b of the inner circumferential portion 972b of the fourth field core 972, bend along an outer circumferential surface of the second stepped portion 9722d, and extend along the end surface 9721c of the central portion 972c of the fourth field core 972. Furthermore, the flange portion 976b is formed so as to bend along the outer circumferential surface of the first stepped portion 9721d and extend toward the end surface 9721a of the outer circumferential portion 972a of the fourth field core 972.

In addition, a part of the fourth barrel portion 976a, the flange portion 976b, and the partitioning flange portion 976d form a seventh wound portion 976A. Furthermore, a part of the fourth barrel portion 976a, the flange portion 976c, and the partitioning flange portion 976d form an eighth wound portion 976B.

The seventh field coil 973 is formed by winding the seventh wound portion 976A with a conducting wire made of a conductive metallic material (in the thirteenth embodiment, copper) into a plurality of windings around the axis L of the shaft 915. In a state in which the seventh field coil 973 is wound around the seventh wound portion 976A, a part of the seventh field coil 973 is arranged closer to the end surface 9721c of the central portion 972c and to the end surface 9721a of the outer circumferential portion 972a than the end surface 9721b of the inner circumferential portion 972b of the fourth field core 972. The eighth field coil 974 is formed by winding the eighth wound portion 976B with a conducting wire made of a conductive metallic material (in the thirteenth embodiment, copper) into a plurality of windings around the axis L of the shaft 915.

Accordingly, an arrangement space for the field coils 963, 964, 973, and 974 between the field cores 962 and 972 and the stator 920 and the rotor 930 can be further increased.

The twelfth and thirteenth embodiments may be modified as described below.

Figure 55:
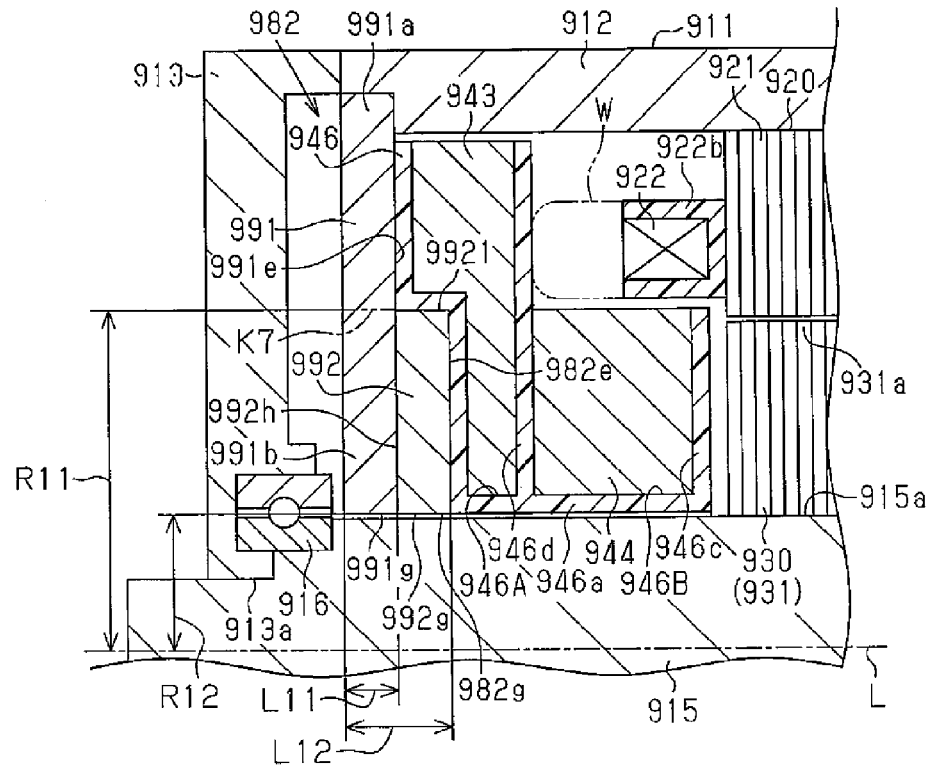
FIG. 55 is a partial side cross-sectional view of a rotary electric motor according to other examples of the twelfth and thirteenth embodiments.

In the twelfth and thirteenth embodiments, the field cores 942, 952, 962, and 972 may be formed by overlapping, in the axial direction of the shaft 915, at least two or more annular field core forming bodies having different lengths in a radial direction. For example, as shown in FIG. 55, a fifth field core 982 is formed by overlapping a first field core forming body 991 and a second field core forming body 992 which have annular shapes in the axial direction of the shaft 915. The first field core forming body 991 and the second field core forming body 992 are formed from a magnetic material and are formed from soft magnetic composites (SMC).

The first field core forming body 991 and the second field core forming body 992 have the same inner diameter. In addition, an outer diameter of the first field core forming body 991 is larger than an outer diameter of the second field core forming body 992.

The fifth field core 982 is formed by joining, with an adhesive, part of an end surface 991e of the first field core forming body 991 at a side where field coils 943 and 944 are arranged and an end surface 992h of the second field core forming body 992 at a side opposite to a side where the field coils 943 and 944 are arranged.

An inner circumferential surface 991g of the first field core forming body 991 and an inner circumferential surface 992g of the second field core forming body 992 are positioned on the same circumferential plane. The inner circumferential surface 991g of the first field core forming body 991 and the inner circumferential surface 992g of the second field core forming body 992 form an inner circumferential surface 982g of the fifth field core 982. In addition, an outer circumferential portion 991a of the first field core forming body 991 protrudes more outward in a radial direction than an outer circumferential surface 992l of the second field core forming body 992. In other words, the outer circumferential portion 991a of the first field core forming body 991 forms an outer circumferential portion of the fifth field core 982, and the inner circumferential portion 991b of the first field core forming body 991 and the second field core forming body 992 form an inner circumferential portion of the fifth field core 982. As a result, an end surface 982e of the fifth field core 982 at the side where the field coils 943 and 944 are arranged has a stepped shape such that a thickness L11 on a side of the outer circumferential portion (a thickness of the first field core forming body 991) is smaller than a thickness L12 at a side of the inner circumferential portion (the sum of the thickness of the first field core forming body 991 and a thickness of the second field core forming body 992).

The cross-sectional area in a circumferential direction of part of a border K7 between the outer circumferential portion and the inner circumferential portion in the fifth field core 982 (a thickness border in the fifth field core 982) is the same as a surface area of the inner circumferential surface 982g of the fifth field core 982. In other words, if "π" represents the ratio of a circle's circumference to its diameter, "R11" represents a length along a radial direction from the axis L of the shaft 915 to the border K7, and "R12" represents a length along the radial direction from the axis L of the shaft 915 to the inner circumferential surface 982g of the fifth field core 982, then thicknesses L11 and L12 and lengths R11 and R12 are set so as to satisfy a relationship expressed as "L11×2πR11=L12×2πR12".

In this manner, since the end surface 982e of the fifth field core 982 can be given a stepped shape by simply overlapping the first field core forming body 991 and the second field core forming body 992 in the axial direction of the shaft 915, fabrication can be simplified.

Figure 56:
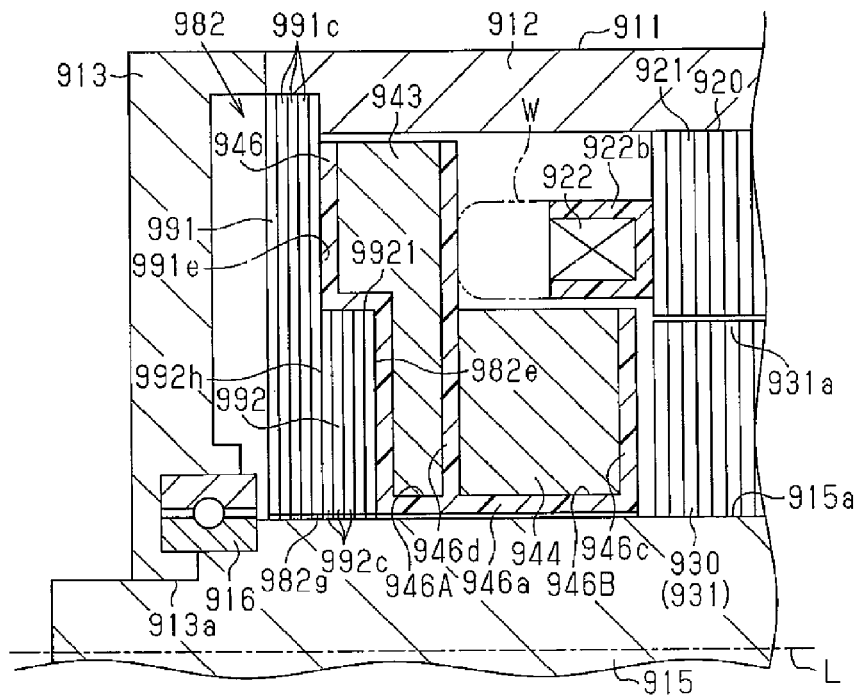
FIG. 56 is a partial side cross-sectional view of a rotary electric motor according to other examples of the twelfth and thirteenth embodiments.

In addition, as shown in FIG. 56, the first field core forming body 991 and the second field core forming body 992 may be formed by laminating a plurality of magnetic steel sheets 991c and 992c in the axial direction of the shaft 915. Accordingly, for example, magnetic properties can be enhanced compared to when the field core forming bodies 991 and 992 are formed from soft magnetic composites.

In the twelfth embodiment, cross-sectional areas in the circumferential direction of the parts of the borders K1 and K2 between the outer circumferential portions 942a and 952a and the inner circumferential portions 942b and 952b in the field cores 942 and 952 may be larger than the surface areas of the inner circumferential surfaces 942g and 952g of the field cores 942 and 952. Accordingly, since a magnetic flux can flow more readily, magnetic saturation of the field cores 942 and 952 can be further suppressed, and a decline in the torque of the motor 910 can be further suppressed.

In the thirteenth embodiment, cross-sectional areas in the circumferential direction of the parts of the borders K3 and K5 between the outer circumferential portions 962a and 972a and the central portions 962c and 972c in the field cores 962 and 972 may be larger than the surface areas of the inner circumferential surfaces 962g and 972g of the field cores 962 and 972. In addition, the cross-sectional areas in the circumferential direction of the parts of the borders K4 and K6 between the central portions 962c and 972c and the inner circumferential portions 962b and 972b in the field cores 962 and 972 may be larger than the surface areas of the inner circumferential surfaces 962g and 972g of the field cores 962 and 972. Accordingly, since a magnetic flux can flow more readily, magnetic saturation of the field cores 962 and 972 can be further suppressed, and a decline in the torque of the motor 960 can be further suppressed.

In the twelfth and thirteenth embodiments, while the core back 912 is formed from soft magnetic composites (SMC), the core back 912 is not limited in such a manner and may be formed by a magnetic body such as an iron mass.

In the twelfth and thirteenth embodiments, while the field cores 942, 952, 962, and 972 are formed from soft magnetic composites (SMC), the field cores 942, 952, 962, and 972 are not limited in such a manner and may be formed by a magnetic body such as an iron mass.

In the twelfth and thirteenth embodiments, while the rotor core 931 is formed by laminating a plurality of magnetic steel sheets, the rotor core 931 is not limited in such a manner and may be formed by a magnetic body such as soft magnetic composites (SMC) or an iron mass.

In the twelfth and thirteenth embodiments, only the field poles 941 and 961 or only the field poles 951 and 971 may be provided. In other words, field poles may be provided only on one side in the direction of the axis L.

In the twelfth and thirteenth embodiments, while the shaft 915 is used as a magnetic path forming member and a field magnetic path is formed through the shaft 915, field magnetic path formation is not limited in such a manner and a field magnetic path may be formed without the involvement of the shaft 915. For example, a magnetic body with a lower magnetic resistance than the shaft 915 (for example, a magnetic body such as soft magnetic composites (SMC) or an iron mass) may be provided as a magnetic path forming member on an outer circumference of the shaft 915 to form a field magnetic path.

In the twelfth and thirteenth embodiments, the number of the stator teeth 921a of the stator 920 may be changed as required.

In the twelfth and thirteenth embodiments, the number of the rotor teeth 931a of the rotor 930 may be changed as required.

In the twelfth and thirteenth embodiments, while the rotor teeth 931a as salient pole sections have convex shapes, the rotor teeth 931a are not limited to this structure and need only have saliency. For example, the rotor may have an overall cylindrical shape by arranging only the distal ends of the rotor teeth to be coupled to adjacent rotor teeth or by filling the recesses between the rotor teeth with a non-magnetic body.

In the twelfth and thirteenth embodiments, the field poles 941, 951, 961, and 971 need only have field coils that generate a necessary field. Thus, for example, the field coils 944, 954, 964, and 974 may be eliminated.

In the twelfth and thirteenth embodiments, the field coil bobbins 946, 956, 966, and 976 may be eliminated. In this case, a molded field coil is directly fastened to the field cores 942, 952, 962, and 972. Furthermore, when a coating of the field coil provides sufficient insulation, the field coil may be directly wound around the field cores 942, 952, 962, and 972.

In the twelfth and thirteenth embodiments, the insulation of the stator coil 922 is not limited to the stator coil bobbin 922*b*. For example, an insulating paper may be used. When a coating of the coil provides sufficient insulation, the coil may be directly wound around the stator teeth 921*a*.

In the twelfth and thirteenth embodiments, the number of steps formed on the end surfaces 942*e*, 952*e*, 962*e*, and 972*e* of the field cores 942, 952, 962, and 972 is not specifically limited.

In the twelfth and thirteenth embodiments, while the bearings 916 and 917 are arranged in the first housing 913 and the second housing 914, the bearings 916 and 917 may be arranged at other positions as long as such positions do not obstruct the field magnetic flux.

In the twelfth and thirteenth embodiments, while only one end of the shaft 915 protrudes outside the housing 911, the other end may also protrude outside the housing 911.

In the twelfth and thirteenth embodiments, while the field cores 942, 952, 962, and 972 are fixed to the core back 912 by being press-fitted into press-fit recesses 912*a* and 912*b* provided in a recessed manner at the opening portion of the core back 912, the field cores 942, 952, 962, and 972 are not limited to this structure and the core back 912 and the field cores 942, 952, 962, and 972 need only be magnetically connected to each other.

While the present invention has been embodied in the motor 910 (a rotary electric motor), the present invention may alternatively be embodied in a generator.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A rotary electric machine comprising:
a rotor core fixed to a rotary shaft, which includes a magnetic body that forms a magnetic path, wherein the rotor core includes magnetic salient poles;
a stator including teeth and stator windings respectively wound around the teeth by concentrated winding, wherein each of the stator windings has two winding ends, and a slot is formed between adjacent ones of the teeth in a circumferential direction;
a field yoke that magnetically connects the stator and the magnetic body; and
a field winding located in proximity to at least one of the winding ends of the stator winding in an axial direction of the rotary shaft,
wherein:
the field winding generates a magnetic pole on the magnetic salient poles when energized,
the stator is cylindrical and arranged outward in a radial direction from the rotor core,
the field yoke is arranged around the stator,
the magnetic salient poles and the teeth are arranged rotationally symmetrical about an axis of the rotary shaft,
the stator winding has a phase arrangement set rotationally symmetric about the axis of the rotary shaft,
the stator winding is excited by a three-phase alternating current,
when Pn represents the number of the magnetic salient poles and Ps represents the number of the slots, Pn and Ps have a common divisor that is a value other than 1, and the number of the magnetic salient poles Pn and the number of the slots Ps are set so that Pn:Ps satisfies 4:9 or 5:12.

2. The rotary electric machine according to claim 1, wherein the rotary shaft functions as the magnetic body.

3. The rotary electric machine according to claim 1, wherein the field yoke includes a plurality of arm portions radially extending from a location in proximity to the magnetic body, and the field winding is wound around each of the arm portions.

4. The rotary electric machine according to claim 1, wherein
the magnetic body is a first magnetic body,
the stator includes a second magnetic body that extends in the axial direction of the rotary shaft,
the field yoke includes a field pole having a plurality of third magnetic bodies,
the field winding is wound around each of the plurality of third magnetic bodies,
when the field winding is energized, the first magnetic body, the magnetic salient poles, the second magnetic body, and the third magnetic bodies form a magnetic path, and
the third magnetic bodies are arranged so that a space is formed between adjacent ones of the third magnetic bodies.

5. The rotary electric machine according to claim 4, wherein the third magnetic bodies radially extend from the rotary shaft, and each of the third magnetic bodies includes an open outer end in a radial direction.

6. The rotary electric machine according to claim 4, wherein
the stator winding is arranged in the stator in proximity to a surface that faces the rotor core, and
each of the third magnetic bodies includes a proximal portion facing and extending toward the rotor core, and the field winding is wound around the proximal portion.

7. The rotary electric machine according to claim 6, wherein
each of the plurality of third magnetic bodies is formed by laminating a plurality of steel sheets, and
each of the steel sheets extends so as to magnetically couple the first magnetic body and the second magnetic body.

8. The rotary electric machine according to claim 4, wherein
each of the third magnetic bodies includes a gap surface facing an outer circumferential surface of the rotary shaft, and
each of the third magnetic bodies is magnetically coupled to the first magnetic body through the gap surface.

9. The rotary electric machine according to claim 4, wherein
the field pole is one of a pair of field poles arranged at opposite axial ends of the rotary shaft, and
each of the field windings is supplied with current so that field windings form magnetic paths oriented to face each other.

10. The rotary electric machine according to claim 4, wherein each of the third magnetic bodies extend in a direction that intersects the axis of the rotary shaft.

11. The rotary electric machine according to claim 1, wherein
the magnetic body is a first magnetic body,
the stator includes a second magnetic body that extends in the axial direction of the rotary shaft,
the field yoke includes a field pole having a third magnetic body and the field winding,
when the field winding is energized, the first magnetic body, the magnetic salient pole, the second magnetic body, and the third magnetic body form a magnetic path, and
the third magnetic body has a gap surface that faces an outer circumferential surface of the rotary shaft.

12. The rotary electric machine according to claim 1, wherein
the stator is arranged outward in a radial direction from the rotor core,
the field yoke includes an annular field core through which the rotary shaft is inserted,
the field core includes an inner circumferential surface that faces an outer circumferential surface of the rotary shaft, a plurality of magnetic path portions that extend in a radial direction of the field core, and through holes that extend in the axial direction of the rotary shaft,
the field winding is arranged on an end surface of the field core in proximity to the rotor core,
when the field winding is energized, the field yoke, the rotor core, the stator, and the rotary shaft form a magnetic path, and
the through holes are formed so that a sum of cross-sectional areas of the magnetic path portions along a circumferential direction of the field core is greater than or equal to an area of the inner circumferential surface of the field core.

13. The rotary electric machine according to claim 12, wherein the plurality of magnetic path portions include a plurality of arm portions that extend in the radial direction of the field core, and each of the through holes is formed between adjacent ones of the arm portions.

14. The rotary electric machine according to claim 13, wherein
the end surface of the field core in proximity to the rotor core has a stepped shape so that an outer circumferential side of the field core is thinner than an inner circumferential side of the field core.

15. The rotary electric machine according to claim 13, wherein
when L represents a length of an arc that passes through each of the arm portions on a concentric circle of which center lies along the axis of the rotary shaft, n represents the number of the arm portions, d represents an inner diameter of the inner circumferential surface of the field core, $\pi$ represents the ratio of a circle's circumference to its diameter, t1 represents a thickness of each of the arm portions, and t2 represents a thickness of the inner circumferential surface of the field core, the field core is formed to satisfy $nLt1 \geq \pi dt2$.

16. The rotary electric machine according to claim 15, wherein the through holes are formed so that the sum of cross-sectional areas of the magnetic path portions along the circumferential direction of the field core is the same as the area of the inner circumferential surface.

17. A rotary electric machine comprising:
a rotor core fixed to a rotary shaft, which includes a magnetic body that forms a magnetic path, wherein the rotor core includes magnetic salient poles;
a stator including teeth and stator windings respectively wound around the teeth by concentrated winding, wherein each of the stator windings has two winding ends, and a slot is formed between adjacent ones of the teeth in a circumferential direction;
a field yoke that magnetically connects the stator and the magnetic body; and
a field winding located in proximity to at least one of the winding ends of the stator winding in an axial direction of the rotary shaft, wherein the field winding generates a magnetic pole on the magnetic salient poles when energized
wherein:
the magnetic body is a first magnetic body,
the stator includes a second magnetic body that extends in the axial direction of the rotary shaft,
the field yoke includes a field pole having a plurality of third magnetic bodies,
the field winding is wound around each of the plurality of third magnetic bodies,
when the field winding is energized, the first magnetic body, the magnetic salient poles, the second magnetic body, and the third magnetic bodies form a magnetic path, and
the third magnetic bodies are arranged so that a space is formed between adjacent ones of the third magnetic bodies.

18. A rotary electric machine comprising:
a rotor core fixed to a rotary shaft, which includes a magnetic body that forms a magnetic path, wherein the rotor core includes magnetic salient poles;
a stator including teeth and stator windings respectively wound around the teeth by concentrated winding, wherein each of the stator windings has two winding ends, and a slot is formed between adjacent ones of the teeth in a circumferential direction;
a field yoke that magnetically connects the stator and the magnetic body; and
a field winding located in proximity to at least one of the winding ends of the stator winding in an axial direction of the rotary shaft, wherein the field winding generates a magnetic pole on the magnetic salient poles when energized,
wherein:
the stator is arranged outward in a radial direction from the rotor core,
the field yoke includes an annular field core through which the rotary shaft is inserted,
the field core includes an inner circumferential surface that faces an outer circumferential surface of the rotary shaft, a plurality of magnetic path portions that extend in a radial direction of the field core, and through holes that extend in the axial direction of the rotary shaft,
the field winding is arranged on an end surface of the field core in proximity to the rotor core,
when the field winding is energized, the field yoke, the rotor core, the stator, and the rotary shaft form a magnetic path, and
the through holes are formed so that a sum of cross-sectional areas of the magnetic path portions along a circumferential direction of the field core is greater than or equal to an area of the inner circumferential surface of the field core.

* * * * *